United States Patent
Kanamori et al.

[11] Patent Number: 6,166,499
[45] Date of Patent: Dec. 26, 2000

[54] POWER OUTPUT APPARATUS AND METHOD OF REGULATING POWER

[75] Inventors: Akihiko Kanamori, Okazaki; Yasutomo Kawabata, Aichi-ken; Norihiko Akao, Nisshin; Hiroaki Urano; Masaru Hirako, both of Toyota; Tetsuya Miura, Aichi-ken, all of Japan

[73] Assignee: Toyota Jidosha Kabushiki Kaisha, Toyota, Japan

[21] Appl. No.: 09/027,614

[22] Filed: Feb. 23, 1998

[30] Foreign Application Priority Data

Mar. 21, 1997 [JP] Japan ................................. 9-087729

[51] Int. Cl.$^7$ ........................................... H02P 1/00
[52] U.S. Cl. ........................... 318/139; 318/140; 180/65.4
[58] Field of Search .............................. 180/65.1, 65.3, 180/65.4, 233, 242, 243, 65.8; 318/98, 99, 101, 112, 85; 310/112, 114

[56] References Cited

U.S. PATENT DOCUMENTS

| | | | |
|---|---|---|---|
| 3,586,938 | 6/1971 | Le Gall | 318/166 |
| 4,309,620 | 1/1982 | Bock | 290/4 R |
| 5,172,784 | 12/1992 | Varela, Jr. | 180/65.4 |
| 5,487,438 | 1/1996 | Kinoshita | 180/65.1 |
| 5,508,574 | 4/1996 | Vlock | 310/113 |
| 5,558,588 | 9/1996 | Schmidt | 475/5 |
| 5,708,314 | 1/1998 | Law | 310/114 |
| 5,730,676 | 3/1998 | Schmidt | 475/5 |
| 5,744,895 | 4/1998 | Seguchi et al. | 310/266 |
| 5,789,881 | 8/1998 | Egami et al. | 318/139 |
| 5,875,864 | 3/1999 | Yano et al. | 180/65.4 |
| 5,893,895 | 4/1999 | Ibaraki | 701/57 |
| 5,988,307 | 11/1999 | Yamada et al. | 180/243 |
| 5,993,350 | 11/1999 | Lawrie et al. | 477/5 |

FOREIGN PATENT DOCUMENTS

| | | |
|---|---|---|
| 58401-73 | 1/1975 | Australia . |
| 0 743 208 A2 | 11/1996 | European Pat. Off. . |
| 0 798 844 A1 | 10/1997 | European Pat. Off. . |
| 2 630 868-A1 | 11/1989 | France . |
| 41 24 479 | 1/1993 | Germany . |
| 33 38 548 A1 | 5/1995 | Germany . |
| 53-133814 | 11/1978 | Japan . |
| WO 98/00305 | 1/1998 | WIPO . |

Primary Examiner—Brian L. Johnson
Assistant Examiner—Bridget Avery
Attorney, Agent, or Firm—Oliff & Berridge, PLC

[57] ABSTRACT

A power output apparatus 20 implements a smooth switching between the connection of a rotor-rotating shaft 38 of an assist motor 40 with a crankshaft 56 of an engine 50 and the connection of the rotor-rotating shaft 38 of the assist motor 40 with a drive shaft 22, and enables the power output from the engine 50 to be output to the drive shaft 22 with a high efficiency. The power output from the engine 50 is converted to a desired power by a clutch motor 30 having rotors 31 and 33 respectively linked with the crankshaft 56 and the drive shaft 22 and by the assist motor 40 connected to either the crankshaft 56 or the drive shaft 22 via a first clutch 45 and a second clutch 46, and is output to the drive shaft 22. The connection of the assist motor 40 is switched in the state where both the clutches 45 and 46 are set in ON position, when the revolving speed of the engine 50 is made coincident with the revolving speed of the drive shaft 22. This effectively reduces a variation in torque output to the drive shaft 22 in the course of the switching operation and enables the power to be output to the drive shaft 22 even in the course of the switching operation.

27 Claims, 29 Drawing Sheets

POWER OUTPUT APPARATUS AND METHOD OF REGULATING POWER

BACKGROUND OF THE INVENTION

1. Field of the Invention

The present invention relates to a power output apparatus and a method of regulating power. More specifically, the invention pertains to a power output apparatus for outputting power from an engine to a drive shaft with a high efficiency as well as to a method of regulating the power output to the drive shaft.

2. Description of the Related Art

In known power output apparatuses mounted on a vehicle, an output shaft of an engine is electromagnetically linked with a drive shaft, which connects with a rotor of a motor, by means of an electromagnetic coupling, so that power of the engine is output to the drive shaft (as disclosed in, for example, JAPANESE PATENT LAYING-OPEN GAZETTE No. 53-133814). In this power output apparatus, the vehicle starts driving by the function of the motor. When the revolving speed of the motor reaches a predetermined level, the power output apparatus supplies an exciting electric current to the electromagnetic coupling to crank the engine and carries out supply of a fuel into the engine and ignition with a spark, thereby starting the engine. After the engine starts, the power from the engine is output to the drive shaft via the electromagnetic coupling, in order to continue driving the vehicle. When the power output to the drive shaft via the electromagnetic coupling is insufficient for the required power on the drive shaft, the motor is driven to supplement the insufficiency. The electromagnetic coupling regenerates electric power according to a slip of its electromagnetic connection while the power is output to the drive shaft. The regenerative electric power is stored in a battery as electric power used for starting the vehicle or is used as a power of the motor to supplement the insufficiency of the power on the drive shaft.

The conventional power output apparatus, however, has a problem of reduced efficiency with an increase in revolving speed of the drive shaft. In the power output apparatus discussed above, in order to output the power to the drive shaft via the electromagnetic coupling when the revolving speed of the drive shaft increases, it is required to make the revolving speed of the engine equal to or higher than the revolving speed of the drive shaft. An efficient driving range of the engine is generally defined by the revolving speed and the loading torque thereof. When the drive shaft rotates at a revolving speed exceeding the efficient driving range, the engine is forced to be driven out of this efficient driving range. This undesirably lowers the efficiency of the whole power output apparatus.

SUMMARY OF THE INVENTION

One object of the present invention is thus to provide a power output apparatus that implements a smooth switching between the connection of a rotating shaft of a motor with an output shaft of an engine and the connection of the rotating shaft of the motor with a drive shaft and enables the power output from the engine to be output to the drive shaft with a high efficiency, as well as a corresponding method of regulating power.

At least part of the above and the other related objects is realized by a power output apparatus for outputting power to a drive shaft. The power output apparatus includes:

an engine having an output shaft for outputting power of the engine as a rotational motion;

a first motor having a first rotor and a second rotor, which are electromagnetically connected with each other and rotatable relative to each other, the first rotor being linked with the output shaft and the second rotor being linked with the drive shaft;

a first electric power control circuit being connected with the first motor to enable electric power to be transmitted between the first motor and the first electric power control circuit, the transmitted electric power balancing power input to and output from the output shaft and the drive shaft;

a second motor having a rotating shaft;

a second electric power control circuit being connected with the second motor to enable electric power to be transmitted between the second motor and the second electric power control circuit;

a first connection mechanism for connecting the rotating shaft with the output shaft and disconnecting the rotating shaft from the output shaft;

a second connection mechanism for connecting the rotating shaft with the drive shaft and disconnecting the rotating shaft from the drive shaft;

a state detection sensor for detecting rotating states of the output shaft and the drive shaft; and a switching control unit for driving the first connection mechanism and the second connection mechanism and carrying out an exclusive switching between the first connection mechanism and the second connection mechanism, so as to cause either of the connection mechanisms to be in a connecting state, based on the rotating states of the output shaft and the drive shaft detected by the state detection sensor.

The present invention is also directed to a method of regulating power output to a drive shaft by using an engine as one power source. This method corresponds to the above power output apparatus. The method includes the steps of:

(a) providing a first motor having a first rotor linked with an output shaft of the engine and a second rotor that is linked with the drive shaft and is rotatable relative to the first rotor, a second motor that is different from the first motor and has a rotating shaft, a first connection mechanism for connecting the rotating shaft with the output shaft and disconnecting the rotating shaft from the output shaft, and a second connection mechanism for connecting the rotating shaft with the drive shaft and disconnecting the rotating shaft from the drive shaft;

(b) measuring a revolving speed of the output shaft and a revolving speed of the drive shaft; and (c) driving the first connection mechanism and the second connection mechanism and carrying out an exclusive switching between the first connection mechanism and the second connection mechanism, so as to cause either of the connection mechanisms to be in a connecting state, when the observed revolving speed of the output shaft substantially coincides with the observed revolving speed of the drive shaft.

In the power output apparatus of the present invention, the switching control unit drives the first connection mechanism and the second connection mechanism and carries out an exclusive switching between the first connection mechanism and the second connection mechanism, so as to cause either of the connection mechanisms to be in a connecting state, based on the rotating states of the output shaft of the engine and the drive shaft. This structure ensures a smooth switching between the first and the second connection mechanisms.

In accordance with one preferable application of the present invention, the rotating states of the output shaft and the drive shaft represent revolving speeds of the output shaft and the drive shaft, and the switching control unit carries out the exclusive switching when the revolving speed of the output shaft substantially coincides with the revolving speed of the drive shaft. This structure causes substantially no revolving speed difference between the output shaft of the engine and the drive shaft, thereby ensuring a smooth switching.

In accordance with one preferable structure, the switching control unit drives and controls the engine, the first motor, and the second motor, so as to cause the revolving speed of the output shaft to substantially coincide with the revolving speed of the drive shaft, prior to the switching operation. This control procedure is referred to as a revolving speed equalizing control. This structure positively makes the revolving speeds of both the shafts coincident with each other, and thereby ensures a smooth switching between the first connection mechanism and the second connection mechanism.

It may be considered that the revolving speed of the output shaft is substantially coincident with the revolving speed of the drive shaft, when a difference between the revolving speed of the output shaft and the revolving speed of the drive shaft becomes not greater than a predetermined level. One possible structure switches the second connection mechanism to a connecting state, when the difference between the revolving speeds of the output shaft and the drive shaft becomes not greater than the predetermined level upon condition that the revolving speed of the output shaft is greater than the revolving speed of the drive shaft. Another possible structure switches the first connection mechanism to a connecting state, when the difference between the revolving speeds of the output shaft and the drive shaft becomes not greater than the predetermined level upon condition that the revolving speed of the output shaft is less than the revolving speed of the drive shaft. The structure of carrying out the switching operation between the first connection mechanism and the second connection mechanism in this manner is equivalent to setting a hysteresis to the switching operation. This structure reduces the frequency of the switching operation and improves the durability of the power output apparatus.

The switching control unit generally carries out the exclusive switching between the first connection mechanism and the second connection mechanism, in order to switch either of these connection mechanisms to a connecting state. In accordance with one preferable structure, however, the switching control unit allows a specific state in which both the first connection mechanism and the second connection mechanism are in the connecting state, only when the revolving speed of the output shaft substantially coincides with the revolving speed of the drive shaft. In this preferable structure, the switching control unit carries out the exclusive switching via the specific state in which both the first connection mechanism and the second connection mechanism are in the connecting state. This structure performs the switching operation via the specific state in which the power output from the engine is directly output to the drive shaft, thereby enabling power to be output to the drive shaft even in the course of the switching operation. One preferable application of this structure controls the first motor to prevent a torque from being output from the first motor, in case that the switching control unit sets both the first connection mechanism and the second connection mechanism in the connecting state. This application prevents a torque other than the torque output to the drive shaft from being applied to the first connection mechanism and the second connection mechanism, while reducing the loss in the first motor, thus improving the energy efficiency of the whole power output apparatus.

Another preferable application of this structure controls the second motor to cancel a torque variation occurring on at least either of the output shaft and the drive shaft, in case that the switching control unit sets both the first connection mechanism and the second connection mechanism in the connecting state. This structure effectively reduces the torque shock that may occur on the output shaft of the engine or the drive shaft when both the first connection mechanism and the second connection mechanism are in the connecting state.

In the power output apparatus of the present invention and the corresponding method of regulating power, the revolving speeds of the output shaft and the drive shaft are measured as the rotating states of the output shaft of the engine and the drive shaft. Another preferable structure may measure torques output to the output shaft and the drive shaft and carry out the control based on the observed torques. This torque-based structure may also be applied to any modifications and variations discussed above. Still another preferable structure measures both the revolving speeds and the torques as the rotating states of the output shaft and the drive shaft and carries out the control based on these data.

The above and other objects, features, aspects, and advantages of the present invention will become more apparent from the following detailed description of the preferred embodiments with the accompanying drawings.

DESCRIPTION OF THE PREFERRED EMBODIMENTS

Figure 1:
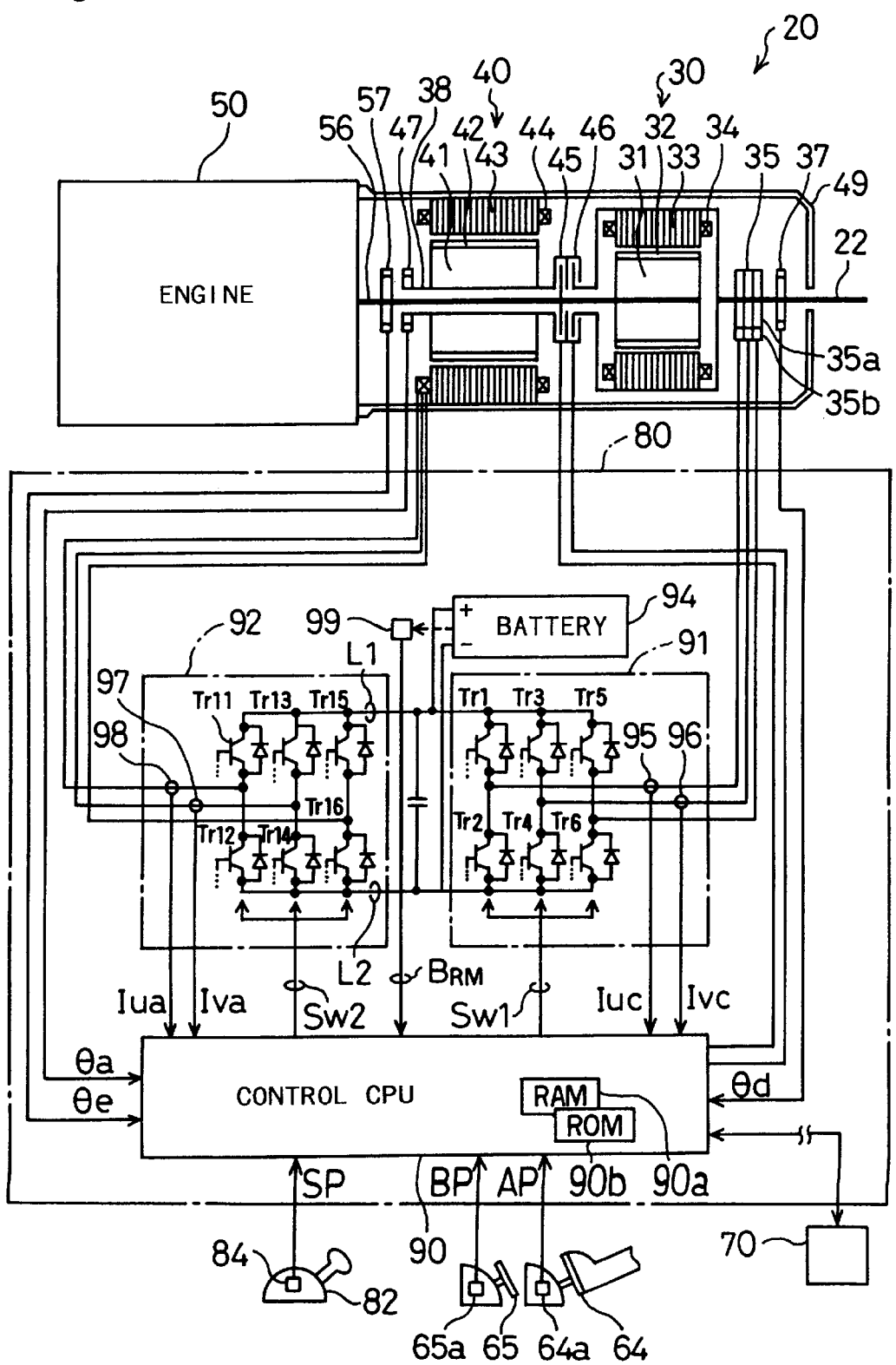
FIG. 1 schematically illustrates structure of a power output apparatus 20 as a first embodiment according to the present invention.
Figure 2:
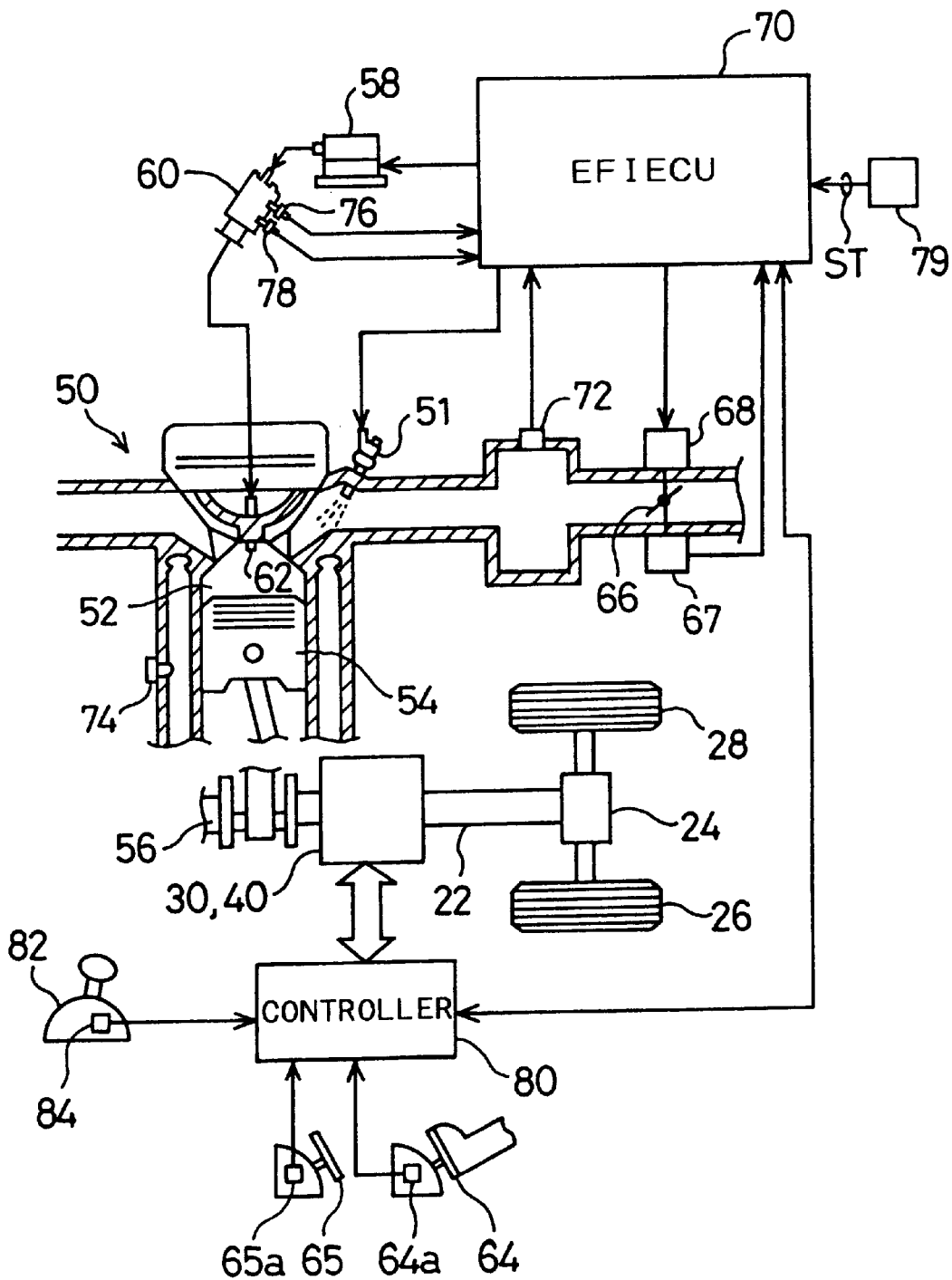
FIG. 2 schematically illustrates general structure of a vehicle having the power output apparatus 20 of FIG. 1 incorporated therein.

Some modes of carrying out the present invention are described below as preferred embodiments. FIG. 1 schematically illustrates structure of a power output apparatus 20 as a first embodiment according to the present invention; and FIG. 2 schematically illustrates a general structure of a vehicle having the power output apparatus 20 of FIG. 1 incorporated therein. The general structure of the vehicle is described first for the convenience of explanation.

Referring to FIG. 2, the vehicle is provided with an engine 50 driven by gasoline as a power source. The air ingested from an air supply system via a throttle valve 66 is mixed with fuel, that is, gasoline in this embodiment, injected from a fuel injection valve 51. The air/fuel mixture is supplied into a combustion chamber 52 to be explosively ignited and burned. Linear motion of a piston 54 pressed down by the explosion of the air/fuel mixture is converted to rotational motion of a crankshaft 56. The throttle valve 66 is driven to open and close by an actuator 68. An ignition plug 62 converts a high voltage applied from an igniter 58 via a distributor 60 to a spark, which explosively ignites and combusts the air/fuel mixture.

Operation of the engine 50 is controlled by an electronic control unit (hereinafter referred to as EFIECU) 70. The EFIECU 70 receives information from various sensors, which detect operating conditions of the engine 50. These sensors include a throttle position sensor 67 for detecting a valve travel or position of the throttle valve 66, a manifold vacuum sensor 72 for measuring a load applied to the engine 50, a water temperature sensor 74 for measuring the temperature of cooling water in the engine 50, and a speed sensor 76 and an angle sensor 78 mounted on the distributor 60 for measuring the revolving speed (the number of revolutions per a predetermined time period) and the rotational angle of the crankshaft 56. A starter switch 79 for detecting a starting condition ST of an ignition key (not shown) is also connected to the EFIECU 70. Other sensors and switches connecting with the EFIECU 70 are omitted from the illustration.

The crankshaft 56 of the engine 50 is linked with a drive shaft 22 via a clutch motor 30 and an assist motor 40

(described later in detail). The drive shaft 22 further connects with a differential gear 24, which eventually transmits the torque output from the drive shaft 22 of the power output apparatus 20 to left and right driving wheels 26 and 28. The clutch motor 30 and the assist motor 40 are driven and controlled by a controller 80. The controller 80 includes an internal control CPU and receives inputs from a gearshift position sensor 84 attached to a gearshift 82, an accelerator pedal position sensor 64a attached to an accelerator pedal 64, and a brake pedal position sensor 65a attached to a brake pedal 65. The detailed structure of the controller 80 will be described later. The controller 80 sends and receives a variety of data and information to and from the EFIECU 70 through communication. Details of the control procedure including a communication protocol will be described later.

Referring to FIG. 1, the power output apparatus 20 essentially includes the engine 50, the clutch motor 30 having an inner rotor 31 linked with the crankshaft 56 of the engine 50 and an outer rotor 33 linked with the drive shaft 22, the assist motor 40 having a rotor 41 that is mechanically linked with either the crankshaft 56 or the drive shaft 22 by means of a first clutch 45 and a second clutch 46, and the controller 80 for driving and controlling the clutch motor 30 and the assist motor 40.

As shown in FIG. 1, the clutch motor 30 is constructed as a synchronous motor having permanent magnets 32 attached to an outer surface of the inner rotor 31 and three-phase coils 34 wound on slots formed in the outer rotor 33. Electric power is supplied to the three-phase coils 34 via a slip ring 35. Laminated sheets of non-directional electromagnetic steel are used to form teeth and slots for the three-phase coils 34 in the outer rotor 33. In this embodiment, a total of eight permanent magnets 32 (four N poles and four S poles) are attached to the outer surface of the inner rotor 31. The permanent magnets 32 are magnetized in the direction towards the axial center of the clutch motor 30 and have magnetic poles of alternately inverted directions. The three-phase coils 34 of the outer rotor 33 facing to the permanent magnets 32 across a little gap are wound on a total of 12 slots (not shown) formed in the outer rotor 33. Supply of electricity to the respective coils forms magnetic fluxes running through the teeth (not shown), which separate the slots from one another. Supply of a three-phase alternating current to the respective coils rotates this magnetic field. The three-phase coils 34 are connected to receive electric power supplied from the slip ring 35. The slip ring 35 includes rotary rings 35a fixed to the drive shaft 22 and brushes 35b. There are three sets of rotary rings 35a and brushes 35b in the slip ring 35, in order to receive and supply electric currents of three phases (U, V, and W phases).

Interaction between a magnetic field formed by one adjoining pair of permanent magnets 32 and a revolving magnetic field formed by the three-phase coils 34 of the outer rotor 33 leads to a variety of behaviors of the inner rotor 31 and the outer rotor 33. The frequency of the three-phase alternating current supplied to the three-phase coils 34 is generally equal to a difference between the revolving speed of the inner rotor 31 directly connected to the crankshaft 56 and the revolving speed of the outer rotor 33.

The assist motor 40 is also constructed as a synchronous motor having three-phase coils 44, which are wound on a stator 43 fixed to a casing 49 to generate a revolving magnetic field. The stator 43 is also made of laminated sheets of non-directional electromagnetic steel. The rotor 41 is linked with a rotor-rotating shaft 38 that is hollow and coaxial with the crankshaft 56, and a plurality of permanent magnets 42 are attached to an outer surface of the rotor 41. In the assist motor 40, interaction between a magnetic field formed by the permanent magnets 42 and a revolving magnetic field formed by the three-phase coils 44 results in rotations of the rotor 41. The rotor-rotating shaft 38 is mechanically connected to and disconnected from the crankshaft 56 by means of the first clutch 45 arranged between the assist motor 40 and the clutch motor 30. The rotor-rotating shaft 38 is also mechanically connected to and disconnected from the drive shaft 22 via the outer rotor 33 of the clutch motor 30 by means of the second clutch 46. Both the first clutch 45 and the second clutch 46 are operated by a hydraulic circuit (not shown).

Resolvers 37, 47, and 57 for measuring rotational angles $\theta d$, $\theta r$, and $\theta e$ are mounted on the drive shaft 22, the rotor-rotating shaft 38, and the crankshaft 56, respectively. The resolver 57 for measuring the rotational angle $\theta e$ of the crankshaft 56 may also work as the angle sensor 78 attached to the distributor 60.

Although the clutch motor 30 may be arranged between the engine 50 and the assist motor 40 as discussed later, the assist motor 40 is arranged between the engine 50 and the clutch motor 30 in the power output apparatus 20 of this embodiment. Since there is a requirement for driving the vehicle only with the assist motor 40 as discussed blow, the assist motor 40 is greater in size than the clutch motor 30. The arrangement of the relatively large assist motor 40 adjoining to the larger engine 50 enhances the consistency in the structure of the power output apparatus 20. The first clutch 45 and the second clutch 46 are arranged between the assist motor 40 and the clutch motor 30 in the power output apparatus 20 of the embodiment, although there are a variety of other possible arrangements as discussed later. Both the clutches 45 and 46 are relatively small in size and can be placed in a clearance formed between the assist motor 40 and the clutch motor 30. This arrangement preferably reduces the size of the whole power output apparatus 20.

As mentioned above, the clutch motor 30 and the assist motor 40 are driven and controlled by the controller 80. Referring back to FIG. 1, the controller 80 includes a first driving circuit 91 for driving the clutch motor 30, a second driving circuit 92 for driving the assist motor 40, a control CPU 90 for controlling both the first and the second driving circuits 91 and 92 and activating and controlling the first clutch 45 and the second clutch 46, and a battery 94 including a number of secondary cells. The control CPU 90 is a one-chip microprocessor including a RAM 90a used as a working memory, a ROM 90b in which a variety of processing programs are stored, an input/output port (not shown), and a serial communication port (not shown) through which data are sent to and received from the EFIECU 70. The control CPU 90 receives a variety of data via the input port. The input data include the rotational angle $\theta d$ of the drive shaft 22 measured with the resolver 37, the rotational angle $\theta r$ of the rotor-rotating shaft 38 measured with the resolver 47, the rotational angle $\theta e$ of the crankshaft 56 of the engine 50 measured with the resolver 57, an accelerator pedal position AP (step-on amount of the accelerator pedal 64) output from the accelerator pedal position sensor 64a, a brake pedal position BP (step-on amount of the brake pedal 65) output from the brake pedal position sensor 65a, a gearshift position SP output from the gearshift position sensor 84, clutch-on and -off signals output from the first clutch 45 and the second clutch 46, clutch motor currents Iuc and Ivc from two ammeters 95 and 96 disposed in the first driving circuit 91, assist motor currents Iua and Iva from two ammeters 97 and 98 disposed in the second driving circuit 92, and a remaining charge BRM of the battery 94 measured with a remaining charge meter 99. The remaining charge meter 99 may determine the remaining charge BRM of the battery 94 by any known method; for example, by measuring the specific gravity of an electrolytic solution in the battery 94 or the whole weight of the battery 94, by computing the currents and time of charge and discharge, or by causing an instantaneous short-circuit between terminals of the battery 94 and measuring an internal resistance against the electric current.

The control CPU 90 outputs a first control signal SW1 for driving six transistors Tr1 through Tr6 working as switching elements of the first driving circuit 91, a second control signal SW2 for driving six transistors Tr11 through Tr16 working as switching elements of the second driving circuit 92, and driving signals for driving the first clutch 45 and the second clutch 46. The six transistors Tr1 through Tr6 in the first driving circuit 91 constitute a transistor inverter and are arranged in pairs to work as a source and a drain with respect to a pair of power lines L1 and L2. The three-phase coils (U,V,W) 34 of the clutch motor 30 are connected via the slip ring 35 to the respective contacts of the paired transistors. The power lines L1 and L2 are respectively connected to plus and minus terminals of the battery 94. The first control signal SW1 output from the control CPU 90 thus successively controls the power-on time of the paired transistors Tr1 through Tr6. The electric current flowing through each coil 34 undergoes PWM (pulse width modulation) to give a quasi-sine wave, which enables the three-phase coils 34 to form a revolving magnetic field.

The six transistors Tr11 through Tr16 in the second driving circuit 92 also constitute a transistor inverter and are arranged in the same manner as the transistors Tr1 through Tr6 in the first driving circuit 91. The three-phase coils (U,V,W) 44 of the assist motor 40 are connected to the respective contacts of the paired transistors. The second control signal SW2 output from the control CPU 90 thus successively controls the power-on time of the paired transistors Tr11 through Tr16. The electric current flowing through each coil 44 undergoes PWM to give a quasi-sine wave, which enables the three-phase coils 44 to form a revolving magnetic field.

The power output apparatus 20 of the embodiment thus constructed works in the following manner. The following describes a first state, in which the first clutch 45 is off and the second clutch 46 is on, and a second state, in which the first clutch 45 is on and the second clutch 46 is off. In the first state, the rotor-rotating shaft 38 is disconnected from the crankshaft 56 but connected to the drive shaft 22, and the assist motor 40 is accordingly linked with the drive shaft 22 as shown in the schematic view of FIG. 3. In the second state, on the other hand, the rotor-rotating shaft 38 is connected to the crankshaft 56 but disconnected from the drive shaft 22, and the assist motor 40 is accordingly linked with the crankshaft 56 as shown in the schematic view of FIG. 4. The following discusses the operations in the first state (in which the first clutch 45 is off and the second clutch 46 is on) and those in the second state (in which the first clutch 45 is on and the second clutch 46 is off) in this sequence.

In case that the first clutch 45 is off and the second clutch 46 is on, the power output apparatus 20 of the embodiment follows the operation principle discussed below or more specifically the principle of torque conversion. By way of example, it is assumed that the engine 50 driven by the EFIECU 70 rotates at a revolving speed Ne and that the drive shaft 22 rotates at a revolving speed Nd1 that is lower than the revolving speed Ne. While the transistors Tr1, Tr3, and Tr5 of the first driving circuit 91 are in OFF position and the transistors Tr2, Tr4, and Tr6 are in ON position, the controller 80 does not supply any electric current to the three-phase coils 34 of the clutch motor 30 via the slip ring 35. No supply of electric current causes the inner rotor 31 and the outer rotor 33 of the clutch motor 30 to be electromagnetically disconnected from each other. This results in racing the crankshaft 56 of the engine 50. Under the condition that all the transistors Tr1 through Tr6 are in OFF position, there is no regeneration of energy from the three-phase coils 34, so that the engine 50 is kept at an idle.

As the control CPU 90 of the controller 80 outputs the first control signal SW1 to control on and off the transistors Tr1 through Tr6 in the first driving circuit 91, a constant electric current flows through the three-phase coils 34 of the clutch motor 30, based on the difference between the revolving speed Ne of the crankshaft 56 of the engine 50 and the revolving speed Nd1 of the drive shaft 22 (in other words, a revolving speed difference Nc (=Ne−Nd1) between the revolving speed of the inner rotor 31 and that of the outer rotor 33 in the clutch motor 30). In this state, the clutch motor 30 functions as a generator and carries out the regenerative operation to regenerate an electric current via the first driving circuit 91, and the battery 94 is charged with the regenerative electric current. At this moment, a certain slip exists between the inner rotor 31 and the outer rotor 33 connected with each other in the clutch motor 30, and a torque is output from the crankshaft 56 to the drive shaft 22 via the coupling of the inner rotor 31 with the outer rotor 33. In order to allow the assist motor 40 to consume energy identical with the electrical energy regenerated by the clutch motor 30, the control CPU 90 controls on and off the transistors Tr11 through Tr16 in the second driving circuit 92. The on-off control of the transistors Tr11 through Tr16 enables an electric current to flow through the three-phase coils 44 of the assist motor 40, and the assist motor 40 consequently carries out the power operation to produce a torque.

Figure 5:
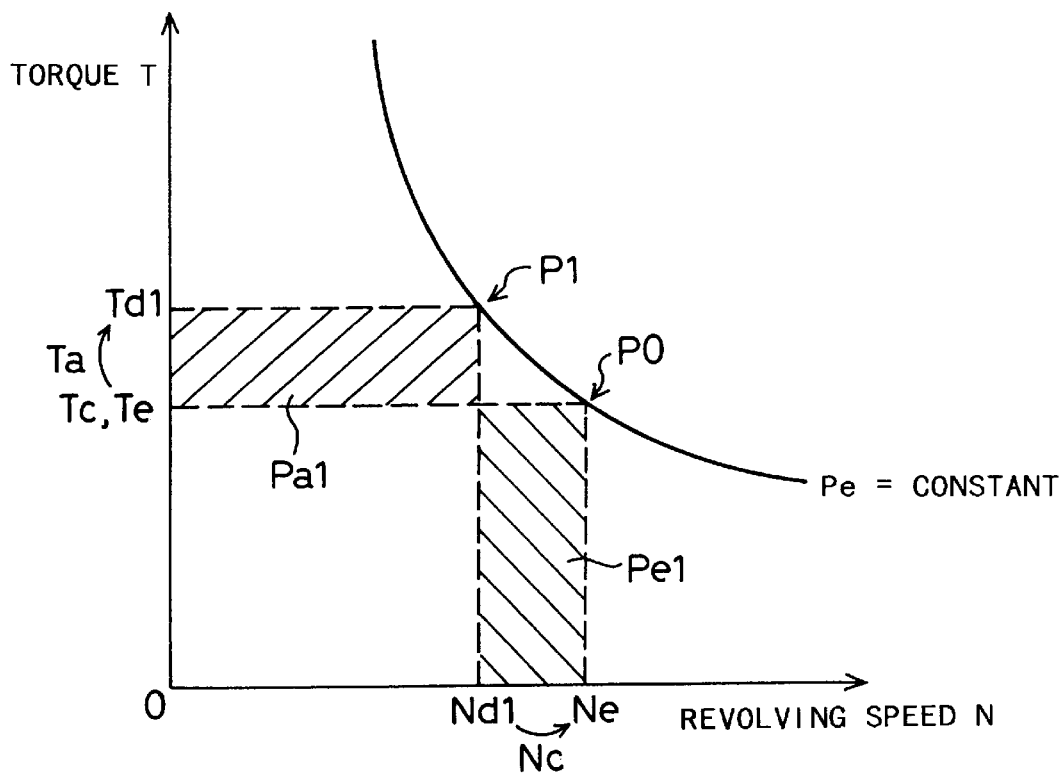
FIG. 5 shows a state of torque conversion when Ne<Nd in the structure of FIG. 3.

Referring to FIG. 5, when the engine 50 is driven at a driving point P0 defined by the revolving speed Ne and a torque Te, the clutch motor 30 outputs a torque Tc (=torque Te output from the engine 50) to the drive shaft 22 and regenerates energy expressed by a hatched area Pc1. The regenerative energy is supplied to the assist motor 40 as energy expressed by an area Pa1, so that the drive shaft 22 is rotated at a driving point P1 defined by the revolving speed Nd1 and a torque Td1.

As another example, it is assumed that the engine 50 is driven at the revolving speed Ne and that the drive shaft 22 rotates at a revolving speed Nd2 that is higher than the revolving speed Ne. In this state, the outer rotor 33 of the clutch motor 30 rotates relative to the inner rotor 31 in the direction of rotation of the drive shaft 22 at a revolving speed defined by the absolute value of a revolving speed difference Nc (=Ne−Nd2). The clutch motor 30 accordingly functions as a normal motor and supplies the energy of rotational motion to the drive shaft 22 with electric power discharged from the battery 94. When the control CPU 90 controls the second driving circuit 92 to enable the assist motor 40 to regenerate electric power, a slip between the rotor 41 and the stator 43 of the assist motor 40 makes a regenerative electric current flow through the three-phase coils 44. In order to allow the clutch motor 30 to consume the electric power regenerated by the assist motor 40, the control CPU 90 controls both the first driving circuit 91 and the second driving circuit 92. This enables the clutch motor 30 to be driven without using electric power stored in the battery 94.

Figure 6:
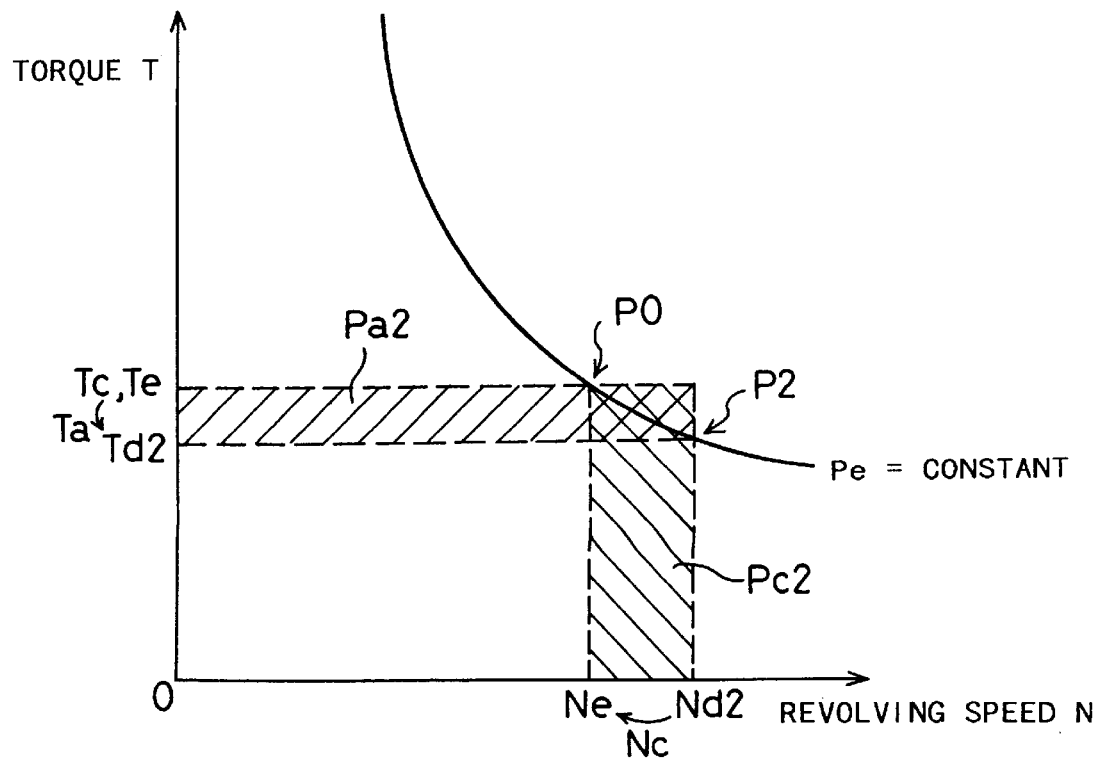
FIG. 6 shows a state of torque conversion when Ne>Nd in the structure of FIG. 3.

Referring to FIG. 6, when the engine 50 is driven at the driving point P0 defined by the revolving speed Ne and the torque Te, the clutch motor 30 receives energy expressed by a hatched area Pc2 and outputs a torque Tc (=torque Te output from the engine 50) to the drive shaft 22. The energy supplied to the clutch motor 30 is regenerated by the assist motor 40 as energy expressed by an area Pa2, so that the drive shaft 22 is rotated at a driving point P2 defined by the revolving speed Nd2 and a torque Td2.

The power output apparatus 20 in the first state, wherein the first clutch 45 is off and the second clutch 46 is on, can perform a variety of operations in order to, for example, charge the battery 94 with an excess of electrical energy or discharge the battery 94 to supplement the insufficient electrical energy, other than the operation of converting all the power output from the engine 50 to a torque and outputting the torque to the drive shaft 22. Such charging and discharging operations are implemented by regulating the power output from the engine 50 (that is, the product of the torque Te and the revolving speed Ne), the electrical energy regenerated or consumed by the clutch motor 30, and the electrical energy consumed or regenerated by the assist motor 40.

In case that the first clutch 45 is on and the second clutch 46 is off (in the state shown in the schematic view of FIG. 4), on the other hand, the power output apparatus 20 of the embodiment follows the operation principle (principle of torque conversion) discussed below. By way of example, it is assumed that the engine 50 is driven at the driving point P0 defined by the revolving speed Ne and the torque Te and that the drive shaft 22 rotates at the revolving speed Nd1 that is lower than the revolving speed Ne. In case that the assist motor 40 linked with the crankshaft 56 outputs a torque Ta (Ta=Td1−Te) to the crankshaft 56, the crankshaft 56 thereby receives a torque Td1 (=Te+Ta). When the torque Tc of the clutch motor 30 is regulated to the value Td1 (=Te+Ta), the torque Tc (=Te+Ta) is output to the drive shaft 22 while electric power is regenerated based on the revolving speed difference Nc between the revolving speed Ne of the engine 50 and the revolving speed Nd1 of the drive shaft 22. It is here required to set the torque Ta of the assist motor 40 to be just supplied by the electric power regenerated by the clutch motor 30. The regenerative electric power is supplied to the second driving circuit 92 via the power lines L1 and L2, and the assist motor 40 is accordingly driven with the regenerative electric power.

Figure 7:
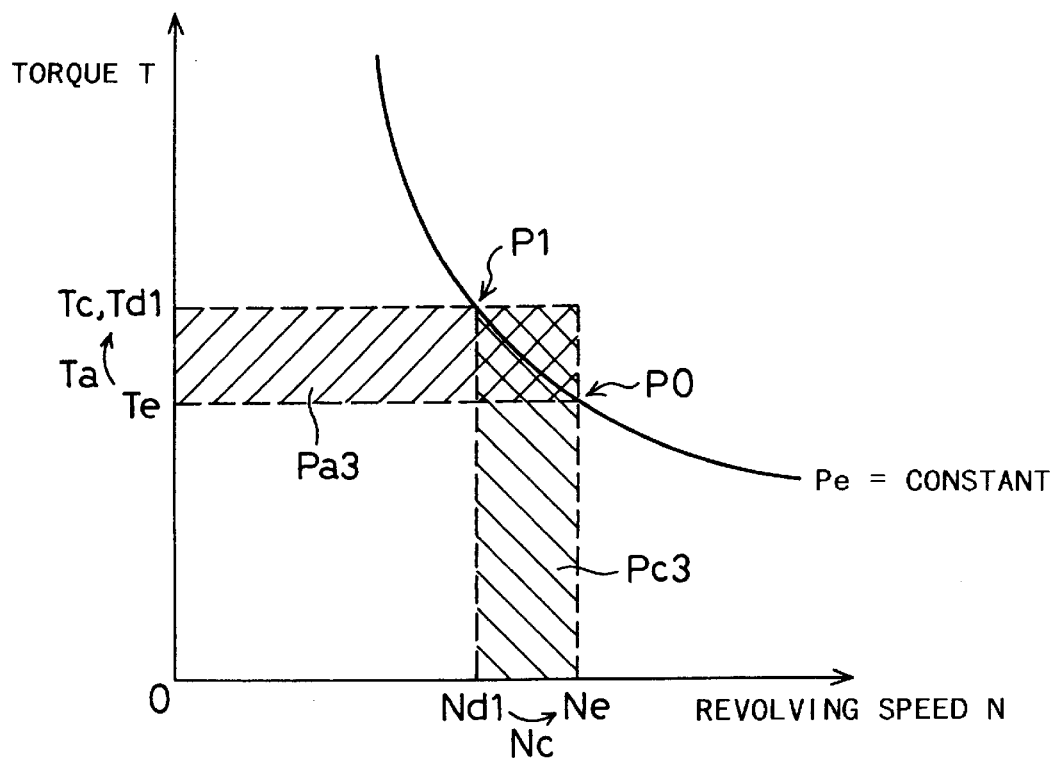
FIG. 7 shows a state of torque conversion when Ne<Nd in the structure of FIG. 4.

Referring to FIG. 7, when the engine 50 is driven at the driving point P0 defined by the revolving speed Ne and the torque Te, energy expressed by a hatched area Pa3 is supplied to the assist motor 40 to make the torque of the crankshaft 56 equal to the value Td1. The clutch motor 30 outputs the torque Td1 (=torque Tc) to the drive shaft 22 and regenerates energy supplied to the assist motor 40 as energy expressed by an area Pc3. The drive shaft 22 thereby rotates at a driving point P1 defined by the revolving speed Nd1 and the torque Td1.

As another example, it is assumed that the engine 50 is driven at the driving point P0 defined by the revolving speed Ne and the torque Te and that the drive shaft rotates at the revolving speed Nd2 that is higher than the revolving speed Ne. In case that the torque Ta of the assist motor 40 is regulated to a value (Td2−Te), the assist motor 40 carries out the regenerative operation and regenerates energy (electric power) from the crankshaft 56. The outer rotor 33 of the clutch motor 30 rotates relative to the inner rotor 31 in the direction of rotation of the drive shaft 22 at a revolving speed difference Nc (=Ne−Nd2). The clutch motor 30 accordingly functions as a normal motor and supplies energy corresponding to the revolving speed difference Nc to the drive shaft 22 as energy of rotational motion. In case that the torque Ta of the assist motor 40 is set in order to enable the electric power consumed by the clutch motor 30 to be just supplied by the electric power regenerated by the assist motor 40, the clutch motor 30 can be driven by the electric power regenerated by the assist motor 40.

Figure 8:
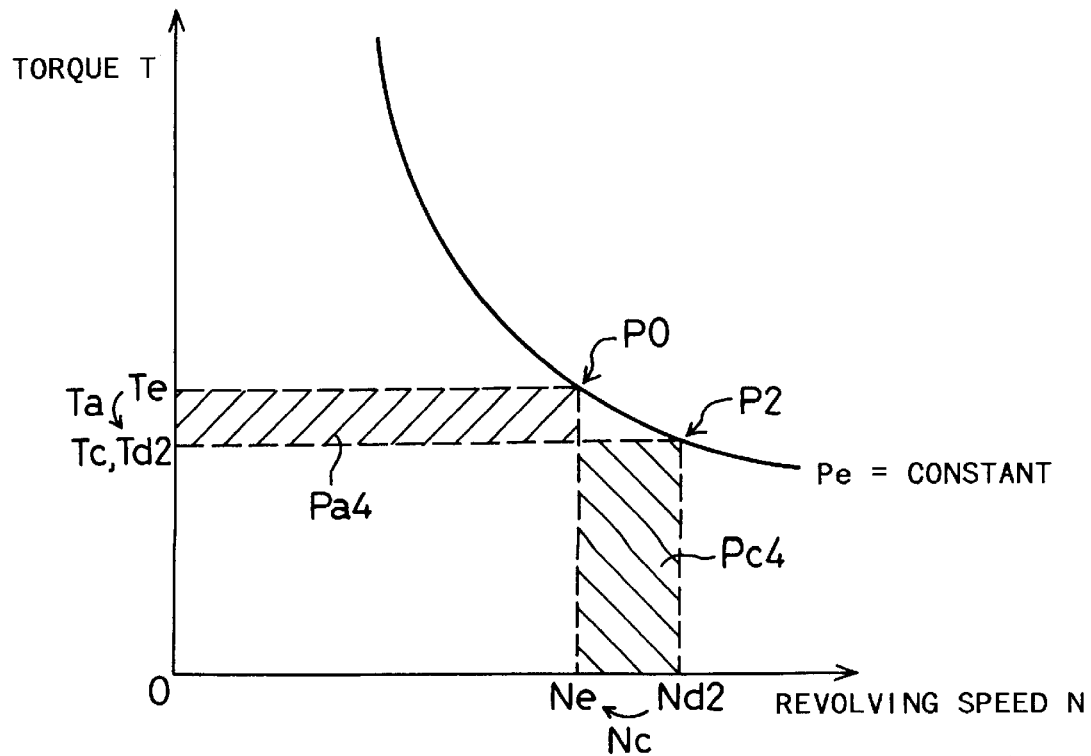
FIG. 8 shows a state of torque conversion when Ne>Nd in the structure of FIG. 4.

Referring to FIG. 8, when the engine 50 is driven at the driving point P0 defined by the revolving speed Ne and the torque Te, the assist motor 40 regenerates energy expressed by a hatched area Pa4 and supplies the regenerative energy to the clutch motor 30 as energy expressed by an area Pc4. The clutch motor 30 accordingly outputs the torque Tc (=torque Td2) to the drive shaft 22, so that the drive shaft 22 is rotated at a driving point P2 defined by the revolving speed Nd2 and the torque Td2.

The power output apparatus 20 in the second state, wherein the first clutch 45 is on and the second clutch 46 is off, can perform a variety of operations in order to, for example, charge the battery 94 with an excess of electrical energy or discharge the battery 94 to supplement the insufficient electrical energy, other than the operation of converting all the power output from the engine 50 to a torque and outputting the torque to the drive shaft 22. Such charging and discharging operations are implemented by regulating the power output from the engine 50 (that is, the product of the torque Te and the revolving speed Ne), the electrical energy regenerated or consumed by the clutch motor 30, and the electrical energy consumed or regenerated by the assist motor 40.

It is here assumed that the battery 94 is neither charged nor discharged. Namely all the power output from the engine 50 is subjected to the torque conversion by the clutch motor 30 and the assist motor 40 and output to the drive shaft 22. In an under-drive condition where the revolving speed Ne of the engine 50 is greater than the revolving speed Nd of the drive shaft 22, the structure of FIG. 3 carries out the torque conversion illustrated in FIG. 5, whereas the structure of FIG. 4 carries out the torque conversion illustrated in FIG. 7. The loss in the motor or the generator generally increases with an increase in quantity of energy consumed or regenerated. In this under-drive condition, the torque conversion in the structure of FIG. 3 results in a smaller loss than the torque conversion in the structure of FIG. 4. In an over-drive condition where the revolving speed Ne of the engine 50 is less than the revolving speed Nd of the drive shaft 22, on the other hand, since the structure of FIG. 3 carries out the torque conversion illustrated in FIG. 5 and the structure of FIG. 4 carries out the torque conversion illustrated in FIG. 7, the torque conversion in the structure of FIG. 4 results in a smaller loss than the torque conversion in the structure of FIG. 3. In this embodiment, the basic control procedure accordingly carries out the torque conversion in the structure of FIG. 3 in the under-drive condition (Ne>Nd), while carrying out the torque conversion in the structure of FIG. 4 in the over-drive condition (Ne<Nd). This ensures high energy efficiency of the whole power output apparatus 20.

In the power output apparatus 20 of the embodiment, both the first clutch 45 and the second clutch 46 may be in ON position or alternatively in OFF position. In case that both the clutches 45 and 46 are on, the rotor-rotating shaft 38 linked with the rotor 41 of the assist motor 40 is mechanically connected to both the crankshaft 56 and the drive shaft 22, so that the clutch motor 30 does not work at all. As shown in the schematic view of FIG. 9, this state is equivalent to the structure in which only the rotor 41 of the assist motor 40 is connected to both the crankshaft 56 and the drive shaft 22. In this state, the power output from the engine 50 is directly transmitted to the drive shaft 22, and the power output from the assist motor 40 is added to or subtracted from the transmitted power on the drive shaft 22.

In case both the clutches 45 and 46 are off, on the other hand, the rotor-rotating shaft 38 linked with the rotor 41 of the assist motor 40 is disconnected from both the crankshaft 56 and the drive shaft 22. As shown in the schematic view of FIG. 10, this state is equivalent to the structure in which the inner rotor 31 of the clutch motor 30 is connected to the crankshaft 56 while the outer rotor 33 of the clutch motor 30 is connected to the drive shaft 22. In this state, the power output from the engine 50 is transmitted to the drive shaft 22 via the electromagnetic coupling of the inner rotor 31 with the outer rotor 33 in the clutch motor 30. At the same time, electric power corresponding to the revolving speed difference Nc between the inner rotor 31 and the outer rotor 33 is regenerated or consumed by the clutch motor 30.

The following describes torque control and switching control of the first clutch 45 and the second clutch 46 executed in the power output apparatus 20 of the first embodiment. These control operations follow a torque control routine shown in the flowchart of FIG. 11, a clutch switching routine shown in the flowchart of FIG. 12, a switching routine from an under-drive state to an over-drive state under a revolving speed-preferential condition shown in the flowchart of FIG. 13, and a switching routine from the over-drive state to the under-drive state under the revolving speed-preferential condition shown in the flowchart of FIG. 14. The general procedure of torque control is discussed first based on the torque control routine shown in the flowchart of FIG. 11. This torque control routine is repeatedly executed at predetermined time intervals (for example, at every 20 msec) after the power output apparatus 20 of the embodiment has been activated.

Figure 11:
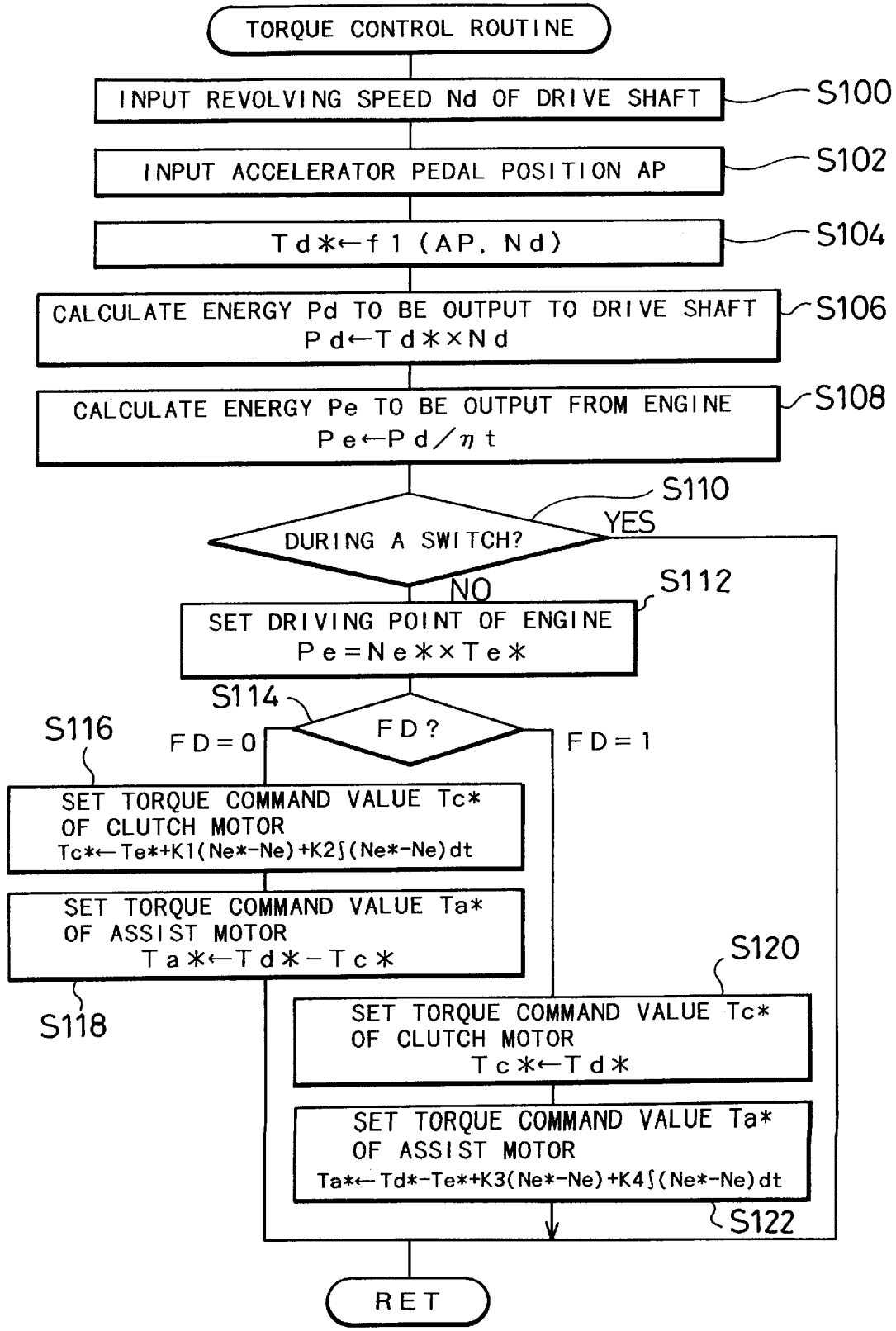
FIG. 11 is a flowchart showing a torque control routine executed by the control CPU 90 of the controller 80.

When the program enters the torque control routine of FIG. 11, the control CPU 90 of the controller 80 first reads the revolving speed Nd of the drive shaft 22 at step S100. The revolving speed Nd of the drive shaft 22 may be calculated from the rotational angle $\theta$d of the drive shaft 22 read from the resolver 37. The control CPU 90 then reads the accelerator pedal position AP (that is, the step-on amount of the accelerator pedal 64) detected by the accelerator pedal position sensor 64a at step S102. The driver steps on the accelerator pedal 64 when feeling insufficiency of the output torque. The value of the accelerator pedal position AP accordingly represents the desired output torque (that is, the torque to be output to the drive shaft 22).

Figure 15:
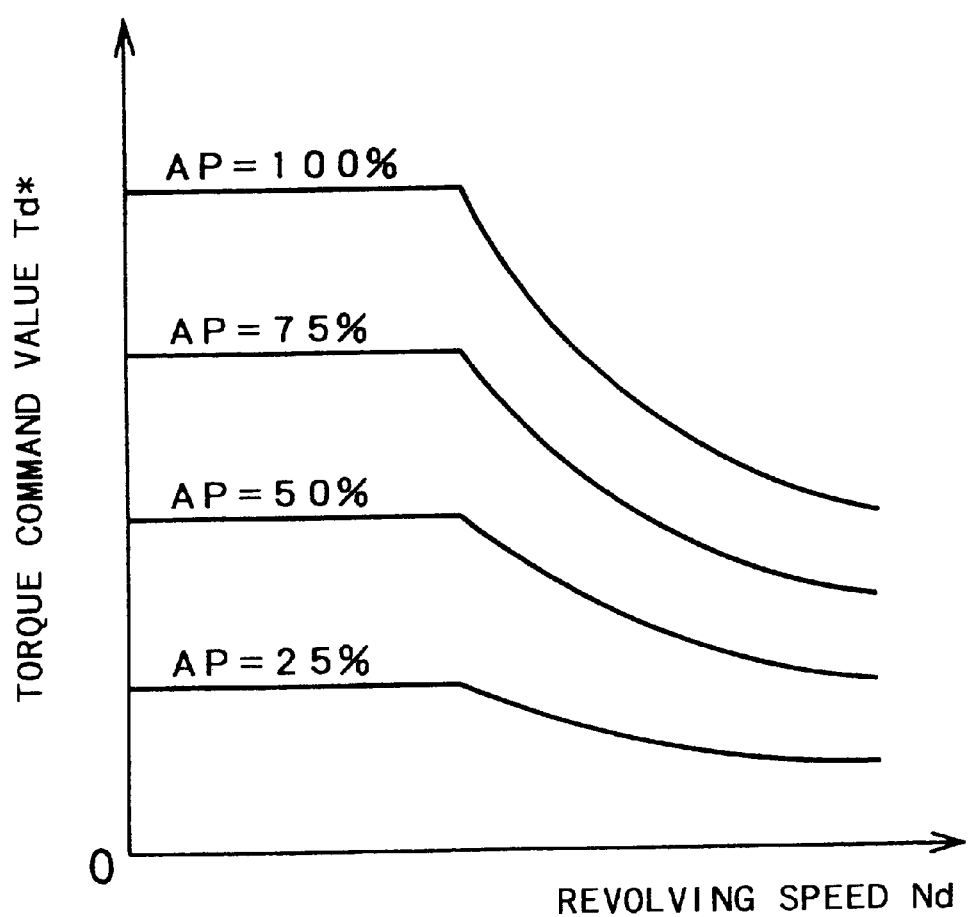
FIG. 15 is a graph showing the relationship between the revolving speed Nd of the drive shaft 22, the accelerator pedal position AP, and the torque command value Td*.

The control CPU 90 subsequently determines a torque command value Td* or a target torque to be output to the drive shaft 22, based on the input accelerator pedal position AP and the input revolving speed Nd of the drive shaft 22 at step S104. In this embodiment, a map representing the relationship between the torque command value Td*, the accelerator pedal position AP, and the revolving speed Nd of the drive shaft 22 is stored in advance into the ROM 90b. A concrete procedure of step S104 reads the torque command value Td* corresponding to the input revolving speed Nd of the drive shaft 22 and the input accelerator pedal position AP from the map stored in the ROM 90b. FIG. 15 shows an example of this map.

The control CPU 90 calculates energy Pd to be output to the drive shaft 22 from the torque command value Td* thus determined and the input revolving speed Nd of the drive shaft 22 according to an equation of Pd=Td*×Nd at step S106. Energy Pe to be output from the engine 50 is then obtained at step S108 by dividing the calculated energy Pd by a transmission efficiency $\eta$t. It is subsequently determined at step S110 whether or not the first clutch 45 and the second clutch 46 are in the course of switching operation. In case that these clutches 45 and 46 are during the switching operation, the program exits from this routine.

In case that these clutches 45 and 46 are not during the switching operation, on the other hand, the control CPU 90 sets a target torque Te* and a target revolving speed Ne* of the engine 50, based on the calculated energy Pe at step S112. The relationship between the energy Pe to be output from the engine 50, the target engine speed Ne*, and the target engine torque Te* is defined by an equation of Pe=Ne*×Te*. There are, however, numerous combinations of the target torque Te* and the target revolving speed Ne* of the engine 50 satisfying this equation. In this embodiment, the optimum combination of the target engine torque Te* and the target engine speed Ne* against each value of the energy Pe is experimentally or otherwise determined. In the optimum combination, the engine 50 is driven at the highest possible efficiency and the driving state of the engine 50 smoothly changes with a variation in energy Pe. The relationship between the energy Pe and the optimum combination of the target engine torque Te* and the target engine speed Ne* is stored in advance as a map into the ROM 90b. A concrete procedure of step S112 reads the optimum combination of the target engine torque Te* and the target engine speed Ne* corresponding to the energy Pe from the map stored in the ROM 90b. The details of the map are discussed below.

Figure 16:
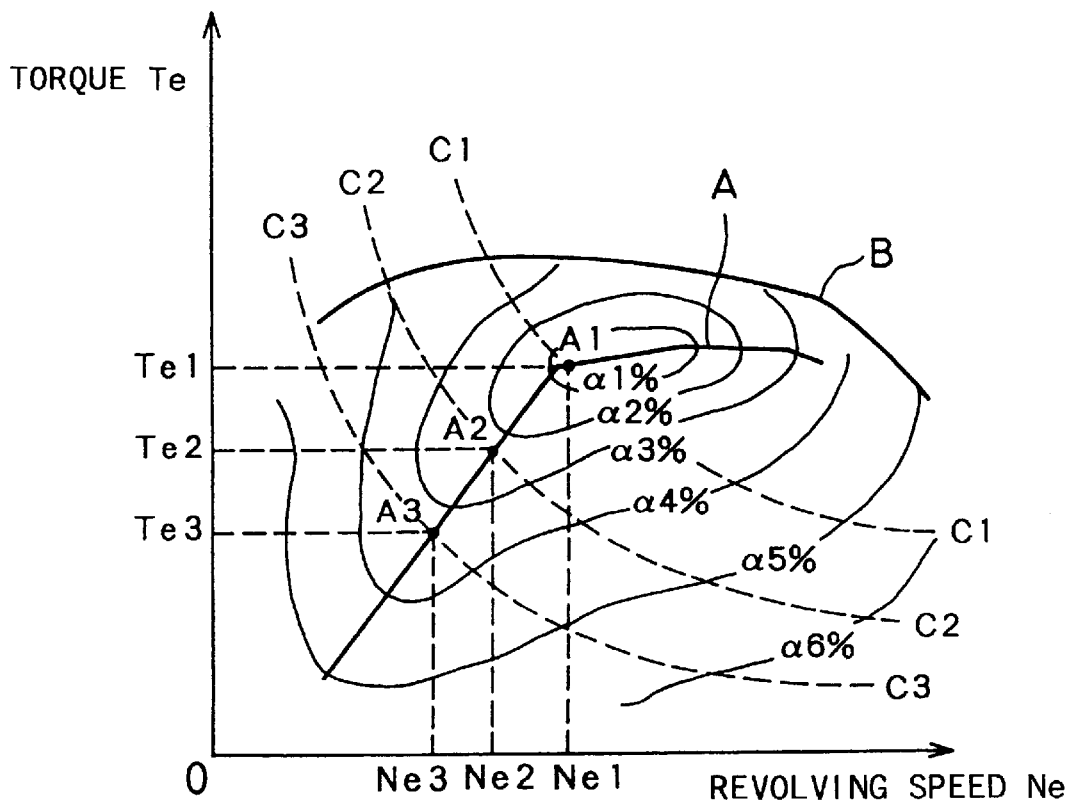
FIG. 16 is a graph showing the driving points of the engine 50 at various efficiencies.

FIG. 16 is a graph showing the relationship between the driving point of the engine 50 and the efficiency of the engine 50. The curve B in FIG. 16 represents a boundary of an engine-operable range, in which the engine 50 can be driven. In the engine-operable range, efficiency curves, such as curves $\alpha$1 through $\alpha$6, can be drawn by successively joining the driving points having the identical efficiency according to the characteristics of the engine 50. In the engine-operable range, constant energy curves expressed as the product of the torque Te and the revolving speed Ne, such as curves C1—C1 through C3—C3, can also be drawn. The graph of FIG. 17 shows the efficiency of the respective driving points along the constant energy Pe curves C1—C1 through C3—C3 plotted against the revolving speed Ne of the engine 50.

Figure 17:
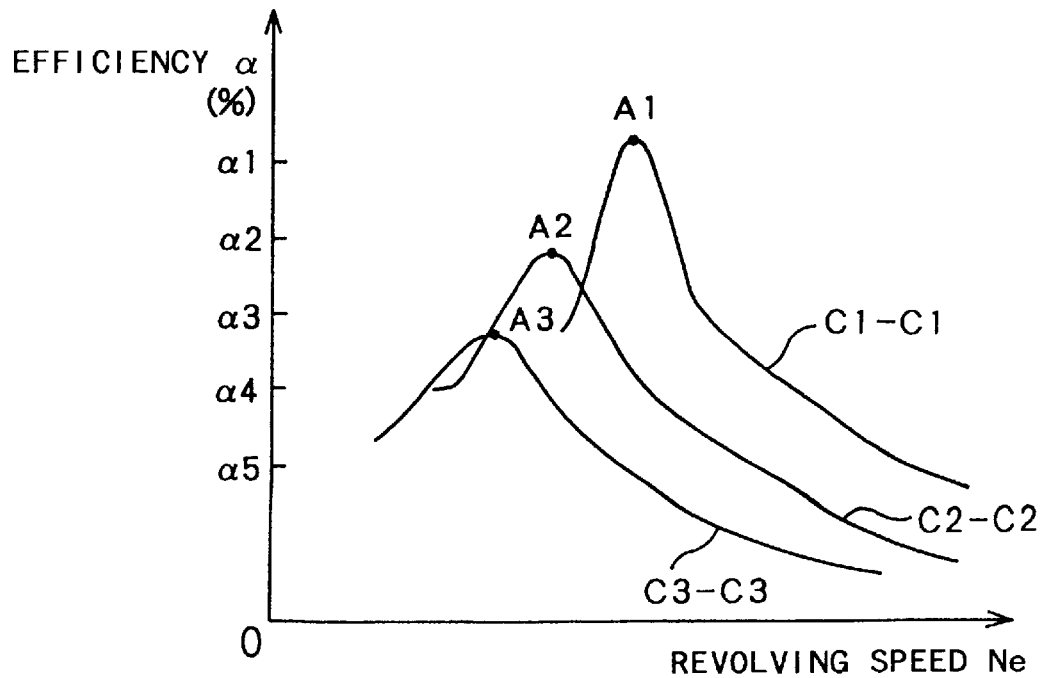
FIG. 17 is a graph showing the efficiency at various driving points of the engine 50 along the constant energy Pe curves plotted against the revolving speed Ne of the engine 50.

Referring to FIG. 17, even when the energy Pe output from the engine 50 is constant, the efficiency of the engine 50 is significantly varied by its driving point. On the constant energy curve C1—C1, for example, the efficiency of the engine 50 reaches its maximum when the engine 50 is driven at a driving point A1 (torque Te1 and revolving speed Ne1). Such a driving point attaining the highest possible efficiency exists on each constant energy curve, that is, a driving point A2 on the constant output energy Pe curve C2—C2 and a driving point A3 on the constant output energy Pe curve C3—C3. The curve A (working curve) in FIG. 16 is obtained by joining such driving points attaining the highest possible efficiency of the engine 50 for the respective values of energy Pe output from the engine 50 by a continuous curve. In the embodiment, the map representing the relationship between the driving point (torque Te and revolving speed Ne) on the working curve A and the energy Pe is used at step S112 in the flowchart of FIG. 11, in order to set the target torque Te* and the target revolving speed Ne* of the engine 50.

The working curve A should be continuous because of the following reason. In case that a discontinuous curve is used to set the driving point of the engine 50 corresponding to the varying energy Pe, the driving state of the engine 50 abruptly changes with a variation in energy Pe over the discontinuous driving points. The abrupt change may prevent the driving state from being smoothly shifted to a target level, thereby causing knock or even an abrupt stop of the vehicle. When the working curve A is continuous, each driving point on the working curve A may not correspond to the driving point of the highest possible efficiency on the constant energy Pe curve. In the graph of FIG. 16, a driving point Amin defined by a torque Temin and a revolving speed Nemin represents a driving point of minimum energy that can be output from the engine 50.

The torque Te and the revolving speed Ne of the engine 50 are regulated, in order to enable the engine 50 to be stationarily driven at the driving point defined by the target engine torque Te* and the target engine speed Ne* set at step S112 in the flowchart of FIG. 11. In accordance with a concrete procedure, the control CPU 90 of the controller 80 controls the torques of the clutch motor 30 and the assist motor 40 as the loading torques of the engine 50, while transmitting the target engine torque Te* and the target engine speed Ne* to the EFIECU 70 through communication and enabling the EFIECU 70 to regulate the position of the throttle valve 66 and control the fuel injection from the fuel injection valve 51 and the ignition with the ignition plug 62 based on the target engine torque Te* and the target engine speed Ne*. The output torque Te and the revolving speed Ne of the engine 50 vary with the loading torques, so that the control of the loading torques given by the clutch motor 30 and the assist motor 40 as well as the control by the EFIECU 70 is required to enable the engine 50 to be driven at the driving point defined by the target torque Te* and the target revolving speed Ne*. The torque control of the clutch motor 30 and the assist motor 40 will be described later.

Referring back to the flowchart of FIG. 11, after setting the target revolving speed Ne* and the target torque Te* of the engine 50, the control CPU 90 of the controller 80 checks the value of a drive mode flag FD at step S114. The drive mode flag FD is set in the process of switching the first clutch 45 and the second clutch 46. When the power output apparatus 20 is switched from the structure of FIG. 4 to the structure of FIG. 3 to be set in an under-drive mode, the drive mode flag FD is set equal to zero. When the power output apparatus 20 is switched from the structure of FIG. 3 to the structure of FIG. 4 to be set in an over-drive mode, on the other hand, the drive mode flag FD is set equal to one.

Figure 3:
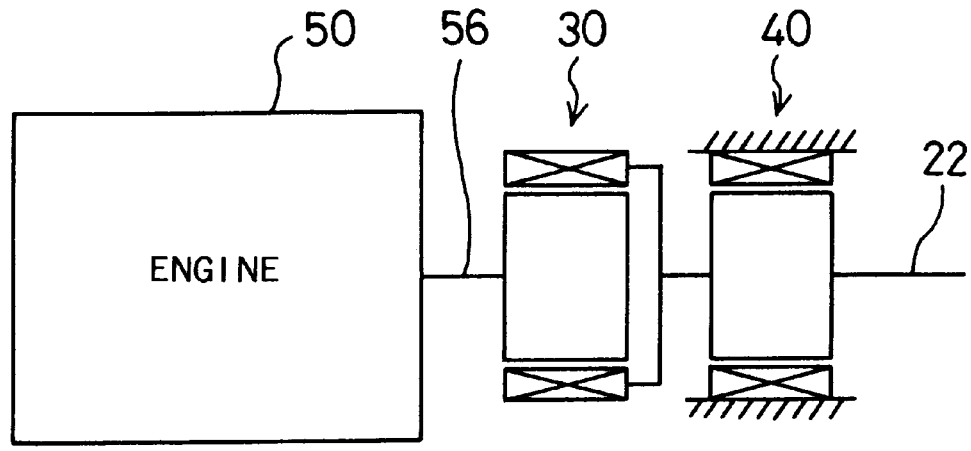
FIG. 3 schematically shows structure of the power output apparatus 20 of the embodiment, wherein a first clutch 45 is in OFF position and a second clutch 46 is in ON position.

In case that the drive mode flag FD is equal to zero, the program determines that the power output apparatus 20 has the structure of FIG. 3 and is set in the under-drive mode. The control CPU 90 sets a torque command value Tc* of the clutch motor 30 according to Equation (1) given below at step S116, and subsequently sets a torque command value Ta* of the assist motor 40 according to Equation (2) given below at step S118. The second term on the right side of Equation (1) is a proportional term to cancel the deviation of the actual revolving speed Ne from the target revolving speed Ne*, and the third term on the right side is an integral term to cancel the stationary deviation. In the stationary state (where the deviation of the actual revolving speed Ne from the target revolving speed Ne* is equal to zero), the target torque Te* of the engine 50 is set to the torque command value Tc* of the clutch motor 30. K1 and K2 in Equation (1) denote proportional constants. The process of setting the torque command value Tc* of the clutch motor 30 based on the revolving speed Ne of the engine 50 and controlling the torque Tc of the clutch motor 30 as the loading torque of the engine 50 enables the engine 50 to be stably driven at the driving point defined by the target torque Te* and the target revolving speed Ne*.

$$Tc^* \leftarrow Te^* + K1(Ne^* - Ne) + K2\int (Ne^* - Ne)dt \quad (1)$$

$$Ta^* \leftarrow Td^* - Tc^* \quad (2)$$

Figure 4:
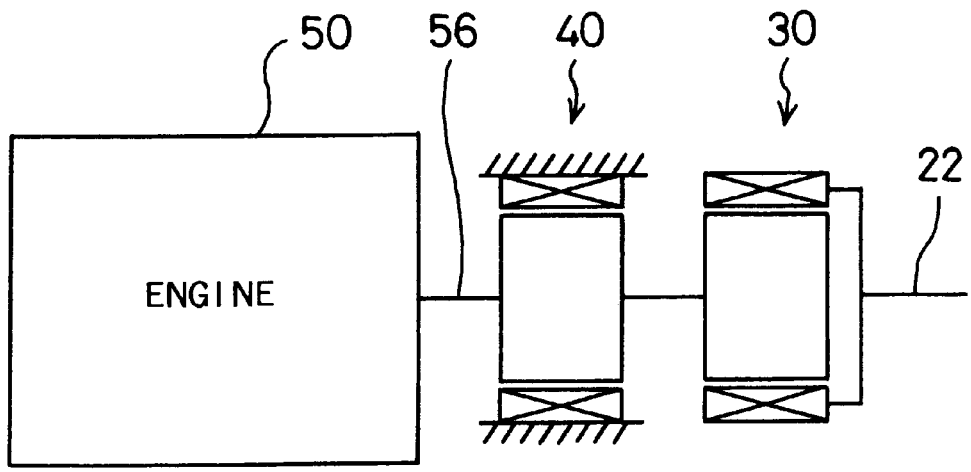
FIG. 4 schematically shows structure of the power output apparatus 20 of the embodiment, wherein the first clutch 45 is in ON position and the second clutch 46 is in OFF position.

In case that the drive mode flag FD is equal to one, on the other hand, the program determines that the power output apparatus 20 has the structure of FIG. 4 and is set in the over-drive mode. The control CPU 90 sets the torque command value Tc* of the clutch motor 30 according to Equation (3) given below at step S120, and subsequently sets the torque command value Ta* of the assist motor 40 according to Equation (4) given below at step S122. The torque command value Td* is set to the torque command value Tc* of the clutch motor 30, since the torque to be output to the drive shaft 22 coincides with the torque Tc output from the clutch motor 30 in the structure of FIG. 4. Like the second term and the third term on the right side of Equation (1), the second term and the third term on the right side of Equation (4) are respectively a proportional term to cancel the deviation of the actual revolving speed Ne from the target revolving speed Ne* and an integral term to cancel the stationary deviation. In the stationary state (where the deviation of the actual revolving speed Ne from the target revolving speed Ne* is equal to zero), the torque command value Ta* of the assist motor 40 is obtained by subtracting the target torque Te* of the engine 50 from the torque command value Td*. K3 and K4 in Equation (4) denote proportional constants. The process of setting the torque command value Ta* of the assist motor 40 based on the revolving speed Ne of the engine 50 and controlling the torque Ta of the assist motor 40 as part of the loading torque of the engine 50 enables the engine 50 to be stably driven at the driving point defined by the target torque Te* and the target revolving speed Ne*.

$$Tc^* \leftarrow Td^* \quad (3)$$

$$Ta^* \leftarrow Td^* - Te^* + K3(Ne^* - Ne) + K4\int (Ne^* - Ne)dt \quad (4)$$

Figure 18:
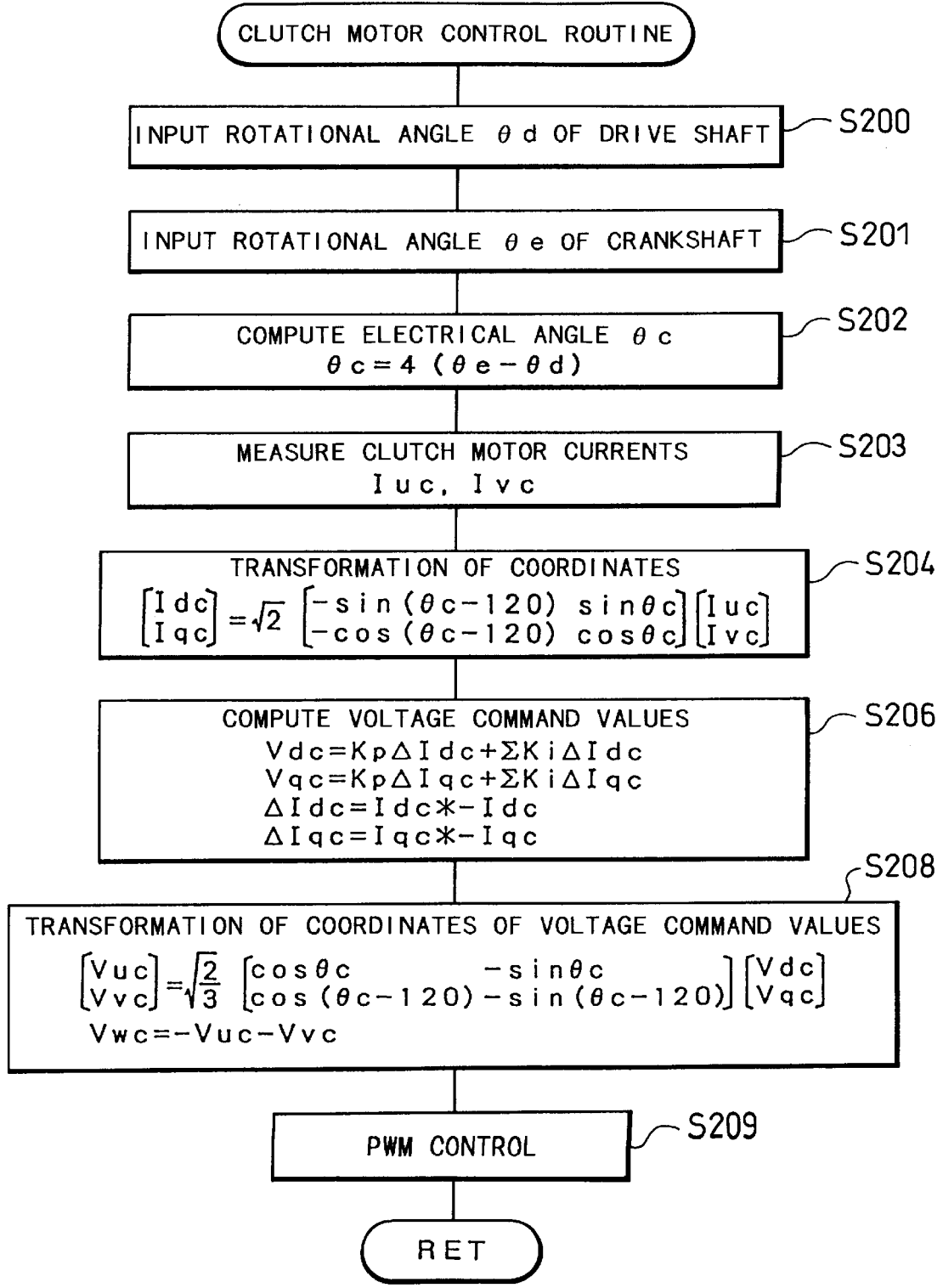
FIG. 18 is a flowchart showing a clutch motor control routine executed by the control CPU 90 of the controller 80.
Figure 19:
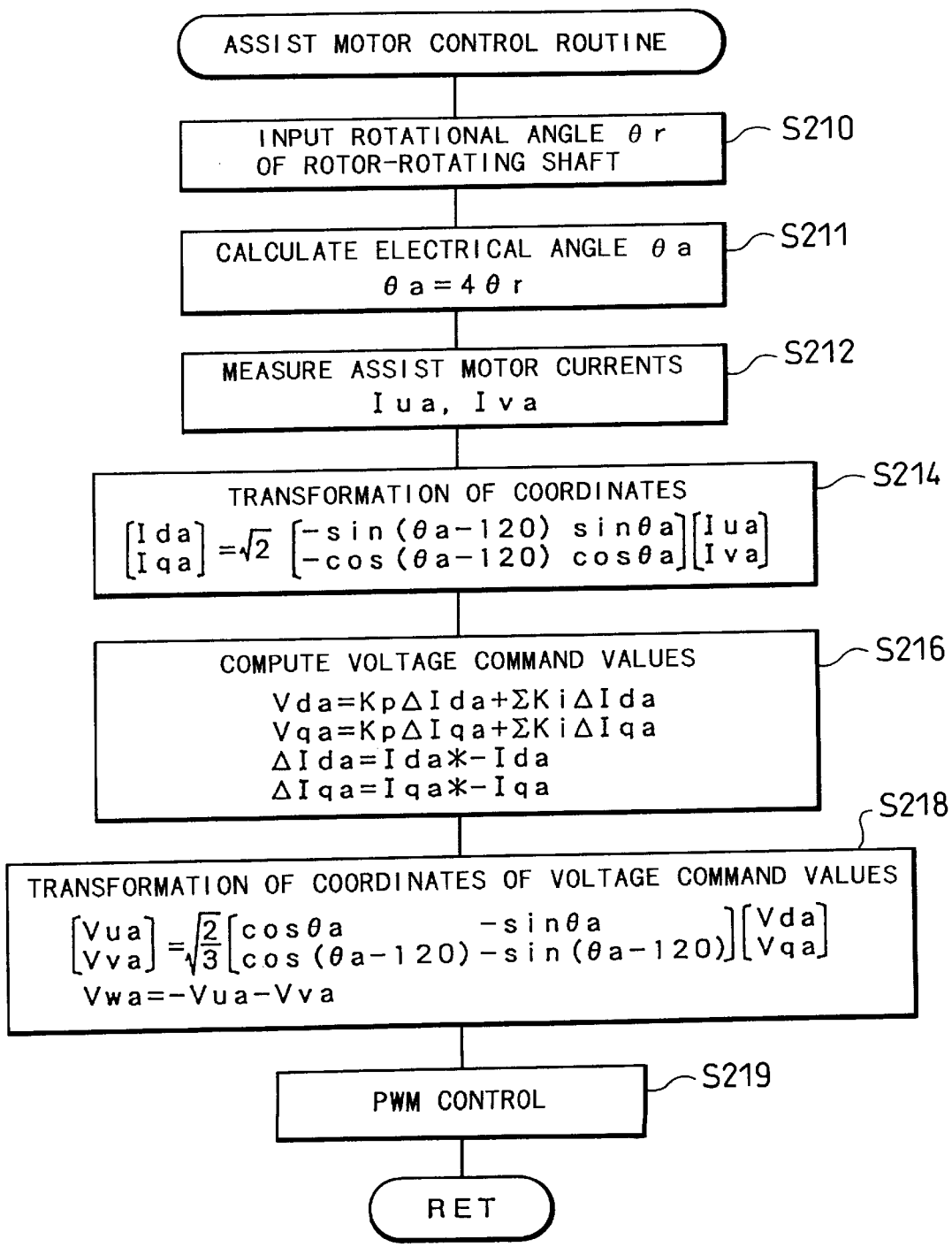
FIG. 19 is a flowchart showing an assist motor control routine executed by the control CPU 90 of the controller 80.

After setting the torque command value Tc* of the clutch motor 30 and the torque command value Ta* of the assist motor 40 in the above manner, the program controls the clutch motor 30 and the assist motor 40 according to a clutch motor control routine shown in the flowchart of FIG. 18 and an assist motor control routine shown in the flowchart of FIG. 19, in order to enable the clutch motor 30 and the assist motor 40 to output the torques corresponding to the torque command values Tc* and Ta*. These routines are executed by the control CPU 90 of the controller 80 at predetermined time intervals (for example, at every 4 msec) by utilizing the interrupting process, independently of but in parallel to the other processing. Although not specifically mentioned below, the routines of FIGS. 18 and 19 are carried out to control the clutch motor 30 and the assist motor 40 immediately after the torque command value Tc* of the clutch motor 30 and the torque command value Ta* of the assist motor 40 are set in the above manner.

When the control of the clutch motor 30 starts, that is, when the program enters the clutch motor control routine of FIG. 18, the control CPU 90 of the controller 80 first reads the rotational angle θd of the drive shaft 22 from the resolver 37 and the rotational angle θe of the crankshaft 56 of the engine 50 from the resolver 57 at steps S200 and S201, respectively. The control CPU 90 subsequently computes an electrical angle θc of the clutch motor 30 from the input rotational angles θe and θd at step S202. A synchronous motor having four pairs of poles is used as the clutch motor 30 in this embodiment, and the electrical angle θc is thus obtained by an equation of θc=4(θe−θd).

At step S203, the control CPU 90 reads the clutch motor currents Iuc and Ivc, which respectively flow through the U phase and V phase of the three-phase coils 34 in the clutch motor 30 and are measured by the ammeters 95 and 96. Although electric current naturally flows through all the three phases U, V, and W, measurement is required only for the electric currents passing through the two phases since the sum of the currents is equal to zero. At subsequent step S204, the control CPU 90 executes transformation of coordinates (three-phase to two-phase transformation) using the values of three-phase electric currents obtained at step S203. The transformation of coordinates maps the values of electric currents flowing through the three phases to the values of electric currents passing through d and q axes of the permanent magnet-type synchronous motor and is implemented by the operation of Equation (5) given below. The transformation of coordinates is carried out because the electric currents flowing through the d and q axes are essential quantities for the torque control in the permanent magnet-type synchronous motor. Alternatively, the torque control may be executed directly with the electric currents flowing through the three phases.

$$\begin{bmatrix} Idc \\ Iqc \end{bmatrix} = \sqrt{2} \begin{bmatrix} -\sin(\theta c - 120) & \sin\theta c \\ -\cos(\theta c - 120) & \cos\theta c \end{bmatrix} \begin{bmatrix} Iuc \\ Ivc \end{bmatrix} \quad (5)$$

After the transformation to the electric currents of two axes, the control CPU 90 computes deviations of electric currents Idc and Iqc actually flowing through the d and q axes from electric current command values Idc* and Iqc* of the respective axes, which are calculated from the torque command value Tc* of the clutch motor 30, and subsequently determines voltage command values Vdc and Vqc with respect to the d and q axes at step S206. In accordance with a concrete procedure, the control CPU 90 executes arithmetic operations of Equations (6) and Equations (7) given below. In Equations (6) and (7), Kp1, Kp2, Ki1, and Ki2 represent coefficients, which are adjusted to be suited to the characteristics of the motor applied. Each voltage command value Vdc (Vqc) includes a part in proportion to the deviation ΔI from the current command value I* (the first term on the right side of Equation (7)) and a summation of historical data of the deviations ΔI for 'i' times (the second term on the right side).

ΔIdc=Idc*−Idc

ΔIqc=Iqc*−Iqc  (6)

Vdc=Kp1·ΔIdc+ΣKi1·ΔIdc

Vqc=Kp2·ΔIqc+ΣKi2·ΔIqc  (7)

The control CPU 90 then re-transforms the coordinates of the voltage command values thus obtained (two-phase to three-phase transformation) at step S208. This corresponds to an inverse of the transformation executed at step S204. The inverse transformation determines voltages Vuc, Vvc, and Vwc actually applied to the three-phase coils 34 as expressed by Equations (8) given below:

$$\begin{bmatrix} Vuc \\ Vvc \end{bmatrix} = \sqrt{\frac{2}{3}} \begin{bmatrix} \cos\theta c & -\sin\theta c \\ \cos(\theta c - 120) & -\sin(\theta c - 120) \end{bmatrix} \begin{bmatrix} Vdc \\ Vqc \end{bmatrix} \quad (8)$$

Vwc=−Vuc−Vvc

The actual voltage control is accomplished by on-off operation of the transistors Tr1 through Tr6 in the first driving circuit 91. At step S209, the on- and off-time of the transistors Tr1 through Tr6 in the first driving circuit 91 is PWM (pulse width modulation) controlled in order to attain the voltage command values Vuc, Vvc, and Vwc determined by Equations (8) above.

The torque command value Tc* of the clutch motor 30 is positive when a positive torque is applied to the drive shaft 22 in the direction of rotation of the crankshaft 56. By way of example, it is assumed that a positive value is set to the torque command value Tc*. When the revolving speed Ne of the engine 50 is higher than the revolving speed Nd of the drive shaft 22 on this assumption, that is, when the revolving speed difference Nc (=Ne−Nd) is positive, the clutch motor 30 is controlled to carry out the regenerative operation and produce a regenerative electric current according to the revolving speed difference Nc. When the revolving speed Ne of the engine 50 is lower than the revolving speed Nd of the drive shaft 22, that is, when the revolving speed difference Nc (=Ne−Nd) is negative, on the contrary, the clutch motor 30 is controlled to carry out the power operation and rotate relative to the crankshaft 56 in the direction of rotation of the drive shaft 22 at a revolving speed defined by the absolute value of the revolving speed difference Nc. For the positive torque command value Tc*, both the regenerative operation and the power operation of the clutch motor 30 implement the identical switching control. In accordance with a concrete procedure, the transistors Tr1 through Tr6 in the first driving circuit 91 are controlled to enable a positive torque to be applied to the drive shaft 22 by the combination of the magnetic field generated by the permanent magnets 32 set on the inner rotor 31 with the revolving magnetic field generated by the electric currents flowing through the three-phase coils 34 wound on the outer rotor 33 of the clutch motor 30. The identical switching control is executed for both the regenerative operation and the power operation of the clutch motor 30 as long as the sign of the torque command value Tc* is not changed. The clutch motor control routine of FIG. 18 is thus applicable to both the regenerative operation and the power operation. Under the condition of braking the drive shaft 22 or moving the vehicle in reverse, the torque command value Tc* has the negative sign. The clutch motor control routine of FIG. 18 is also applicable to the control procedure under such conditions, when the electrical angle θc of the clutch motor 30 obtained at step S202 is varied in the reverse direction.

When the control of the assist motor 40 starts, that is, when the program enters the assist motor control routine of FIG. 19, the control CPU 90 of the controller 80 first reads the rotational angle θr of the rotor-rotating shaft 38 from the resolver 47 at step S210, and calculates an electrical angle θa of the assist motor 40 from the measured rotational angle θr of the rotor-rotating shaft 38 at step S211. In this embodiment, a synchronous motor having four pairs of poles is used as the assist motor 40, and the electrical angle θa is thus obtained by an equation of θa=4θr. The control CPU 90 subsequently receives data of assist motor currents Iua and Iva at step S212, which respectively flow through the U phase and V phase of the three-phase coils 44 in the assist motor 40 and are measured with the ammeters 97 and 98. The control CPU 90 executes transformation of coordinates for the electric currents of the three phases at step S214, computes voltage command values Vda and Vqa at step S216, and executes inverse transformation of coordinates for the voltage command values at step S218. At subsequent step S219, the control CPU 90 determines the on- and off-time of the transistors Tr11 through Tr16 in the second driving circuit 92 for PWM (pulse width modulation) control. The processing executed at steps S214 through S219 is similar to the processing executed at steps S204 through S209 in the clutch motor control routine shown in the flowchart of FIG. 18.

The torque command value Ta* of the assist motor 40 is obtained at step S118 in the flowchart of FIG. 11 by subtracting the torque command value Tc* of the clutch motor 30 from the torque command value Td* or alternatively at step S122 based on the difference between the target engine torque Te* and the torque command value Td* as discussed above, and thereby may be positive or negative. When a positive value is set to the torque command value Ta*, the assist motor 40 carries out the power operation. When a negative value is set to the torque command value Ta*, on the other hand, the assist motor 40 carries out the regenerative operation. Like the control of the clutch motor 30, the assist motor control routine shown in the flowchart of FIG. 19 is applicable to both the power operation and the regenerative operation of the assist motor 40. This is also true when the drive shaft 22 rotates in reverse of the rotation of the crankshaft 56. It is here assumed that the torque command value Ta* of the assist motor 40 is positive when a positive torque is applied to the drive shaft 22 in the direction of rotation of the crankshaft 56.

According to the torque control routine discussed above, the power output apparatus 20 of the first embodiment has the structure of FIG. 3 to be driven in the under-drive mode, or alternatively has the structure of FIG. 4 to be driven in the over-drive mode. The torque control routine causes the energy Pe output from the engine 50 to be subjected to torque conversion by the clutch motor 30 and the assist motor 40 and output as a torque corresponding to the torque command value Td* to the drive shaft 22 rotating at the revolving speed Nd.

Figure 12:
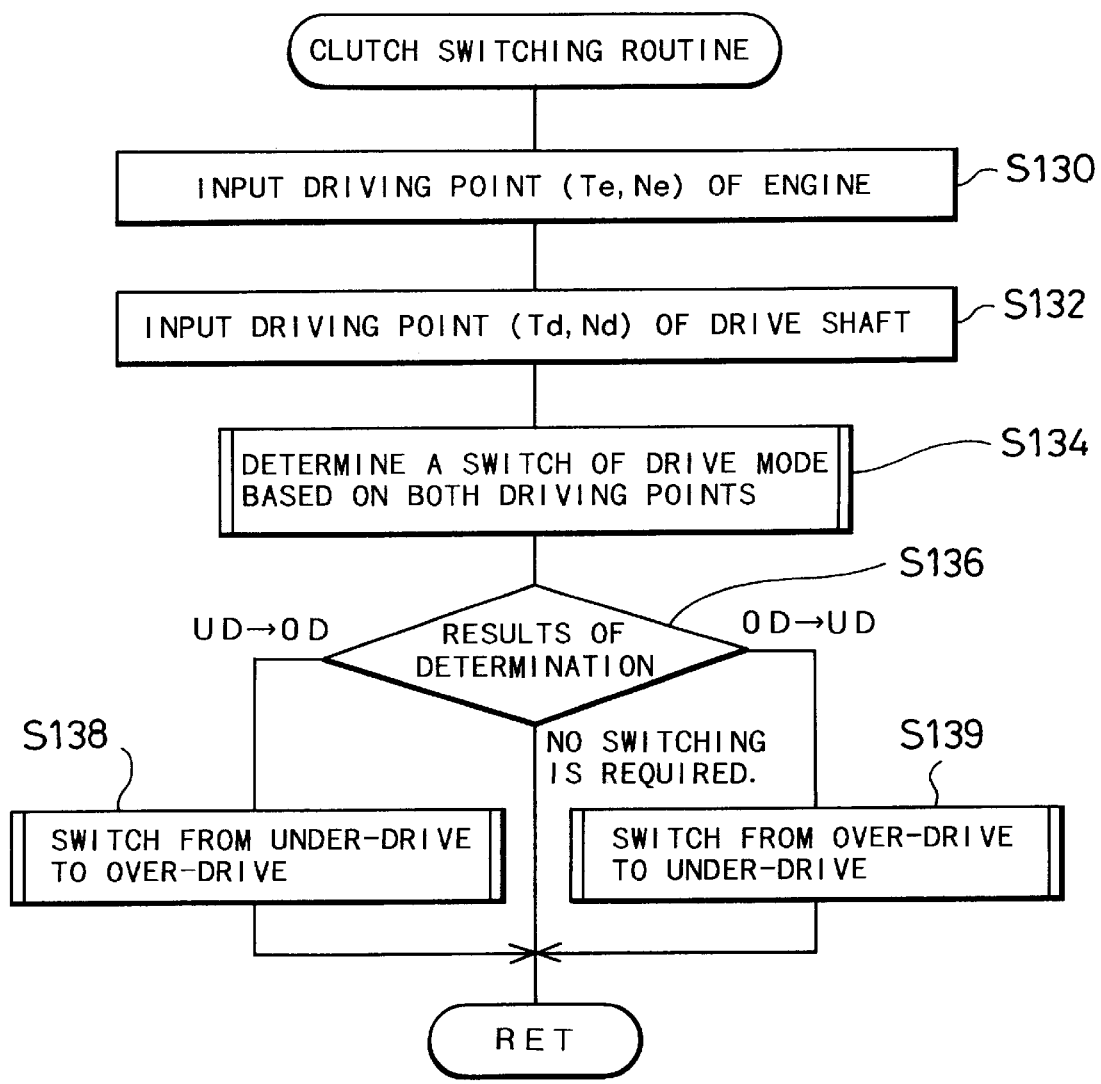
FIG. 12 is a flowchart showing a clutch switching routine executed by the control CPU 90 of the controller 80.

The switching control of the drive mode follows the clutch switching routine shown in the flowchart of FIG. 12. This routine is repeatedly executed at predetermined time intervals (for example, at every 20 msec) after the power output apparatus 20 of the embodiment has been activated. When the program enters the routine of FIG. 12, the control CPU 90 of the controller 80 first reads the driving points of the engine 50 and the drive shaft 22 at steps S130 and S132. The driving points of the engine 50 and the drive shaft 22 are respectively defined by the revolving speed and the torque thereof. Reading the driving point of the engine 50 thus implies reading the revolving speed Ne and the output torque Te of the engine 50. Similarly reading the driving point of the drive shaft 22 implies reading the revolving speed Nd and the output torque Td of the drive shaft 22.

When the power output apparatus 20 has the structure of FIG. 3 to be set in the under-drive mode, since the torque Tc of the clutch motor 30 corresponds to the loading torque of the engine 50, the torque command value Tc* is substituted for the torque Te of the engine 50. When the power output apparatus 20 has the structure of FIG. 4 to be set in the over-drive mode, on the other hand, since the difference obtained by subtracting the torque Ta of the assist motor 40 from the torque Tc of the clutch motor 30 corresponds to the loading torque of the engine 50, the difference obtained by subtracting the torque command value Ta* from the torque command value Tc* is substituted for the torque Te of the engine 50. When the power output apparatus 20 has the structure of FIG. 3 to be set in the under-drive mode, since the torque Td corresponds to the sum of the torque Tc of the clutch motor 30 and the torque Ta of the assist motor 40, the sum of the torque command value Tc* and the torque command value Ta* is substituted for the torque Td of the drive shaft 22. When the power output apparatus 20 has the structure of FIG. 4 to be set in the over-drive mode, on the other hand, since the torque Td corresponds to the torque Tc of the clutch motor 30, the torque command value Tc* is substituted for the torque Td of the drive shaft 22. In this embodiment, the values based on the torque command values Tc* and Ta* of the clutch motor 30 and the assist motor 40 are substituted for the torque Te of the engine 50 and the torque Td of the drive shaft 22. Another possible structure may use strain sensors attached to the crankshaft 56 and the drive shaft 22 and directly measure the torques Te and Td. In case that both the driving condition of the engine 50 and the driving condition of the drive shaft 22 are in the stationary state or at least sufficiently close to the stationary state, the target engine torque Te* may be substituted for the torque Te of the engine 50 and the torque command value Td* may be substituted for the torque Td of the drive shaft 22.

Figure 20:
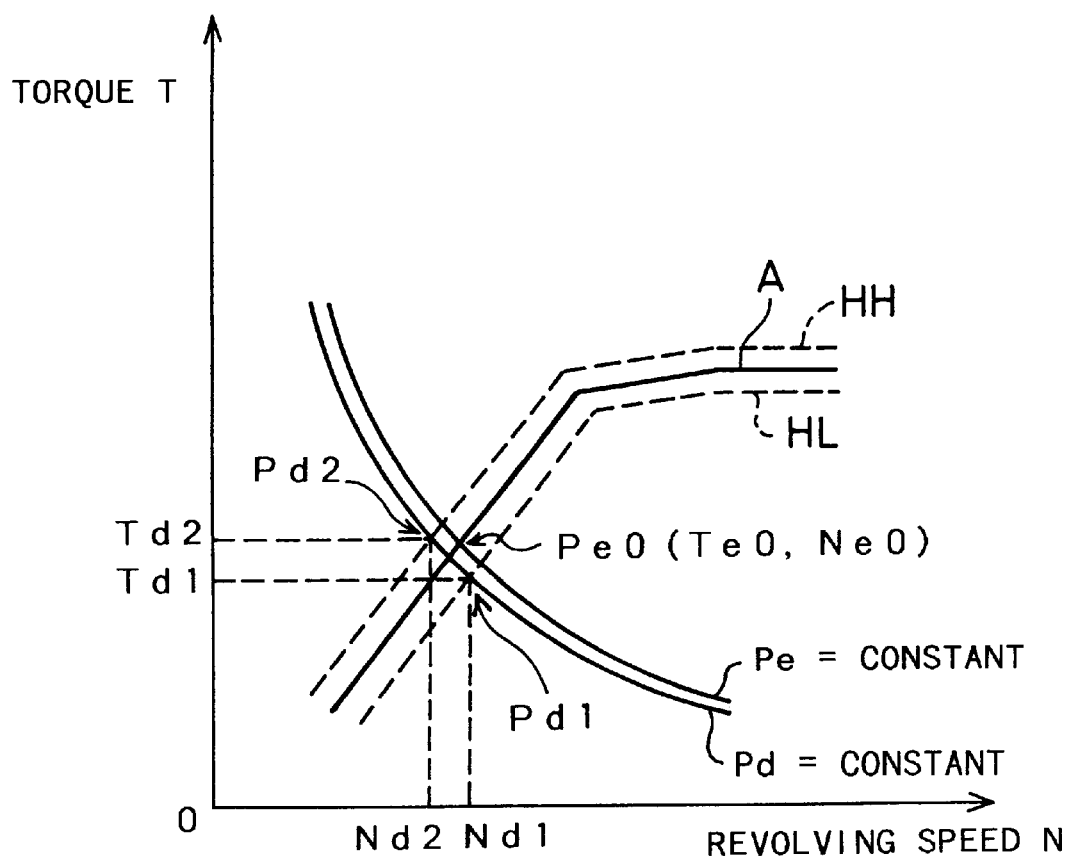
FIG. 20 shows a procedure of determining whether or not a switch of the drive mode is required.

After reading the driving points of the engine 50 and the drive shaft 22, the control CPU 90 determines whether or not a switch of the drive mode is required, based on the input driving points at step S134. FIG. 20 shows a procedure of determining whether or not a switch of the drive mode is required. A curve A in FIG. 20 is identical with the working curve A of the engine 50 shown in the graph of FIG. 16. A curve of broken line HL represents the points for switching from the under-drive mode to the over-drive mode, whereas another curve of broken line HH represents the points for switching from the over-drive mode to the under-drive mode. A curve Pd is a constant energy curve where the energy Pd to be output to the drive shaft 22 is constant, and another curve Pe is a constant energy curve where the energy Pe to be output from the engine 50 for the purpose of outputting the energy Pd to the drive shaft 22 is constant. For the clarity of explanation, it is here assumed that the engine 50 is driven at a driving point Pe0 on the working curve A and that the drive shaft 22 is driven at one driving point along the curve Pd.

In one state, the power output apparatus 20 has the structure of FIG. 3 and is set in the under-drive mode. As discussed previously in FIGS. 5 through 8, the under-drive mode is adopted basically when the revolving speed Ne of the engine 50 is greater than the revolving speed Nd of the drive shaft 22. The drive shaft 22 is accordingly driven at a driving point, which is located on the curve Pd and exists on the upper left side of the working curve A of the engine 50 in the graph of FIG. 20. The structure of this embodiment determines that a switch from the under-drive mode to the over-drive mode is required, when the driving point of the drive shaft 22 under the above conditions crosses the working curve A and reaches a driving point Pd1 or when the driving point of the drive shaft 22 is changed to a point below the driving point Pd1 in the under-drive mode. In another state, the power output apparatus 20 has the structure of FIG. 4 and is set in the over-drive mode. The structure of this embodiment determines that a switch from the over-drive mode to the under-drive mode is required, when the driving point of the drive shaft 22, which is located on the curve Pd and exists on the lower right side of the working curve A of the engine 50 in the graph of FIG. 20, crosses the working curve A and reaches a driving point Pd2 or when the driving point of the drive shaft 22 is changed to a point above the driving point Pd2 in the over-drive mode.

Switching the drive mode when the driving point of the drive shaft 22 crosses the working curve A of the engine 50 sets a hysteresis to the switch of the drive mode. This structure effectively prevents the drive mode from being frequently changed even when the drive shaft 22 is driven at the driving point close to the point of switching the drive mode. The range of the hysteresis depends upon, for example, the service properties of the vehicle, on which the power output apparatus 20 is mounted.

Referring back to the clutch switching routine of FIG. 12, when it is determined that a switch of the drive mode is not required at step S136, the program exits from this routine. When it is determined that a switch from the under-drive mode to the over-drive mode is required at step S136, on the other hand, the program carries out a switching process from the under-drive mode to the over-drive mode at step S138 according to the flowchart of FIG. 13. When it is determined that a switch from the over-drive mode to the under-drive mode is required at step S136, the program carries out a switching process from the over-drive mode to the under-drive mode at step S139 according to the flowchart of FIG. 14. After the switching process, the program exits from this routine. The following describes these switching processes.

Figure 13:
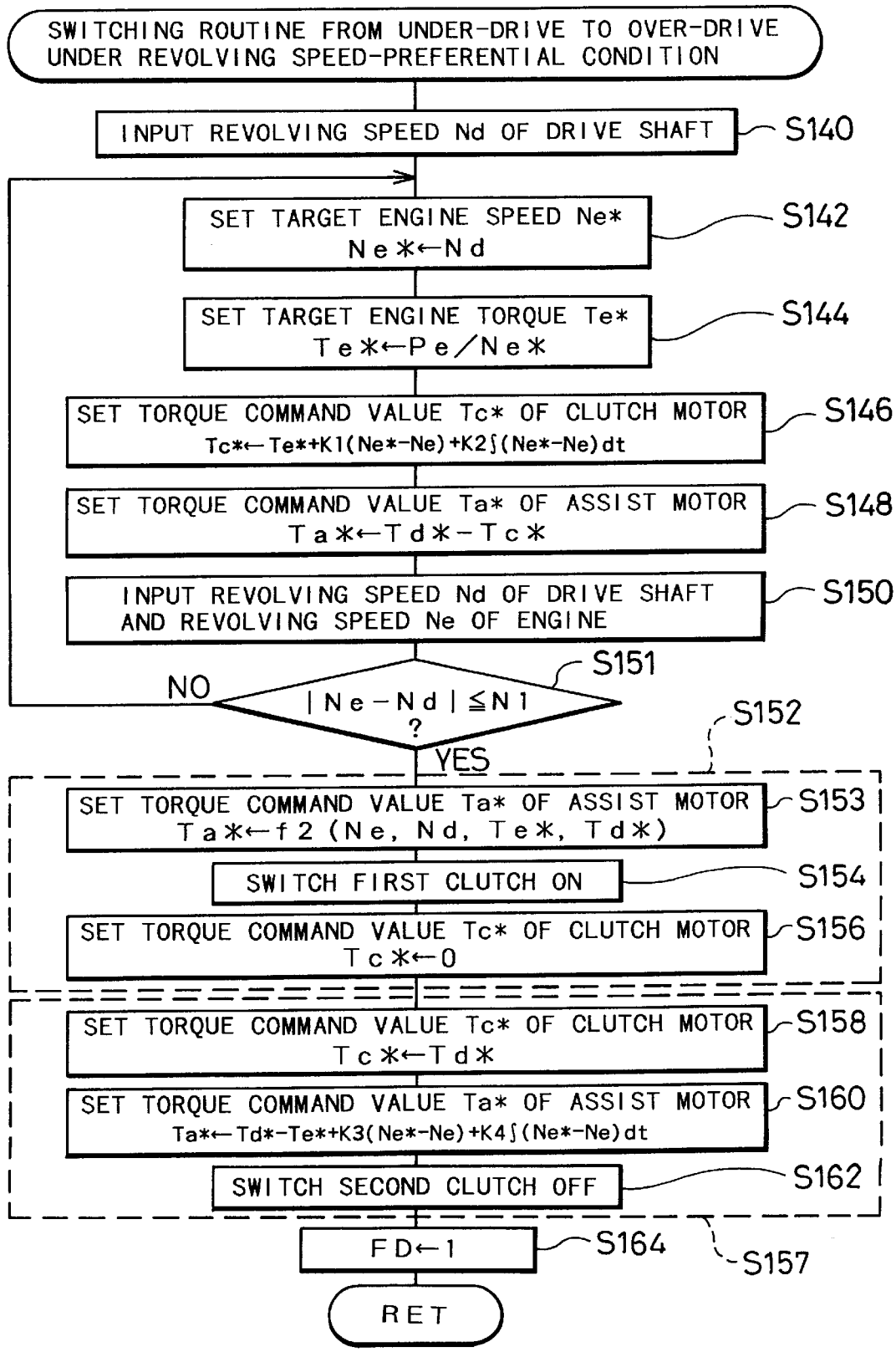
FIG. 13 is a flowchart showing a switching routine from an under-drive state to an over-drive state under a revolving speed-preferential condition executed by the control CPU 90 of the controller 80 in the first embodiment.

When the switching process from the under-drive mode to the over-drive mode starts, that is, when the program enters the switching routine from the under-drive state to the over-drive state under the revolving speed-preferential condition shown in the flowchart of FIG. 13, the control CPU 90 of the controller 80 first reads the revolving speed Nd of the drive shaft 22 at step S140. The control CPU 90 then sets the input revolving speed Nd to the target revolving speed Ne* of the engine 50 at step S142, divides the energy Pe by the target revolving speed Ne* to set the target torque Te* of the engine 50 at step S144, and sets the torque command value Tc* of the clutch motor 30 and the torque command value Ta* of the assist motor 40 according to Equations (1) and (2) given above at steps S146 and S148. Such setting enables the engine 50 to be driven at the revolving speed that is identical with the revolving speed of the drive shaft 22 while outputting the energy Pe, through the control of the clutch motor 30 (FIG. 18), the control of the assist motor 40 (FIG. 19), and the control of the engine 50 by the EFIECU 70, which are carried out independently of but in parallel to this switching routine. The control CPU 90 subsequently reads the revolving speed Nd of the drive shaft 22 and the revolving speed Ne of the engine 50 at step S150, and determines whether or not the difference between the input revolving speed Nd of the drive shaft 22 and the input revolving speed Ne of the engine 50 is not greater than a threshold value N1 at step S151. The threshold value N1 is set equal to or a little smaller than a maximum revolving speed difference that makes the torque shock, which occurs on the drive shaft 22 based on the revolving speed difference when the first clutch 45 is changed from the OFF position to the ON position to connect the crankshaft 56 with the drive shaft 22, within an allowable range.

In case that the difference between the revolving speed Ne of the engine 50 and the revolving speed Nd of the drive shaft 22 is greater than the threshold value N1, the program repeats the processing of steps S142 through S150 until the difference becomes not greater than the threshold value N1. The revolving speed Nd of the drive shaft 22 may vary in the course of the repeated processing. The revolving speed Nd of the drive shaft 22 read at step S150 is, however, set to the target revolving speed Ne* of the engine 50 at step S142, so that the difference between the revolving speed Ne of the engine 50 and the revolving speed Nd of the drive shaft 22 eventually converges to be not greater than the threshold value N1.

Figure 9:
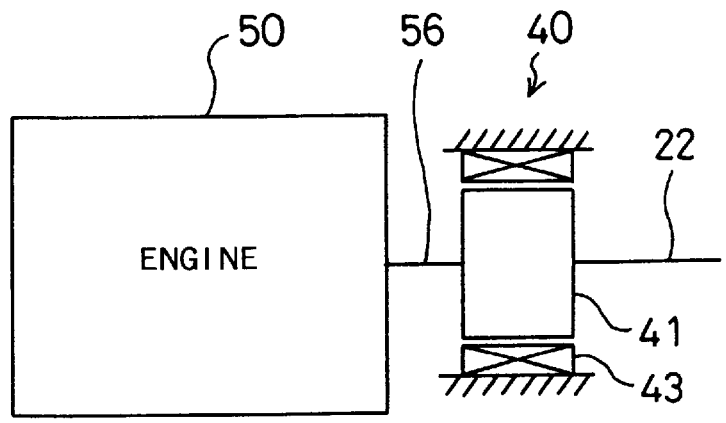
FIG. 9 schematically shows structure of the power output apparatus 20 of the embodiment, wherein both the first clutch 45 and the second clutch 46 are in ON position.

In case that the difference between the revolving speed Ne of the engine 50 and the revolving speed Nd of the drive shaft 22 becomes not greater than the threshold value N1, the control CPU 90 specifies a torque to cancel the torque shock occurring on the drive shaft 22 when the first clutch 45 is set in the ON position and the power output apparatus 20 has the structure of FIG. 9, based on the difference between the revolving speed Ne of the engine 50 and the revolving speed Nd of the drive shaft 22 as well as the torque Te output from the engine 50 and the torque Td output to the drive shaft 22, and sets the specified torque to the torque command value Ta* of the assist motor 40 at step S153. When the difference between the revolving speed Ne of the engine 50 and the revolving speed Nd of the drive shaft 22 becomes not greater than the threshold value N1 under the output condition of the energy Pe or even when the revolving speed Ne of the engine 50 perfectly coincides with the revolving speed Nd of the drive shaft 22, there is a difference between the torque Te output from the engine 50 and the torque Td output to the drive shaft 22 since the energy Pe of the engine 50 is set by taking into account the losses of the clutch motor 30 and the assist motor 40. When the first clutch 45 is in the ON position, the torque shock based on the revolving speed difference and the torque difference between the crankshaft 56 and the drive shaft 22 accordingly occurs on the drive shaft 22.

In this embodiment, the torque shock occurring on the drive shaft 22 is experimentally determined for each combination of the revolving speed Ne of the engine 50, the revolving speed Nd of the drive shaft 22, the torque Te output from the engine 50, and the torque Td output to the drive shaft 22, and the mean torque shock over the time with respect to each combination is stored in advance as a map into the ROM 90b. A concrete procedure of step S153 reads the mean torque shock on the drive shaft 22 corresponding to the revolving speed Ne of the engine 50, the revolving speed Nd of the drive shaft 22, the torque Te output from the engine 50, and the torque Td output to the drive shaft 22 from the map stored in the ROM 90b and sets the mean torque shock to the torque command value Ta* of the assist motor 40. The structure of this embodiment uses the target engine torque Te* and the torque command value Td* at step S153, instead of directly measuring the torque Te output from the engine 50 and the torque Td output to the drive shaft 22. Another possible structure may directly measure these torques with torque detection sensors, such as strain sensors.

Synchronously with the output of the torque for canceling the torque shock from the assist motor 40, the control CPU 90 switches the first clutch 45 to the ON position at step S154, and sets the torque command value Tc* of the clutch motor 30 equal to zero at step S156. Although these three steps are shown as separate steps in the flowchart of FIG. 13 for the convenience of illustration, these are carried out synchronously at an appropriate timing. The series of steps are thus surrounded by a broken line and defined as step S152 in FIG. 13. The power output apparatus 20 in the under-drive state has the structure of FIG. 3 where the second clutch 46 is set in the ON position. The switching operation of the first clutch 45 to the ON position connects the crankshaft 56 with the drive shaft 22 and causes the power output from the engine 50 to be directly output to the drive shaft 22. The torque command value Tc* of the clutch motor 30 is set equal to zero simultaneously with the switching operation of the first clutch 45 to the ON position, because of the following reason. Connection of the crankshaft 56 with the drive shaft 22 does not allow the relative rotations of the inner rotor 31 and the outer rotor 33 in the clutch motor 30. The output of the torque from the clutch motor 30 accordingly does not result in outputting the torque to the drive shaft 22, but wastes the electric power and lowers the energy efficiency of the whole power output apparatus 20. While the revolving speed Ne of the engine 50 is substantially identical with the revolving speed Nd of the drive shaft 22, there is a little difference between the torque Te output from the engine 50 and the torque Td output to the drive shaft 22. Some torque change accordingly occurs on the drive shaft 22 in response to the switching operation of the first clutch 45 to the ON position. This torque change is, however, sufficiently small and does not significantly affect the ride.

The control CPU 90 then sets the torque command value Tc* of the clutch motor 30 and the torque command value Ta* of the assist motor 40 according to Equations (3) and (4) given above at steps S158 and S160, and switches the second clutch 46 to the OFF position synchronously with the output of the torques corresponding to the preset torque command values Tc* and Ta* from the clutch motor 30 and the assist motor 40 at step S162. This procedure causes the power output apparatus 20 to have the structure of FIG. 4 and to be set in the over-drive state. These three steps are also carried out synchronously at an appropriate timing and are thus surrounded by a broken line and defined as step S157 in FIG. 13. The program sets the value '1' representing the over-drive mode to the dive mode flag FD at step S164, before exiting from this routine.

Figure 21:
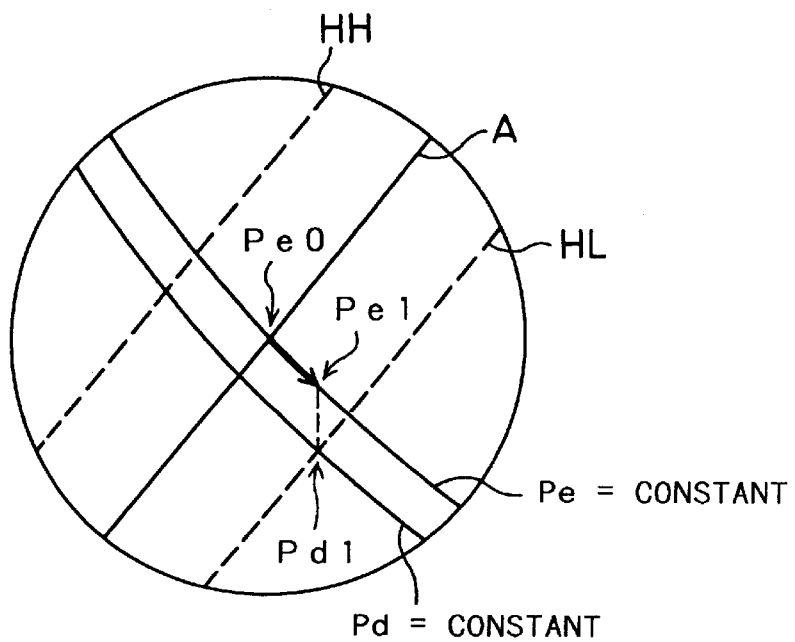
FIG. 21 shows a process of switching the drive mode according to the routine of FIG. 13.

FIG. 21, which is an expanded portion of FIG. 20 in the vicinity of the driving point Pe0, shows a process of switching from the under-drive mode to the over-drive mode according to the routine of FIG. 13. The switch from the under-drive mode to the over-drive mode is carried out when the driving point of the drive shaft 22 crosses the working curve A to reach the broken line HL or even goes beyond the broken line HL as mentioned above. It is here assumed that the engine 50 is driven at the driving point Pe0 and that the driving point of the drive shaft 22 is varied along the curve Pd. The drive mode is switched when the driving point of the drive shaft 22 reaches the driving point Pd1. The switching operation of FIG. 13 carries out the control, so as to enable the engine 50 to make its revolving speed Ne coincident with the revolving speed Nd of the drive shaft 22, while outputting the energy Pe. The driving state of the engine 50 is accordingly changed from the driving point Pe0 to a driving point Pe1 having the same revolving speed as the revolving speed Nd of the drive shaft 22 via a pathway shown by the arrow. When the driving state of the engine 50 reaches the driving point Pe1, the first clutch 45 is switched to the ON position to connect the crankshaft 56 with the drive shaft 22 and enable the power output from the engine 50 to be directly output to the drive shaft 22. There is a torque difference between the torque Te output from the engine 50 and the torque Td output to the drive shaft 22, which is expressed as a linear distance between the driving point Pe1 and the driving point Pd1. Part of the torque difference is output to the drive shaft 22 as a small torque shock, in response to the switching operation of the first clutch 45 to the ON position. This torque shock is, however, cancelled by the torque output from the assist motor 40. The second clutch 46 is then switched to the OFF position to disconnect the crankshaft 56 from the drive shaft 22. This causes the power output apparatus 20 to have the structure of FIG. 4 and to be set in the over-drive mode. In response to the switching operation of the second clutch 46 to the OFF position, the control procedure returns the driving state of the engine 50 to the driving point Pe0 via the driving point Pe1.

Figure 14:
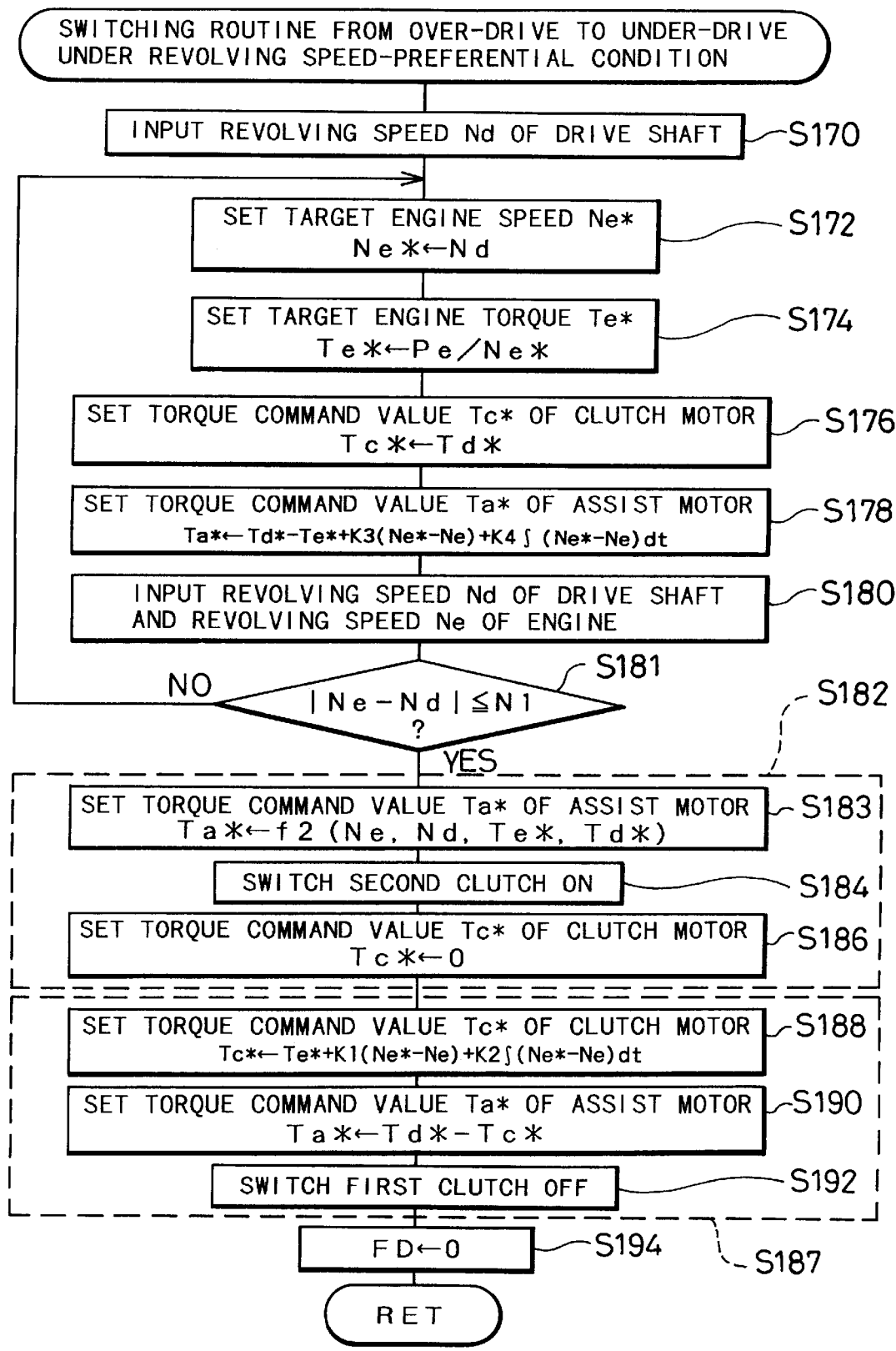
FIG. 14 is a flowchart showing a switching routine from the over-drive state to the under-drive state under the revolving speed-preferential condition executed by the control CPU 90 of the controller 80 in the first embodiment.

The switching process from the over-drive mode to the under-drive mode follows the switching routine from the over-drive state to the under-drive state under the revolving speed-preferential condition shown in the flowchart of FIG. 14. The switching process from the over-drive mode to the under-drive mode is similar to the switching process from the under-drive mode to the over-drive mode shown in FIG. 13, except some differences given below. The switching operation of the first clutch 45 to the ON position at step S154 in the flowchart of FIG. 13 is replaced by the switching operation of the second clutch 46 to the ON position at step S184 in the flowchart of FIG. 14, whereas the switching operation of the second clutch 46 to the OFF position at step S162 is replaced by the switching operation of the first clutch 45 to the OFF position at step S192. The procedure of FIG. 14 sets the torque command values Tc* and Ta* of the clutch motor 30 and the assist motor 40 according to Equations (3) and (4) at steps S176 and S178, while the procedure of FIG. 13 sets the torque command values Tc* and Ta* according to Equations (1) and (2) at steps S146 and S148. On the contrary, the procedure of FIG. 14 sets the torque command values Tc* and Ta* of the clutch motor 30 and the assist motor 40 according to Equations (1) and (2) at steps S188 and S190, while the procedure of FIG. 13 sets the torque command values Tc* and Ta* according to Equations (3) and (4) at steps S158 and S160. Instead of the value '1' representing the over-drive mode, the value '0' representing the under-drive mode is set to the drive mode flag FD at step S194. The details of the processing are not specifically described here.

Figure 22:
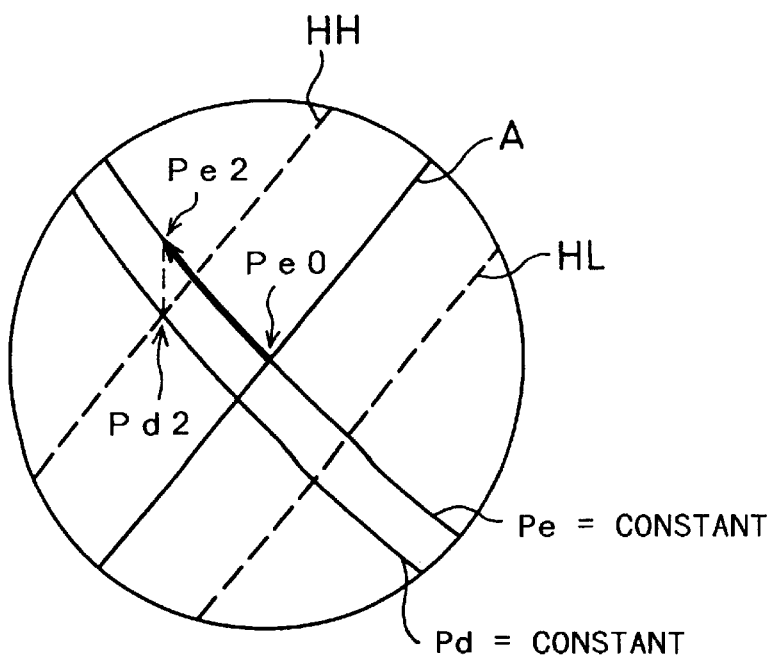
FIG. 22 shows a process of switching the drive mode according to the routine of FIG. 14.

FIG. 22 shows a process of switching from the over-drive mode to the under-drive mode according to the routine of FIG. 14. It is here assumed that the engine 50 is driven at the driving point Pe0 and that the driving point of the drive shaft 22 is varied along the curve Pd. The switch from the over-drive mode to the under-drive mode is carried out when the driving point of the drive shaft 22 reaches the driving point Pd2. The switching operation of FIG. 14 carries out the control, so as to enable the engine 50 to make its revolving speed Ne coincident with the revolving speed Nd of the drive shaft 22, while outputting the energy Pe. The driving state of the engine 50 is accordingly changed from the driving point Pe0 to a driving point Pe2 having the same revolving speed as the revolving speed Nd of the drive shaft 22 via a pathway shown by the arrow. When the driving state of the engine 50 reaches the driving point Pe2, the second clutch 46 is switched to the ON position to connect the crankshaft 56 with the drive shaft 22 and enable the power output from the engine 50 to be directly output to the drive shaft 22. There is a torque difference between the torque Te output from the engine 50 and the torque Td output to the drive shaft 22, which is expressed as a linear distance between the driving point Pe2 and the driving point Pd2. Part of the torque difference is output to the drive shaft 22 as a small torque shock, in response to the switching operation of the second clutch 46 to the ON position. This torque shock is, however, cancelled by the torque output from the assist motor 40. The first clutch 45 is then switched to the OFF position to disconnect the crankshaft 56 from the drive shaft 22. This causes the power output apparatus 20 to have the structure of FIG. 3 and to be set in the under-drive mode. In response to the switching operation of the first clutch 45 to the OFF position, the control procedure returns the driving state of the engine 50 to the driving point Pe0 via the driving point Pe2.

This structure enables the power output apparatus 20 to be smoothly switched between the state of FIG. 3 in the under-drive mode and the state of FIG. 4 in the over-drive mode. The switch of the drive mode is implemented via the process of making the revolving speed Ne of the engine 50 coincident with the revolving speed Nd of the drive shaft 22 and connecting the crankshaft 56 with the drive shaft 22. The power can thus be output to the drive shaft 22 even in the course of switching the drive mode.

The power output apparatus 20 of the embodiment carries out the switching operation between the under-drive mode and the over-drive mode, based on the driving points of the engine 50 and the drive shaft 22. A hysteresis is set to the determination for a switch of the drive mode. The hysteresis effectively prevents the drive mode from being frequently changed even when the drive shaft 22 is driven at the driving point close to the point of switching the drive mode.

While the crankshaft 56 is connected with the drive shaft 22, the power output apparatus 20 of the embodiment controls the clutch motor 30 not to output the torque. This structure effectively prevents the clutch motor 30 from wasting the electric power to output the torque that is not output to the drive shaft 22, thereby improving the energy efficiency of the whole power output apparatus 20.

When the first clutch 45 is set in the ON position and the power output apparatus 20 has the structure of FIG. 9, the assist motor 40 outputs a torque to cancel the torque shock. This structure reduces the possible torque shock on the drive shaft 22 and thereby improves the ride.

The power output apparatus 20 of the embodiment can output the power from the engine 50 to the drive shaft 22 with a high efficiency. The engine 50 is driven at the driving point of highest possible efficiency. This further enhances the energy efficiency of the whole power output apparatus 20.

The power output apparatus 20 of the embodiment uses the map of the driving point defined by the revolving speed and the torque to determine whether or not a switch of the drive mode is required. Another possible procedure may use a map set by only the revolving speed or a map set by only the torque.

In the power output apparatus 20 of the embodiment, a hysteresis is set to the map used for the determination of whether or not a switch of the drive mode is required. Another possible procedure may not set any hysteresis to the map. By way of example, it is determined that a switch of the drive mode is required when the driving state of the drive shaft 22 reaches a driving point on the working curve A.

When the driving state of the drive shaft 22 reaches the preset driving point for switching the drive mode, the power output apparatus 20 of the embodiment controls the engine 50, the clutch motor 30, and the assist motor 40, so as to cause the revolving speed Ne of the engine 50 to coincide with the revolving speed Nd of the drive shaft 22, and switches the drive mode. Another possible procedure may switch the drive mode when the revolving speed Nd of the drive shaft 22 coincides with the revolving speed Ne of the engine 50, without setting the driving point for a switch of the drive mode or carrying out the control to make the revolving speed Ne of the engine 50 coincident with the revolving speed Nd of the drive shaft 22.

Figure 23:
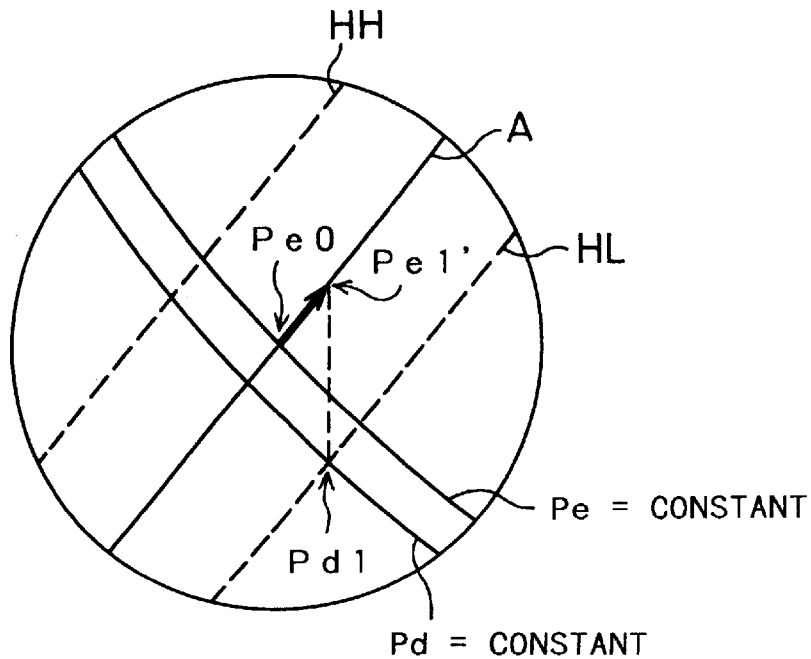
FIG. 23 shows a process of switching the drive mode by shifting the driving point of the engine 50 on the working curve A of the engine 50.
Figure 24:
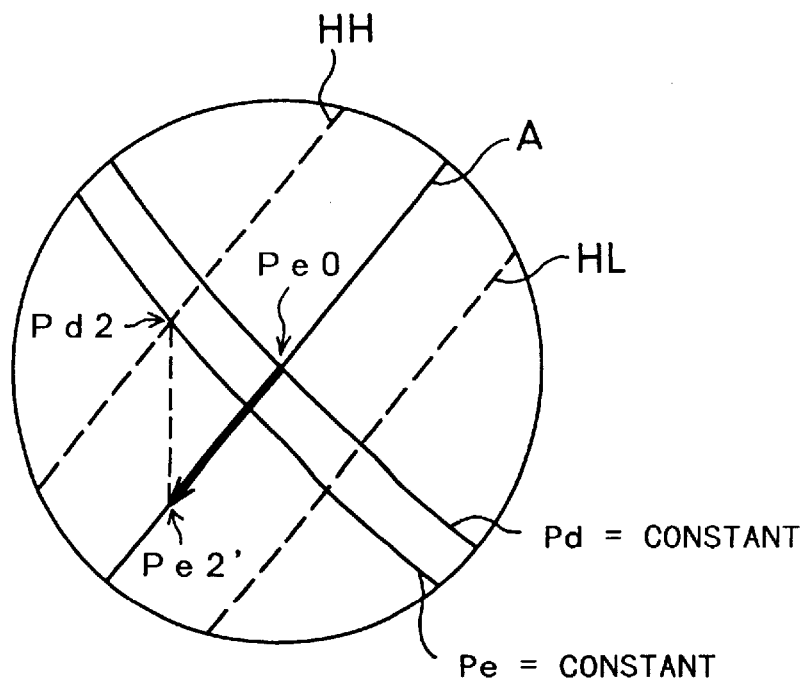
FIG. 24 shows a process of switching the drive mode by shifting the driving point of the engine 50 on the working curve A of the engine 50.

When the driving state of the drive shaft 22 reaches the driving point for switching the drive mode, the power output apparatus 20 of the embodiment carries out the control, so as to enable the engine 50 to make its revolving speed Ne coincident with the revolving speed Nd of the drive shaft 22, while outputting the energy Pe. Another control procedure may control the engine 50, in order to enable the revolving speed Ne of the engine 50 to coincide with the revolving speed Nd of the drive shaft 22 on the working curve A. In this case, the process of setting the target engine torque Te* at step S144 in the routine of FIG. 13 and at step S174 in the routine of FIG. 14 is replaced by the process of reading the torque corresponding to the revolving speed Nd at the driving point on the working curve A from the map of FIG. 16 and setting the torque to the target engine torque Te*. Under the control to make the revolving speed Ne of the engine 50 coincident with the revolving speed Nd of the drive shaft 22 on the working curve A, FIG. 23 shows a process of switching from the under-drive mode to the over-drive mode, and FIG. 24 shows a process of switching from the over-drive mode to the under-drive mode. As clearly shown by the comparison between FIGS. 23 and 24 and FIGS. 21 and 22, the torque shock occurring on the drive shaft 22 in response to the switching operation is a little greater in the switching process through the control to make the revolving speed Ne of the engine 50 coincident with the revolving speed Nd of the drive shaft 22 on the working curve A. This effect can, however, be reduced by the torque output from the assist motor 40 to cancel the torque shock.

In the power output apparatus 20 of the first embodiment, a switch of the drive mode is carried out when the revolving speed Ne of the engine 50 becomes substantially equal to the revolving speed Nd of the drive shaft 22, that is, when the revolving speed difference becomes not greater than the threshold value N1. Since the torque shock occurring on the drive shaft 22 in the course of changing the structure of the power output apparatus 20 to the state of FIG. 9 can be cancelled by the torque output from the assist motor 40, a relatively large value may be set to the threshold value N1. Some control procedure of the assist motor 40 may not even require any threshold value N1. In this case, the drive mode can be switched without causing a large torque shock, even when the revolving speed Ne of the engine 50 does not coincide with the revolving speed Nd of the drive shaft 22.

The following describes a power output apparatus 20B as a second embodiment according to the present invention. The power output apparatus 20B of the second embodiment has the same hardware structure as that of the power output apparatus 20 of the first embodiment. The constituents of the power output apparatus 20B of the second embodiment that are identical with those of the power output apparatus 20 of the first embodiment are accordingly shown by like numerals and not specifically described here. The numerals and symbols used in the description of the first embodiment have the same meanings in the description of the second embodiment, unless otherwise specified.

The torque control and the switching control of the drive mode executed in the power output apparatus 20B of the second embodiment respectively follow the torque control routine of FIG. 11 and the clutch switching routine of FIG. 12 discussed in the first embodiment. In the clutch switching routine of FIG. 12, however, the switching process from the under-drive mode to the over-drive mode at step S138 and the switching process from the over-drive mode to the under-drive mode at step S139 follow a switching routine from the under-drive state to the over-drive state under a torque-preferential condition shown in the flowchart of FIG.

Figure 25:
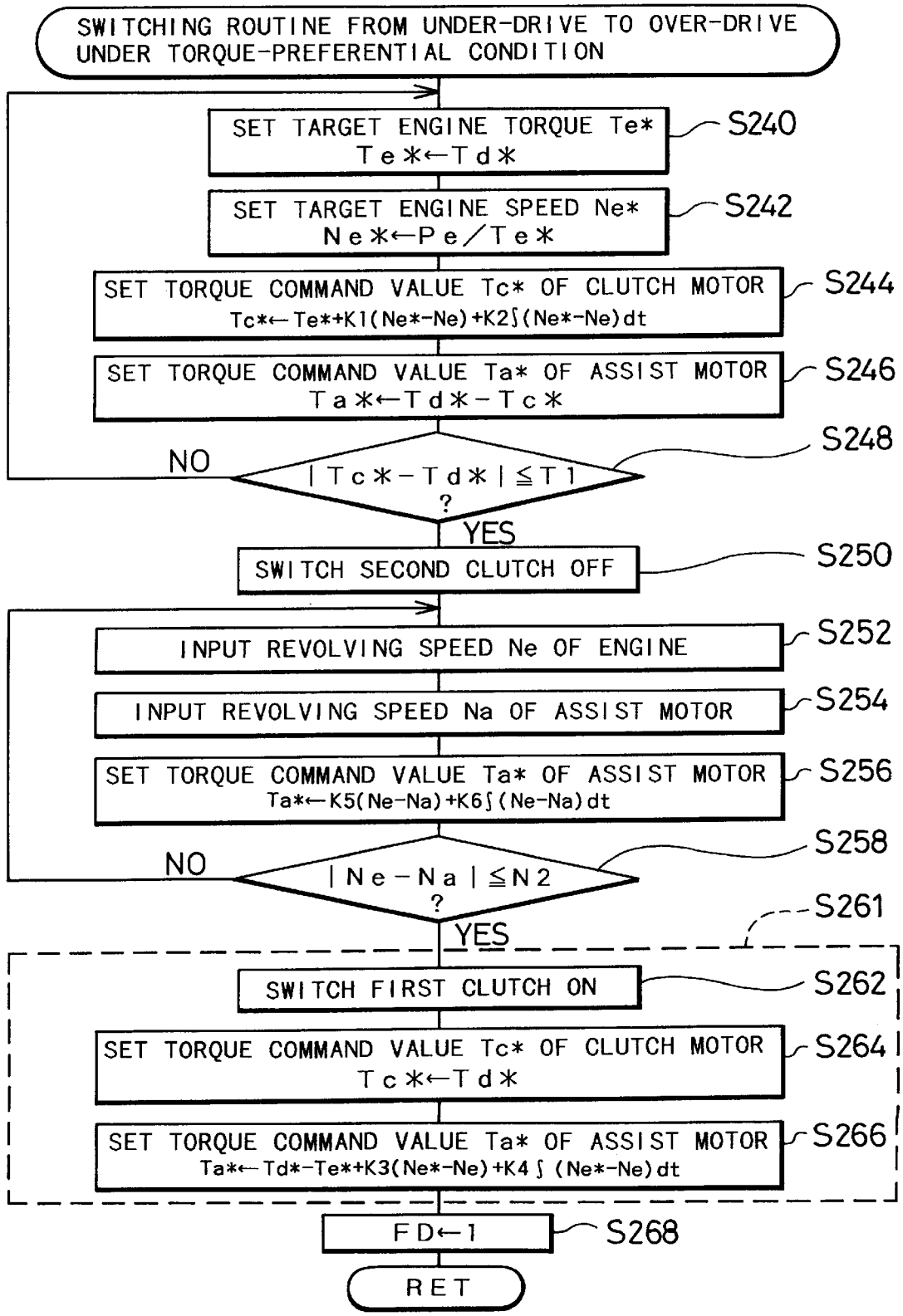
FIG. 25 is a flowchart showing a switching routine from the under-drive state to the over-drive state under a torque-preferential condition executed by the control CPU 90 of the controller 80 in a second embodiment according to the present invention.
Figure 26:
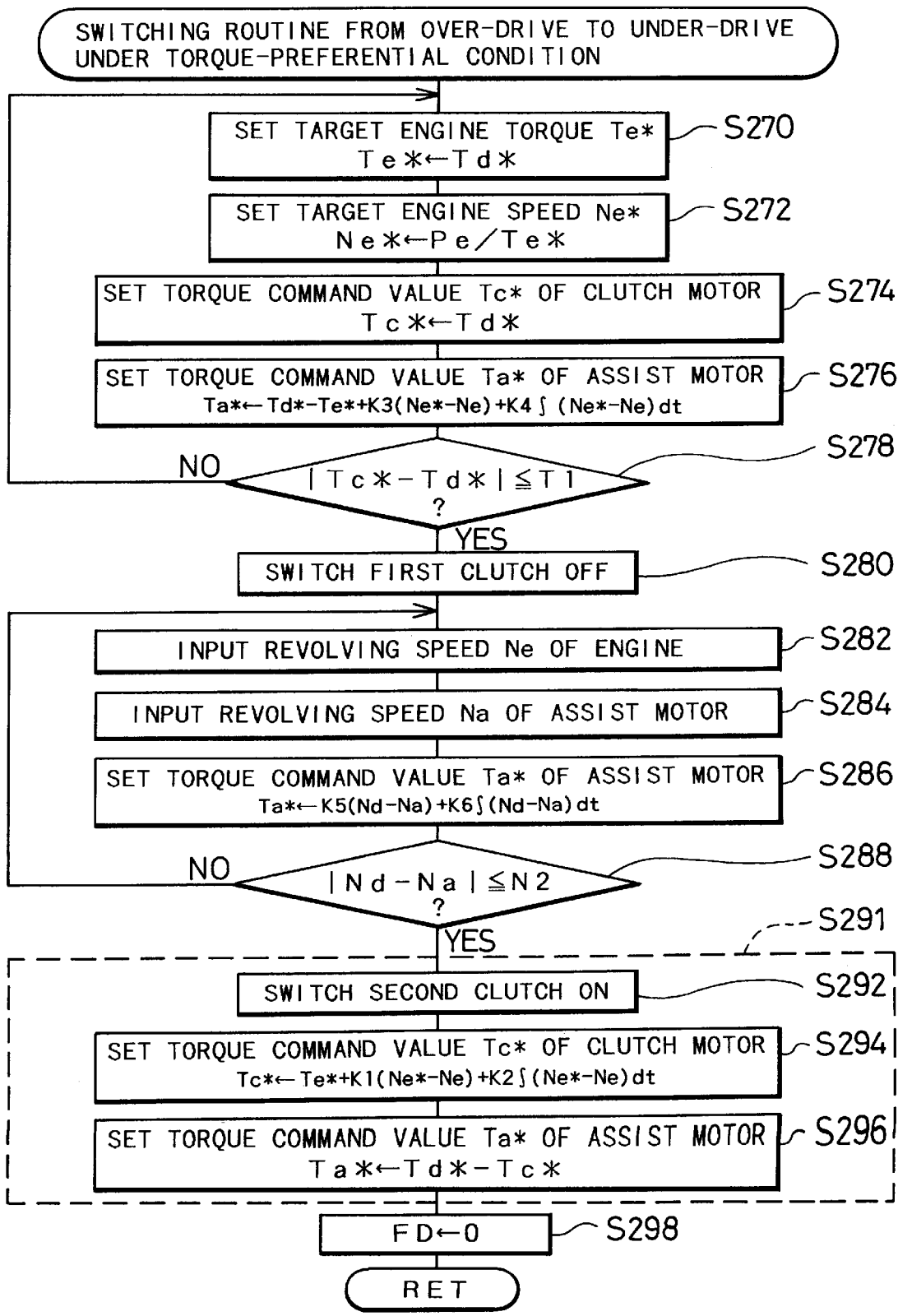
FIG. 26 is a flowchart showing a switching routine from the over-drive state to the under-drive state under the torque-preferential condition executed by the control CPU 90 of the controller 80 in the second embodiment.

25 and a switching routine from the over-drive state to the under-drive state under the torque-preferential condition shown in the flowchart of FIG. 26 in the second embodiment. The torque control routine of FIG. 11 and the clutch switching routine of FIG. 12 have been described previously in detail, and the following discussion refers to the switching process of the drive mode according to the routines of FIGS. 25 and 26.

When the program enters the routine of FIG. 25, the control CPU 90 of the controller 80 in the second embodiment first sets the torque command value Td* or the torque to be output to the drive shaft 22 to the target torque Te* of the engine 50 at step S240. The control CPU 90 then divides the energy Pe to be output from the engine 50 by the preset target torque Te* to calculate the target revolving speed Ne* of the engine 50 at step S242, and sets the torque command value Tc* of the clutch motor 30 and the torque command value Ta* of the assist motor 40 according to Equations (1) and (2) given above at steps S244 and S246. Such setting enables the engine 50 to be driven at the driving point that outputs the torque identical with the torque to be output to the drive shaft 22 (that is, the torque command value Td*) while outputting the energy Pe, through the control of the clutch motor 30 (FIG. 18), the control of the assist motor 40 (FIG. 19), and the control of the engine 50 by the EFIECU 70, which are carried out independently of but in parallel to this switching routine.

The difference between the torque command value Tc* of the clutch motor 30 and the torque command value Td* is compared with a threshold value T1 at step S248. The processing of steps S240 and S246 is repeatedly executed until the difference becomes not greater than the threshold value T1. The threshold value T1 is used to determine whether or not the torque Te output from the engine 50 substantially coincides with the torque Td output to the drive shaft 22. Not the difference between the torque Te output from the engine 50 and the torque Td output to the drive shaft 22 but the difference between the torque command value Tc* of the clutch motor 30 and the torque command value Td* is compared with the threshold value T1, because of the following reason. The torque Tc of the clutch motor 30 corresponds to the loading torque Te of the engine 50 and it can be considered that the torque Tc of the clutch motor 30 is equal to the torque command value Tc* in the stationary state and that the torque Td output to the drive shaft 22 is identical with the torque command value Td*.

In case that the difference between the torque command value Tc* of the clutch motor 30 and the torque command value Td* becomes not greater than the threshold value T1, the control CPU 90 switches the second clutch 46 to the OFF position at step S250. This procedure enables the power output apparatus 20B to have the structure of FIG. 10. At this moment, the torque command value Tc* of the clutch motor 30 is substantially identical with the torque command value Td*, so that the clutch motor 30 outputs a torque corresponding to the torque command value Tc* to the drive shaft 22.

The control CPU 90 subsequently reads the revolving speed Ne of the engine 50 and a revolving speed Na of the assist motor 40 at steps S252 and S254, calculates the torque command value Ta* of the assist motor 40 from the input revolving speeds Ne and Na according to Equation (9) given below at step S256, and compares the difference between the revolving speed Ne of the engine 50 and the revolving speed Na of the assist motor 40 with a threshold value N2 at step S258. The processing of steps S252 through S258 is repeatedly executed until the difference becomes not greater than the threshold value N2. The first term on the right side of Equation (9) is a proportional term to cancel the deviation of the revolving speed Na of the assist motor 40 from the revolving speed Ne of the engine 50, and the second term on the right side is an integral term to cancel the stationary deviation. K5 and K6 denote proportional constants. The threshold value N2 is used to determine whether or not the revolving speed Ne of the engine 50 substantially coincides with the revolving speed Na of the assist motor 40. This procedure enables the revolving speed Na of the assist motor 40 to be substantially equal to the revolving speed Ne of the engine 50. The revolving speed Na of the assist motor 40 may be calculated from the rotational angle θr of the rotor-rotating shaft 38 detected by the resolver 47.

$$Ta^* \leftarrow K5(Ne-Na)+K6\int(Ne-Na)dt \tag{9}$$

In case that the difference between the revolving speed Ne of the engine 50 and the revolving speed Na of the assist motor 40 becomes not greater than the threshold value N2, the control CPU 90 switches the first clutch 46 to the ON position at step S262 and simultaneously sets the torque command value Tc* of the clutch motor 30 and the torque command value Ta* of the assist motor 40 according to Equations (3) and (4) given above at steps S264 and S266. This procedure enables the power output apparatus 20B to have the structure of FIG. 4 and to be set in the over-drive state. These three steps are carried out concurrently and are thus surrounded by a broken line and defined as step S161 in FIG. 25. The program sets the value '1' representing the over-drive mode to the drive mode flag FD at step S268, before exiting from this routine.

Figure 27:
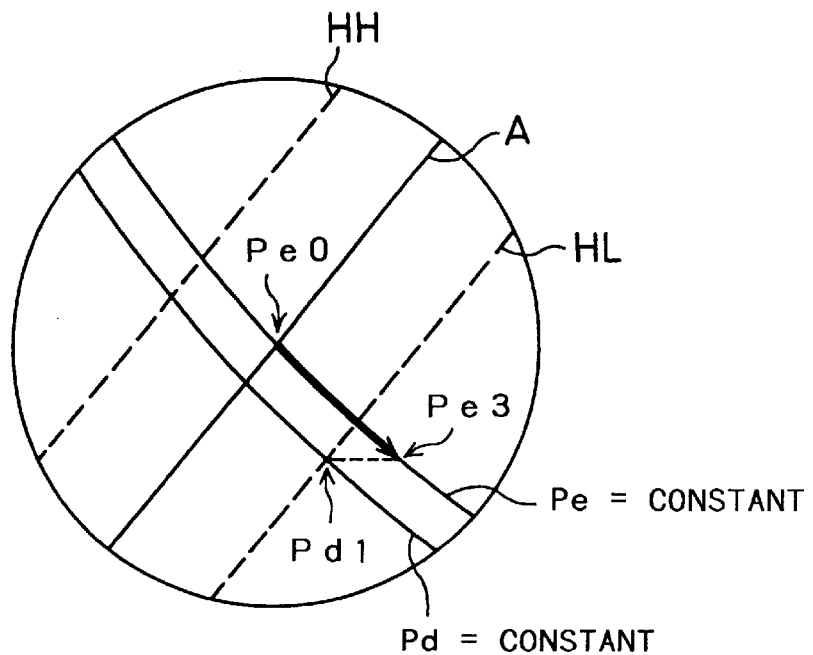
FIG. 27 shows a process of switching the drive mode according to the routine of FIG. 25.

FIG. 27 shows a process of switching from the under-drive mode to the over-drive mode according to the routine of FIG. 25. Like the first embodiment, it is here assumed that the engine 50 is driven at the driving point Pe0 and that the driving point of the drive shaft 22 is varied along the curve Pd. The switch from the under-drive mode to the over-drive mode is carried out when the driving state of the drive shaft 22 reaches the driving point Pd1. The switching operation of FIG. 25 carries out the control, so as to enable the engine 50 to make its output torque Te coincident with the torque Td output to the drive shaft 22, while outputting the energy Pe. The driving state of the engine 50 is accordingly changed from the driving point Pe0 to a driving point Pe3 having the same torque as the torque Td output to the drive shaft 22 via a pathway shown by the arrow. When the driving state of the engine 50 reaches the driving point Pe3, the second clutch 46 is switched to the OFF position. This enables the power output apparatus 20B to have the structure of FIG. 10. At this moment, since the torque Te output from the engine 50 is equal to the torque Td output to the drive shaft 22, the clutch motor 30 outputs a torque equivalent to the torque Td to the drive shaft 22. There is a positive revolving speed difference between the crankshaft 56 and the drive shaft 22, and the clutch motor 30 regenerates the electric power. The regenerated electric power is, however, relatively small and mostly consumed to drive the assist motor 40. The first clutch 45 is then switched to the ON position. This causes the power output apparatus 20B to have the structure of FIG. 4 and to be set in the over-drive mode. In response to the switching operation of the first clutch 45 to the ON position, the control procedure returns the driving state of the engine 50 to the driving point Pe0 via the driving point Pe3.

The switching process from the over-drive mode to the under-drive mode follows the switching routine from the over-drive state to the under-drive state under the torque-preferential condition shown in the flowchart of FIG. 26.

The switching process from the over-drive mode to the under-drive mode is similar to the switching process from the under-drive mode to the over-drive mode shown in FIG. 25, except some differences given below. The switching operation of the second clutch 46 to the OFF position at step S250 in the flowchart of FIG. 25 is replaced by the switching operation of the first clutch 45 to the OFF position at step S280 in the flowchart of FIG. 26, whereas the switching operation of the first clutch 45 to the ON position at step S262 is replaced by the switching operation of the second clutch 46 to the ON position at step S292. The procedure of FIG. 26 sets the torque command values Tc* and Ta* of the clutch motor 30 and the assist motor 40 according to Equations (3) and (4) at steps S274 and S276, while the procedure of FIG. 25 sets the torque command values Tc* and Ta* according to Equations (1) and (2) at steps S244 and S246. On the contrary, the procedure of FIG. 26 sets the torque command values Tc* and Ta* of the clutch motor 30 and the assist motor 40 according to Equations (1) and (2) at steps S294 and S296, while the procedure of FIG. 25 sets the torque command values Tc* and Ta* according to Equations (3) and (4) at steps S264 and S266. Since the rotor-rotating shaft 38 connects with the drive shaft 22, when the output apparatus 20B has the structure of FIG. 10, a value calculated by Equation (10) given below is set to the torque command value Ta* of the assist motor 40, so as to enable the revolving speed Na of the assist motor 40 to coincide with the revolving speed Nd of the drive shaft 22 at steps S282 through S288. Instead of the value '1' representing the over-drive mode, the value '0' representing the under-drive mode is set to the drive mode flag FD at step S298. The details of the processing are not specifically described here.

$$Ta^* \leftarrow K5(Nd-Na)+K6\int(Nd-Na)dt \qquad (10)$$

Figure 28:
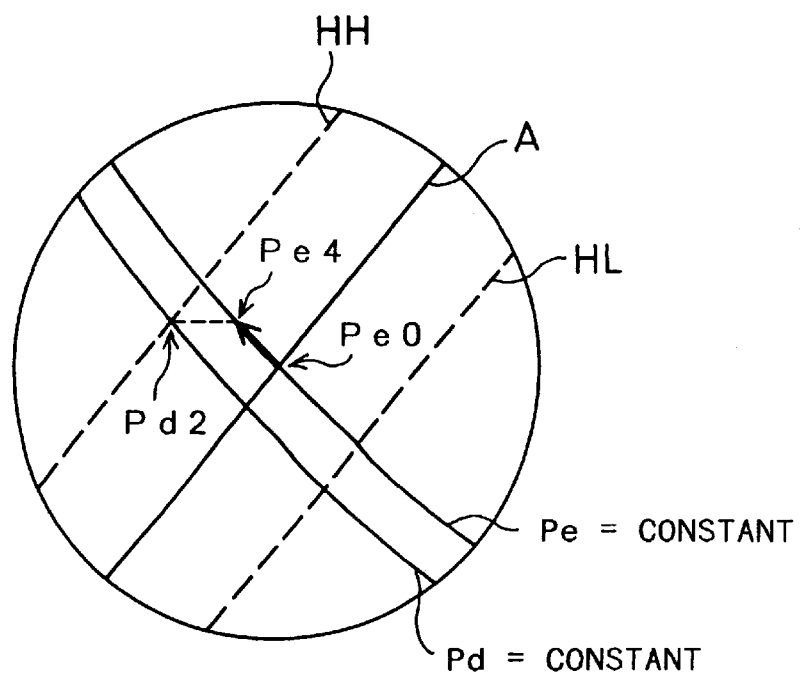
FIG. 28 shows a process of switching the drive mode according to the routine of FIG. 26.

FIG. 28 shows a process of switching from the over-drive mode to the under-drive mode according to the routine of FIG. 26. Like the first embodiment, it is here assumed that the engine 50 is driven at the driving point Pe0 and that the driving point of the drive shaft 22 is varied along the curve Pd. The switch from the over-drive mode to the under-drive mode is carried out when the driving state of the drive shaft 22 reaches the driving point Pd2. The switching operation of FIG. 26 carries out the control, so as to enable the engine 50 to make its output torque Te coincident with the torque Td output to the drive shaft 22, while outputting the energy Pe. The driving state of the engine 50 is accordingly changed from the driving point Pe0 to a driving point Pe4 having the same torque as the torque Td output to the drive shaft 22 via a pathway shown by the arrow. When the driving state of the engine 50 reaches the driving point Pe4, the first clutch 45 is switched to the OFF position. This enables the power output apparatus 20B to have the structure of FIG. 10. At this moment, since the torque Te output from the engine 50 is equal to the torque Td output to the drive shaft 22, the clutch motor 30 outputs a torque equivalent to the torque Td to the drive shaft 22. There is a negative revolving speed difference between the crankshaft 56 and the drive shaft 22, and the clutch motor 30 carries out the power operation to consume a relatively small electric power. The consumed electric power is supplied by the battery 94. The second clutch 46 is then switched to the ON position. This causes the power output apparatus 20B to have the structure of FIG. 3 and to be set in the under-drive mode. In response to the switching operation of the second clutch 46 to the ON position, the control procedure returns the driving state of the engine 50 to the driving point Pe0 via the driving point Pe4.

This structure enables the power output apparatus 20B of the second embodiment to be smoothly switched between the state of FIG. 3 in the under-drive mode and the state of FIG. 4 in the over-drive mode. The switch of the drive mode is implemented via the structure of FIG. 10, upon condition that the torque Te output from the engine 50 is made coincident with the torque Td output to the drive shaft 22. The power can thus be output to the drive shaft 22 even in the course of switching the drive mode.

The power output apparatus 20B of the second embodiment has similar advantages to those of the power output apparatus 20 of the first embodiment. The drive mode can be switched between the under-drive mode and the over-drive mode, based on the driving points of the engine 50 and the drive shaft 22. The hysteresis set to the determination for a switch of the drive mode effectively prevents the drive mode from being frequently changed even when the drive shaft 22 is driven at the driving point close to the point of switching the drive mode. Other advantages include the effect of outputting the power from the engine 50 to the drive shaft 22 with a high efficiency and the effect of driving the engine 50 at the driving point of highest possible efficiency, so as to enhance the energy efficiency of the whole power output apparatus 20B.

Like the power output apparatus 20 of the first embodiment, the power output apparatus 20B of the second embodiment may use a map set by only the revolving speed or a map set by only the torque for the determination of whether or not a switch of the drive mode is required. No hysteresis may be set to the map used for the determination for a switch of the drive mode. Another possible procedure may switch the drive mode when the torque Td output to the drive shaft 22 coincides with the torque Te output from the engine 50, without setting the driving point for a switch of the drive mode or carrying out the control to make the torque Te output from the engine 50 coincident with the torque Td output to the drive shaft 22.

Figure 10:
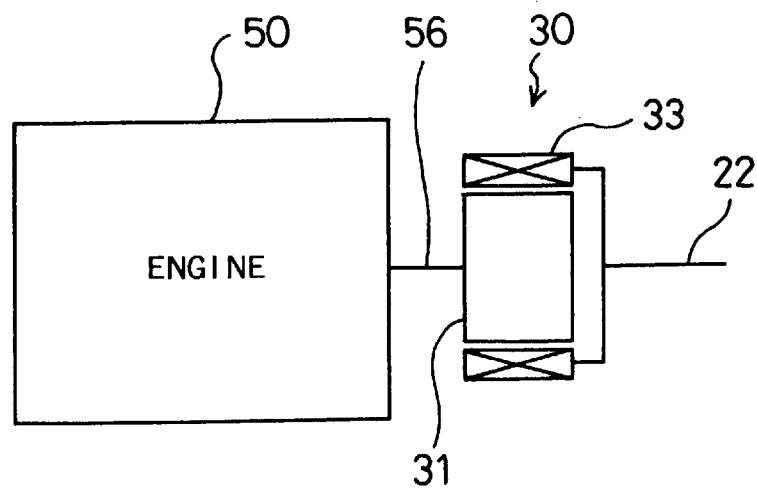
FIG. 10 schematically shows structure of the power output apparatus 20 of the embodiment, wherein both the first clutch 45 and the second clutch 46 are in OFF position.

In the structure of the second embodiment, either the second clutch 46 or the first clutch 45 is switched to the OFF position during the control of the assist motor 40 to set the power output apparatus 20B in the state of FIG. 10. The control of the assist motor 40 is then changed to make the revolving speed Na of the rotor-rotating shaft 38 coincident with the revolving speed of the corresponding shaft (either Ne or Nd). Another possible procedure sets the torque command value Ta* of the assist motor 40 equal to zero, in order to prevent the revolutions of the rotor-rotating shaft 38 from being varied by the assist motor 40 immediately after the power output apparatus 20B is set to the state of FIG. 10. This procedure controls the assist motor 40 synchronously with the switching operation of either the second clutch 46 or the first clutch 45 to the OFF position, and then changes the control of the assist motor 40 to make the revolving speed of the rotor-rotating shaft 38 coincident with the revolving speed of the corresponding shaft. Still another possible procedure controls the assist motor 40 to prevent a torque from being output from the assist motor 40 synchronously with the switching operation of either the second clutch 46 or the first clutch 45 to the OFF position, and connects the rotor-rotating shaft 38 with the corresponding shaft without regulating the revolving speed of the rotor-rotating shaft 38. These alternative structures effectively prevent an unexpected variation in revolving speed of the rotor-rotating shaft 38. In one possible application to realize the structure of preventing a torque from being output from the assist motor 40 synchronously with the switching operation of either the second clutch 46 or the first clutch 45 to the OFF position, a circuit breaker may be arranged in the three-phase lines for connecting the second driving circuit 92 with the three-phase coils 44 of the assist motor 40. The circuit breaker cuts off the transmission of the electric power between the assist motor 40 and the second driving circuit 92, synchronously with the switching operation of either the second clutch 46 or the first clutch 45 to the OFF position. This structure mechanically sets the torque of the assist motor 40 equal to zero and thus facilitates the synchronous operation with the second clutch 46 or the first clutch 45.

Figure 29:
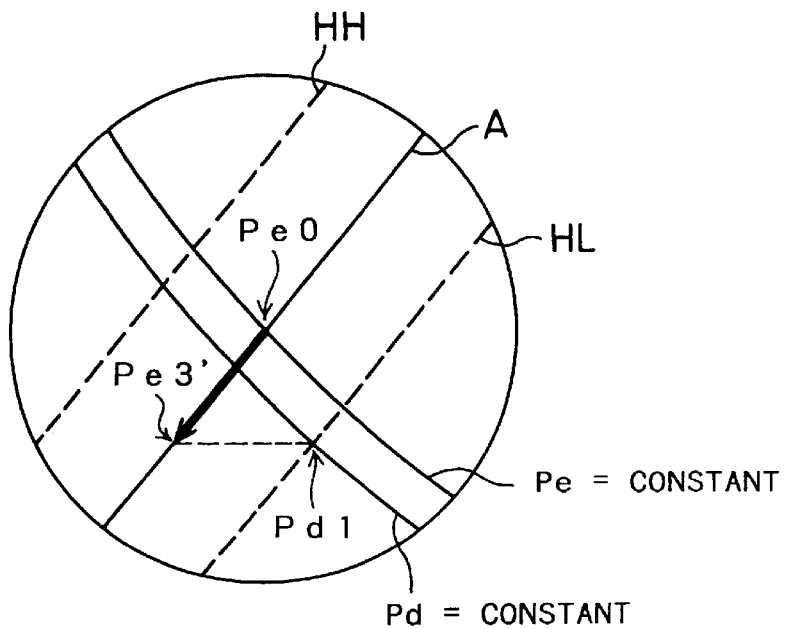
FIG. 29 shows a process of switching the drive mode by shifting the driving point of the engine 50 on the working curve A of the engine 50.
Figure 30:
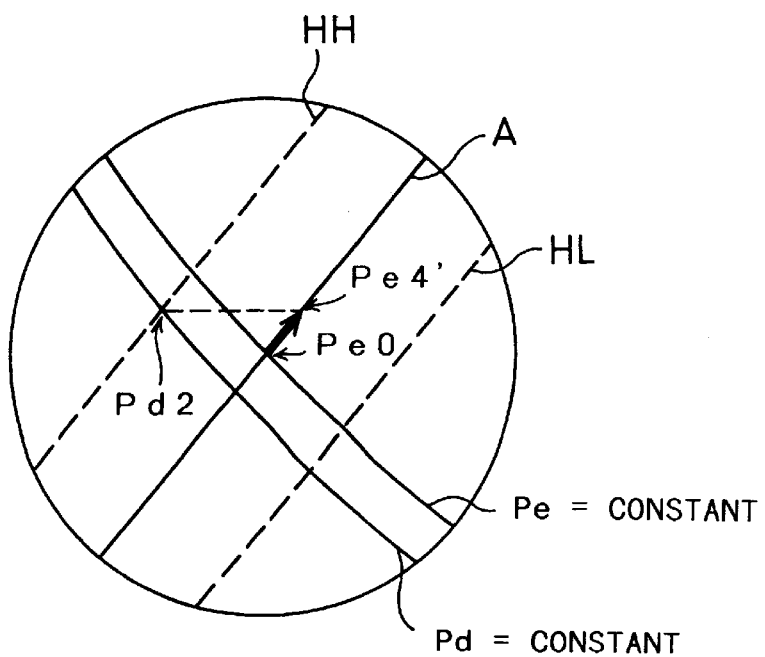
FIG. 30 shows a process of switching the drive mode by shifting the driving point of the engine 50 on the working curve A of the engine 50.

In the power output apparatus 20B of the second embodiment, when the driving state of the drive shaft 22 reaches the driving point for switching the drive mode, the engine 50 is controlled to make its torque Te coincident with the torque Td output to the drive shaft 22, while outputting the energy Pe. Another control procedure may control the engine 50, in order to enable the torque Te output from the engine 50 to coincide with the torque Td output to the drive shaft 22 on the working curve A. In this case, the process of setting the target engine speed Ne* at step S242 in the routine of FIG. 25 and at step S272 in the routine of FIG. 26 is replaced by the process of reading the revolving speed corresponding to the torque command value Td* at the driving point on the working curve A from the map of FIG. 16 and setting the revolving speed to the target engine speed Ne*. Under the control to make the torque Te output from the engine 50 coincident with the torque Td output to the drive shaft 22 on the working curve A, FIG. 29 shows a process of switching from the under-drive mode to the over-drive mode, and FIG. 30 shows a process of switching from the over-drive mode to the under-drive mode.

As discussed above, the power output apparatus 20 of the first embodiment carries out a switch from the under-drive mode to the over-drive mode or alternatively a switch from the over-drive mode to the under-drive mode by making the revolving speed Ne of the engine 50 coincident with the revolving speed Nd of the drive shaft 22. The power output apparatus 20B of the second embodiment carries out a switch from the under-drive mode to the over-drive mode or alternatively a switch from the over-drive mode to the under-drive mode by making the torque Te output from the engine 50 coincident with the torque Td output to the drive shaft 22. Another possible structure carries out a switch from the under-drive mode to the over-drive mode by making the revolving speed Ne of the engine 50 coincident with the revolving speed Nd of the drive shaft 22, while carrying out a switch from the over-drive mode to the under-drive mode by making the torque Te output from the engine 50 coincident with the torque Td output to the drive shaft 22. As clearly shown by the comparison between the switching process of FIG. 21 and the switching process of FIG. 27, when the drive mode is switched from the under-drive mode to the over-drive mode, the structure of making the revolving speed Ne of the engine 50 coincident with the revolving speed Nd of the drive shaft 22 results in a smaller shift of the driving point of the engine 50. Namely the structure of making the revolving speed Ne of the engine 50 coincident with the revolving speed Nd of the drive shaft 22 ensures a smoother switch of the drive mode.

As clearly shown by the comparison between the switching process of FIG. 22 and the switching process of FIG. 28, when the drive mode is switched from the over-drive mode to the under-drive mode, on the other hand, the structure of making the torque Te output from the engine 50 coincident with the torque Td output to the drive shaft 22 results in a smaller shift of the driving point of the engine 50. Namely the structure of making the torque Te output from the engine 50 coincident with the torque Td output to the drive shaft 22 ensures a smoother switch of the drive mode. The modified structure accordingly carries out a switch from the under-drive mode to the over-drive mode according to the routine of FIG. 13 and a switch from the over-drive mode to the under-drive mode according to the routine of FIG. 26, in order to ensure a smoother switch of the drive mode. Still another possible structure may, however, carry out a switch from the under-drive mode to the over-drive mode by making the torque Te output from the engine 50 coincident with the torque Td output to the drive shaft 22, while carrying out a switch from the over-drive mode to the under-drive mode by making the revolving speed Ne of the engine 50 coincident with the revolving speed Nd of the drive shaft 22.

The following describes a power output apparatus 20C as a third embodiment according to the present invention. The power output apparatus 20C of the third embodiment has the same hardware structure as that of the power output apparatus 20 of the first embodiment. The constituents of the power output apparatus 20C of the third embodiment that are identical with those of the power output apparatus 20 of the first embodiment are accordingly shown by like numerals and not specifically described here. The numerals and symbols used in the description of the first embodiment have the same meanings in the description of the third embodiment, unless otherwise specified.

Like the second embodiment, the torque control and the switching control of the drive mode executed in the power output apparatus 20C of the third embodiment respectively follow the torque control routine of FIG. 11 and the clutch switching routine of FIG. 12 discussed in the first embodiment. In the clutch switching routine of FIG. 12, however, the switching process from the under-drive mode to the over-drive mode at step S138 and the switching process from the over-drive mode to the under-drive mode at step S139 follow a switching routine from the under-drive state to the over-drive state under an identical power condition shown in the flowchart of FIG. 31 and a switching routine from the over-drive state to the under-drive state under the identical power condition shown in the flowchart of FIG. 32 in the third embodiment. The torque control routine of FIG. 11 and the clutch switching routine of FIG. 12 have been described previously in detail, and the following discussion refers to the switching process of the drive mode according to the routines of FIGS. 31 and 32.

Figure 31:
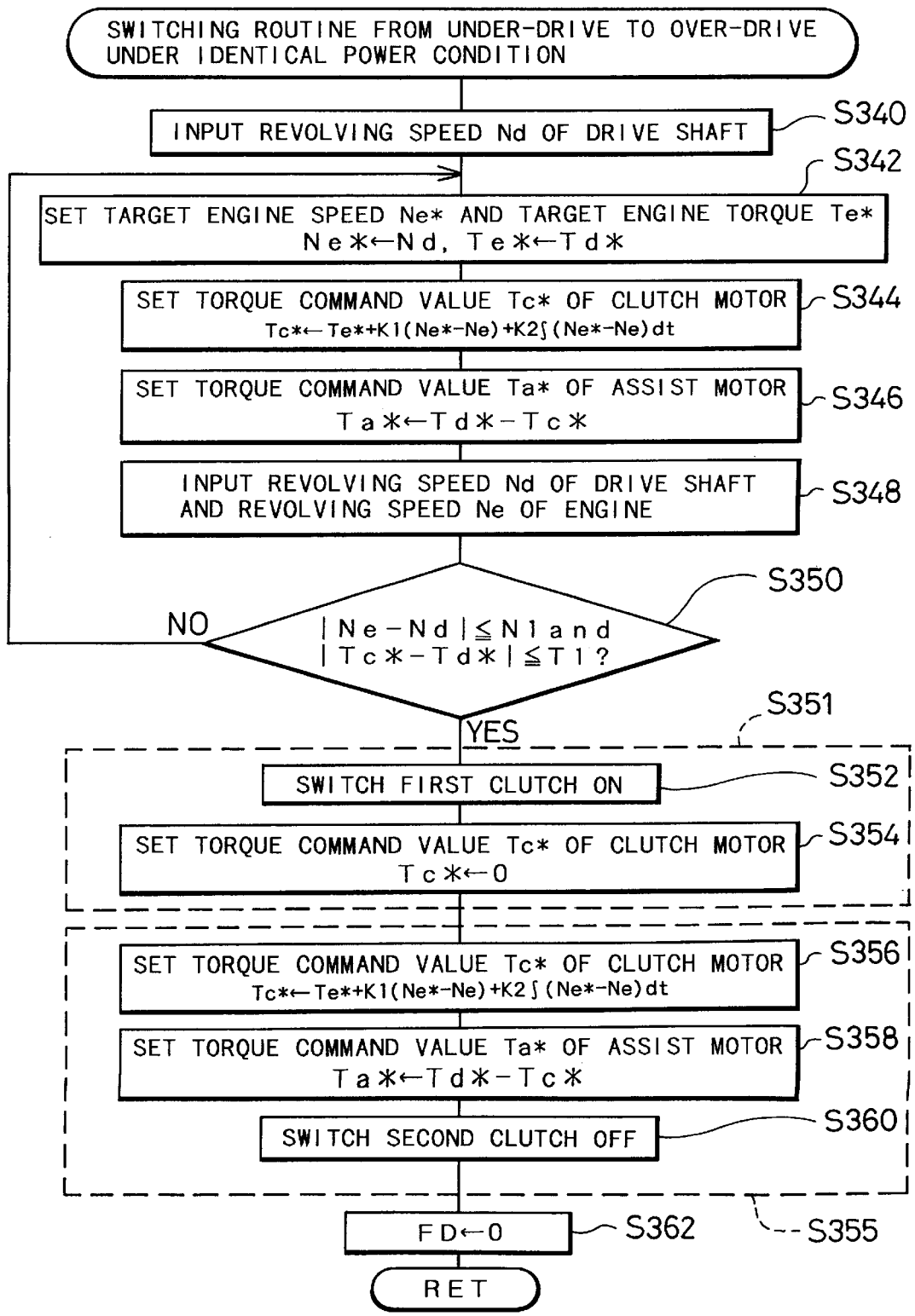
FIG. 31 is a flowchart showing a switching routine from the under-drive state to the over-drive state under an identical power condition executed by the control CPU 90 of the controller 80 in a third embodiment according to the present invention.

When the program enters the routine of FIG. 31, the control CPU 90 of the controller 80 first reads the revolving speed Nd of the drive shaft 22 at step S340, and sets the input revolving speed Nd to the target revolving speed Ne* of the engine 50 and the torque command value Td* (that is, the torque to be output to the drive shaft 22) to the target torque Te* of the engine 50 at step S342. The control CPU 90 then sets the torque command value Tc* of the clutch motor 30 and the torque command value Ta* of the assist motor 40 according to Equations (1) and (2) given above at steps S344 and S346. Such setting enables the engine 50 to be driven at the driving point of the drive shaft 22, through the control of the clutch motor 30 (FIG. 18), the control of the assist motor 40 (FIG. 19), and the control of the engine 50 by the EFIECU 70, which are carried out independently of but in parallel to this switching routine. Namely the engine 50 is driven to have the output power identical with the power output to the drive shaft 22.

The control CPU 90 subsequently reads the revolving speed Nd of the drive shaft 22 and the revolving speed Ne of the engine 50 at step S348 and compares the difference between the input revolving speed Ne and the input revolving speed Nd with a threshold value N1 and the difference between the torque command value Tc* of the clutch motor 30 and the torque command value Td* with a threshold value T1 at step S350. The processing of steps S342 and S348 is repeatedly executed until the differences respectively become not greater than the threshold value N1 and not greater than the threshold value T1. The threshold value N1 is identical with the threshold value N1 discussed in the first embodiment, and the threshold value T1 is identical with the threshold value T1 discussed in the second embodiment. The comparison of the difference between the torque command value Tc* of the clutch motor 30 and the torque command value Td* with the threshold value T1 corresponds to the comparison of the difference between the torque Te output from the engine 50 and the torque Td output to the drive shaft 22 with the threshold value T1, as discussed in the second embodiment. Such control of the driving point of the engine 50 causes shortage of energy corresponding to the losses in the clutch motor 30 and the assist motor 40. The insufficient energy is, however, relatively small and supplied by the electric power discharged from the battery 94.

In case that both the differences become not greater than the threshold values N1 and T1, the control CPU 90 switches the first clutch 45 to the ON position at step S352 and simultaneously sets the torque command value Tc* of the clutch motor 30 equal to zero at step S354. Setting the torque command value Tc* of the clutch motor 30 equal to zero simultaneously with the switching operation of the first clutch 45 to the ON position prevents the waste of electric power by the clutch motor 30 and thereby improves the energy efficiency of the whole power output apparatus 20C as described in the first embodiment. These two steps are carried out concurrently and thus surrounded by a broken line and defined as step S351 in FIG. 31. The switching operation of the first clutch 45 to the ON position connects the crankshaft 56 with the drive shaft 22 and causes the power output from the engine 50 to be directly output to the drive shaft 22. Since the engine 50 is driven at the driving point of the drive shaft 22, no torque variation occurs on the drive shaft 22 in response to the switching operation of the first clutch 34 to the ON position.

The control CPU 90 then sets the torque command value Tc* of the clutch motor 30 and the torque command value Ta* of the assist motor 40 according to Equations (3) and (4) given above at steps S356 and S358, and switches the second clutch 46 to the OFF position synchronously with the output of the torques corresponding to the preset torque command values Tc* and Ta* from the clutch motor 30 and the assist motor 40 at step S360. This procedure causes the power output apparatus 20C to have the structure of FIG. 4 and to be set in the over-drive state. These three steps are also carried out synchronously at an appropriate timing and are thus surrounded by a broken line and defined as step S355 in FIG. 31. The program sets the value '1' representing the over-drive mode to the dive mode flag FD at step S362, before exiting from this routine.

Figure 33:
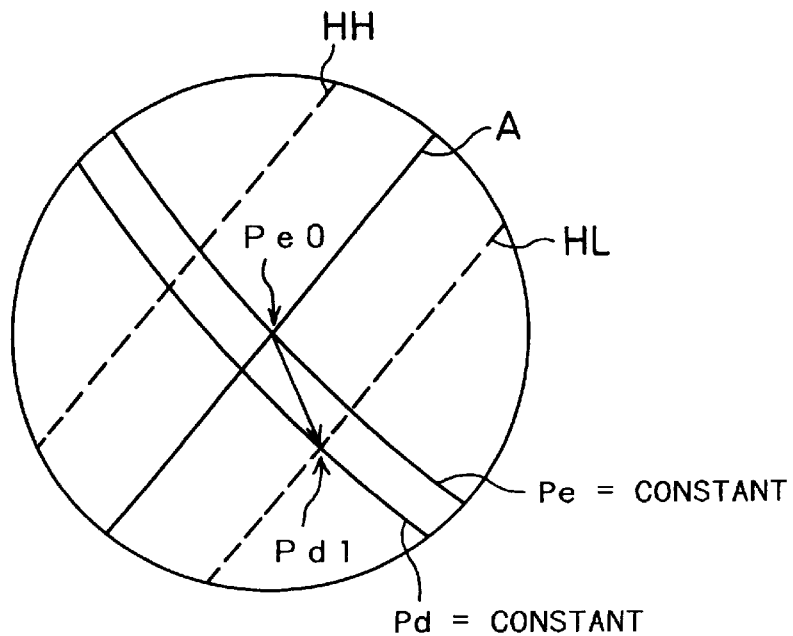
FIG. 33 shows a process of switching the drive mode according to the routine of FIG. 31.

FIG. 33 shows a process of switching from the under-drive mode to the over-drive mode according to the routine of FIG. 31. Like the first embodiment, it is here assumed that the engine 50 is driven at the driving point Pe0 and that the driving point of the drive shaft 22 is varied along the curve Pd. The switch from the under-drive mode to the over-drive mode is carried out when the driving state of the drive shaft 22 reaches the driving point Pd1. The switching operation of FIG. 31 carries out the control, so as to enable the engine 50 to be driven at the driving point Pd1 of the drive shaft 22. When the driving state of the engine 50 reaches the driving point Pd1, the first clutch 45 is switched to the ON position. This sets the power output apparatus 20C in the state of FIG. 9 and causes the power output from the engine 50 to be directly output to the drive shaft 22. No torque variation occurs on the drive shaft 22 in response to the switching operation of the first clutch 45 to the ON position, since the engine 50 is driven at the driving point Pd1. The second clutch 46 is then switched to the OFF position, in order to enable the power output apparatus 20C to have the structure of FIG. 4 and to be driven in the over-drive mode. In response to the switching operation of the second clutch 46 to the OFF position, the control procedure returns the driving state of the engine 50 to the driving point Pe0.

Figure 32:
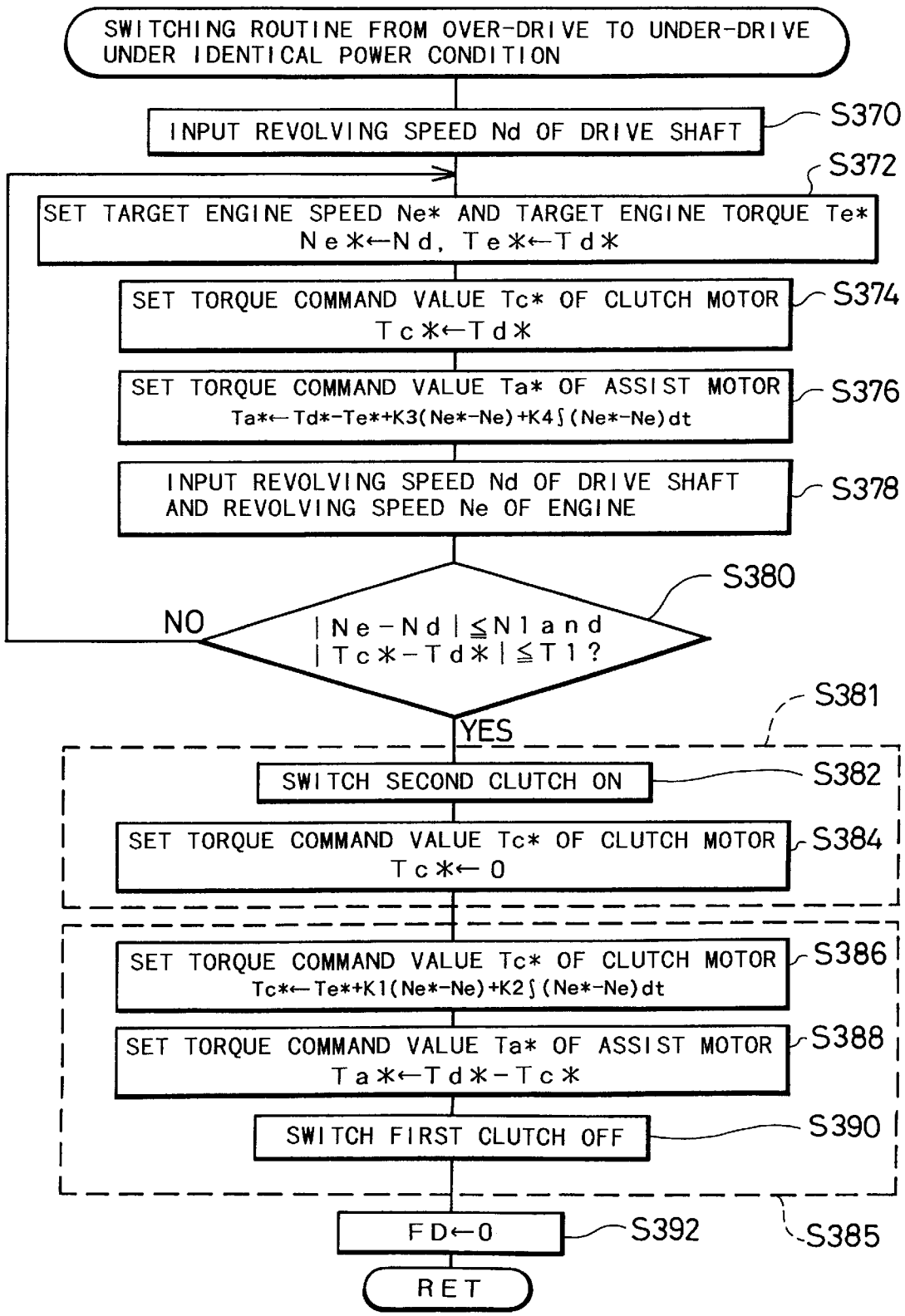
FIG. 32 is a flowchart showing a switching routine from the over-drive state to the under-drive state under the identical power condition executed by the control CPU 90 of the controller 80 in the third embodiment.

The switching process from the over-drive mode to the under-drive mode follows the switching routine from the over-drive state to the under-drive state under the identical power condition shown in the flowchart of FIG. 32. The switching process from the over-drive mode to the under-drive mode is similar to the switching process from the under-drive mode to the over-drive mode shown in FIG. 31, except some differences given below. The switching operation of the first clutch 45 to the ON position at step S352 in the flowchart of FIG. 31 is replaced by the switching operation of the second clutch 46 to the ON position at step S382 in the flowchart of FIG. 32, whereas the switching operation of the second clutch 46 to the OFF position at step S360 is replaced by the switching operation of the first clutch 45 to the OFF position at step S390. The procedure of FIG. 32 sets the torque command values Tc* and Ta* of the clutch motor 30 and the assist motor 40 according to Equations (3) and (4) at steps S374 and S376, while the procedure of FIG. 31 sets the torque command values Tc* and Ta* according to Equations (1) and (2) at steps S344 and S346. On the contrary, the procedure of FIG. 32 sets the torque command values Tc* and Ta* of the clutch motor 30 and the assist motor 40 according to Equations (1) and (2) at steps S386 and S388, while the procedure of FIG. 31 sets the torque command values Tc* and Ta* according to Equations (3) and (4) at steps S356 and S358. Instead of the value '1' representing the over-drive mode, the value '0' representing the under-drive mode is set to the drive mode flag FD at step S392. The details of the processing are not specifically described here.

Figure 34:
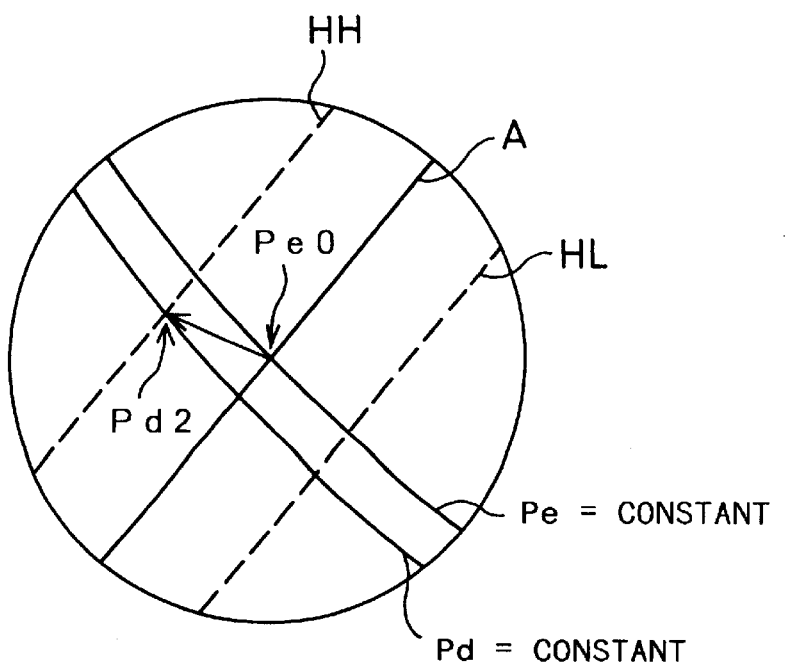
FIG. 34 shows a process of switching the drive mode according to the routine of FIG. 32.

FIG. 34 shows a process of switching from the over-drive mode to the under-drive mode according to the routine of FIG. 32. Like the first embodiment, it is here assumed that the engine 50 is driven at the driving point Pe0 and that the driving point of the drive shaft 22 is varied along the curve Pd. The switch from the over-drive mode to the under-drive mode is carried out when the driving state of the drive shaft 22 reaches the driving point Pd2. The switching operation of FIG. 32 carries out the control, so as to enable the engine 50 to be driven at the driving point Pd2 of the drive shaft 22. When the driving state of the engine 50 reaches the driving point Pd2, the second clutch 46 is switched to the ON position. This sets the power output apparatus 20C in the state of FIG. 9 and causes the power output from the engine 50 to be directly output to the drive shaft 22. No torque variation occurs on the drive shaft 22 in response to the switching operation of the second clutch 46 to the ON position, since the engine 50 is driven at the driving point Pd2. The first clutch 45 is then switched to the OFF position, in order to enable the power output apparatus 20C to have the structure of FIG. 3 and to be driven in the under-drive mode. In response to the switching operation of the first clutch 45 to the OFF position, the control procedure returns the driving state of the engine 50 to the driving point Pe0.

This structure enables the power output apparatus 20C of the third embodiment to be smoothly switched between the state of FIG. 3 in the under-drive mode and the state of FIG. 4 in the over-drive mode. The switch of the drive mode is implemented via the structure of FIG. 9, upon condition that the power output from the engine 50 is made coincident with the power output to the drive shaft 22. The power can thus be output to the drive shaft 22 even in the course of switching the drive mode.

The power output apparatus 20C of the third embodiment has similar advantages to those of the power output apparatus 20 of the first embodiment. The drive mode can be switched between the under-drive mode and the over-drive mode, based on the driving points of the engine 50 and the drive shaft 22. The hysteresis set to the determination for a switch of the drive mode effectively prevents the drive mode from being frequently changed even when the drive shaft 22 is driven at the driving point close to the point of switching the drive mode. Other advantages include the effect of outputting the power from the engine 50 to the drive shaft 22 with a high efficiency and the effect of driving the engine 50 at the driving point of highest possible efficiency, so as to enhance the energy efficiency of the whole power output apparatus 20C.

Like the power output apparatus 20 of the first embodiment, the power output apparatus 20C of the third embodiment may use a map set by only the revolving speed or a map set by only the torque for the determination of whether or not a switch of the drive mode is required. No hysteresis may be set to the map used for the determination for a switch of the drive mode. Another possible procedure may switch the drive mode when the driving point of the drive shaft 22 coincides with the driving point of the engine 50, without setting the driving point for a switch of the drive mode or carrying out the control to make the driving point of the engine 50 coincident with the driving point of the drive shaft 22.

Figure 35:
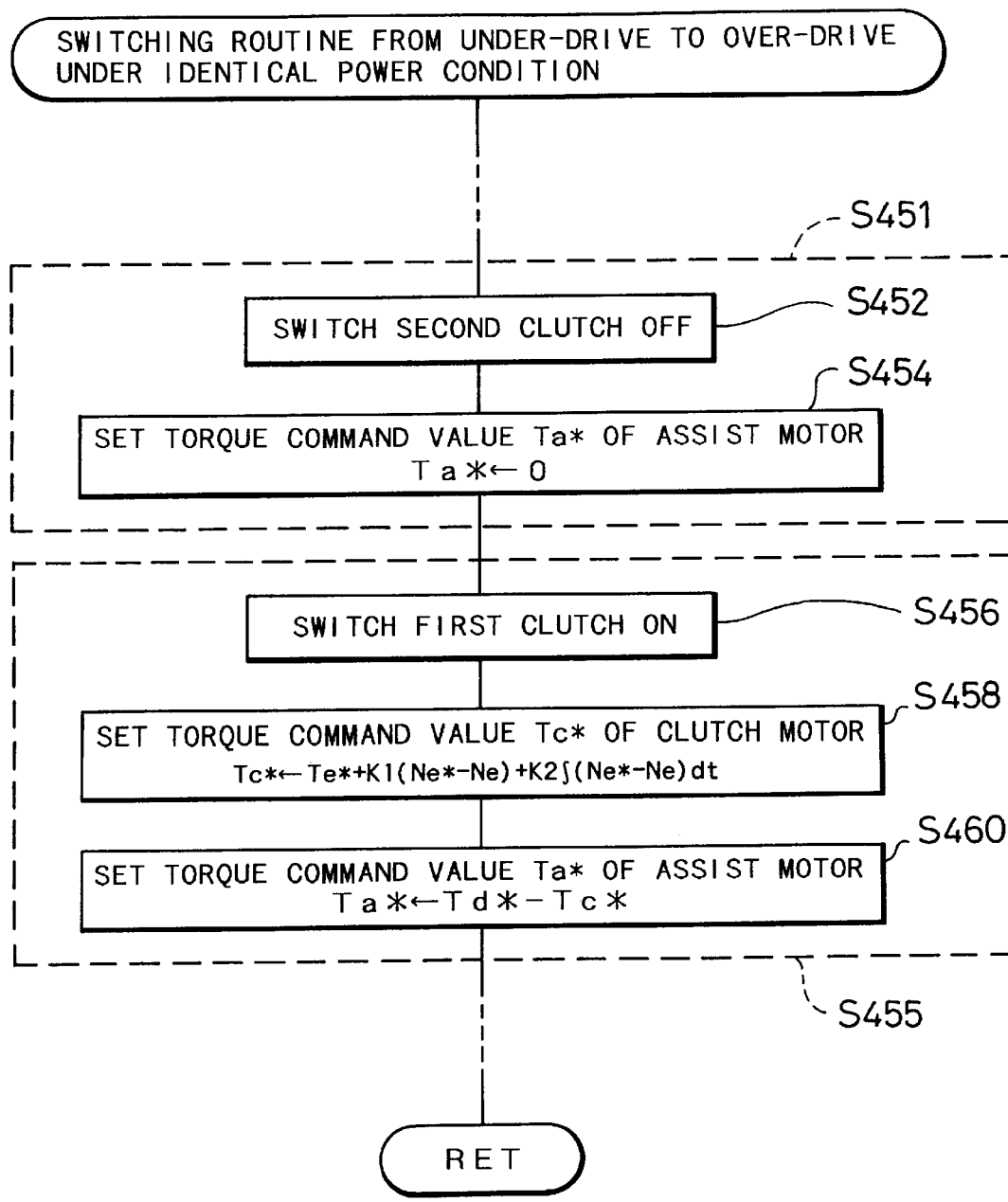
FIG. 35 is a flowchart showing part of a switching routine from the under-drive state to the over-drive state under the identical power condition as a modification of the third embodiment.
Figure 36:
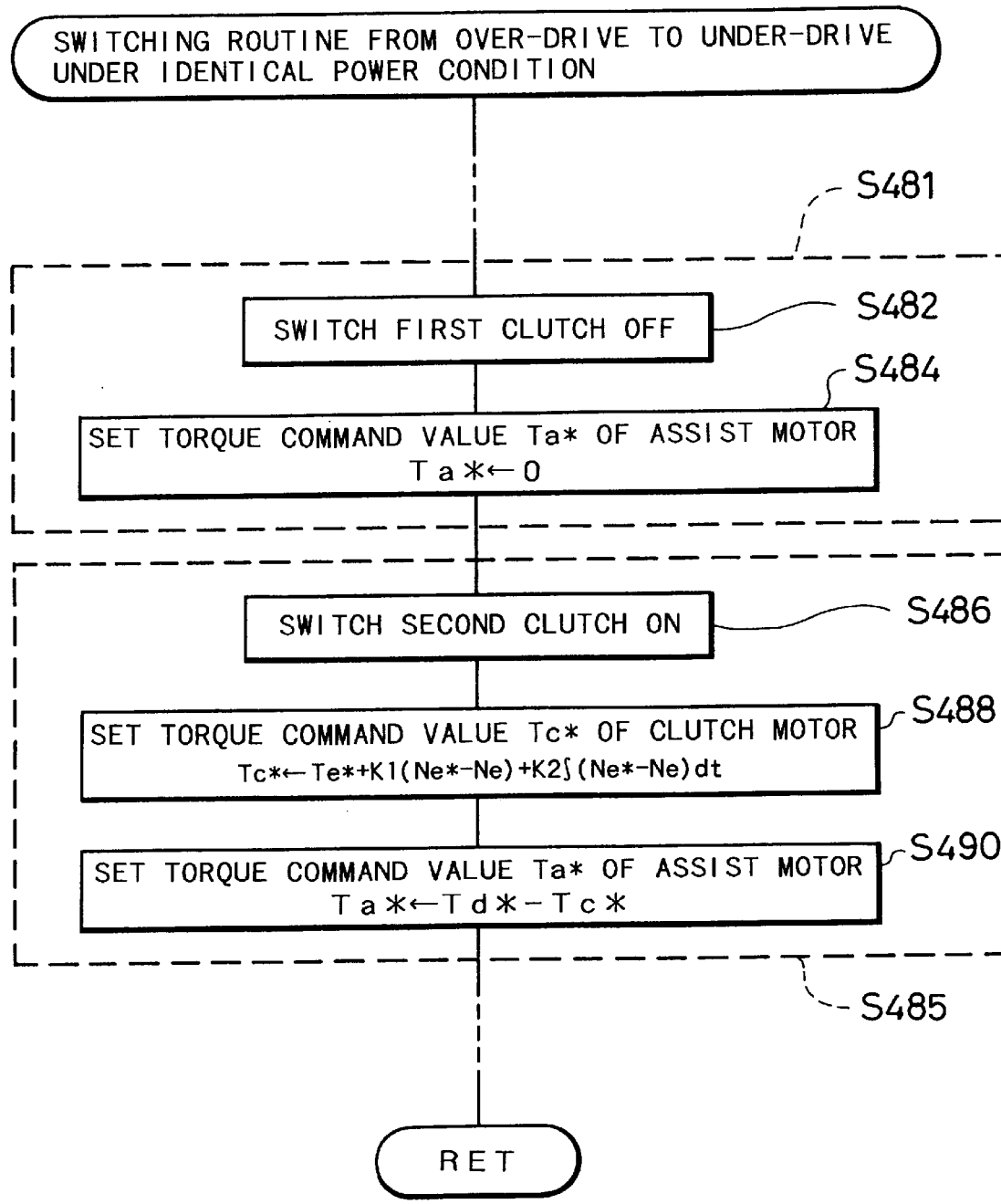
FIG. 36 is a flowchart showing part of a switching routine from the over-drive state to the under-drive state under the identical power condition as the modification of the third embodiment.

In the power output apparatus 20C of the third embodiment, the switch of the drive mode is implemented via the structure of FIG. 9. The switch of the drive mode may, however, be implemented via the structure of FIG. 10. The flowcharts of FIGS. 35 and 36 show switching routines under such conditions. When the power output apparatus 20C is set in the state of FIG. 10 (at step S452 in FIG. 35 or at step S482 in FIG. 36), the torque command value Ta* of the assist motor 40 is set equal to zero (at step S454 or at step S484). This procedure prevents a variation in revolving speed of the rotor-rotating shaft 38, which is disconnected from both the crankshaft 56 and the drive shaft 22. In this structure, the clutch motor 30 outputs a torque corresponding to the torque command value Td* to the drive shaft 22.

Figure 37:
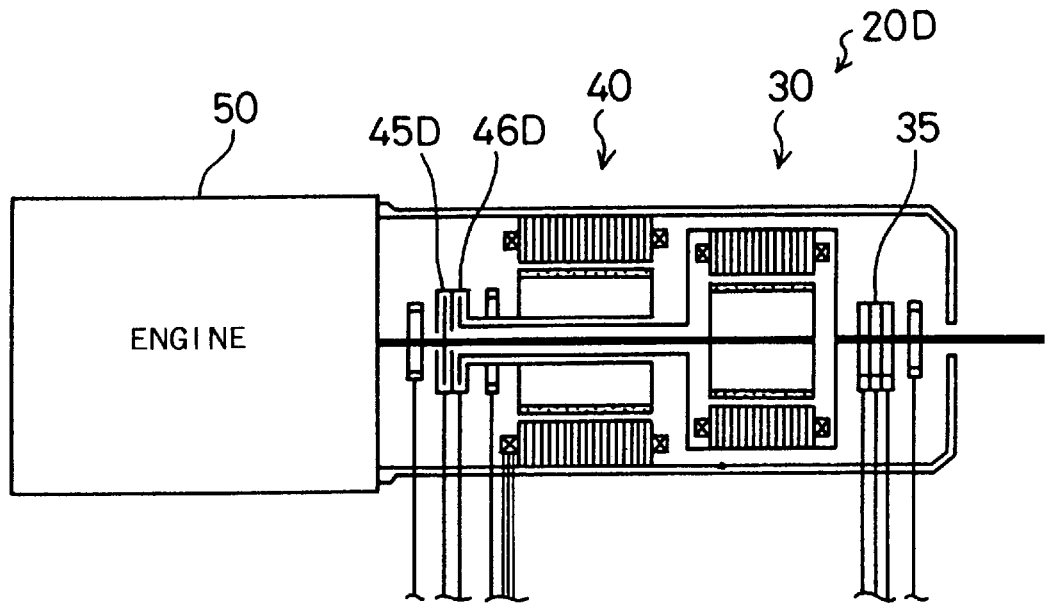
FIG. 37 schematically illustrates structure of another power output apparatus 20D as an modified example.
Figure 38:
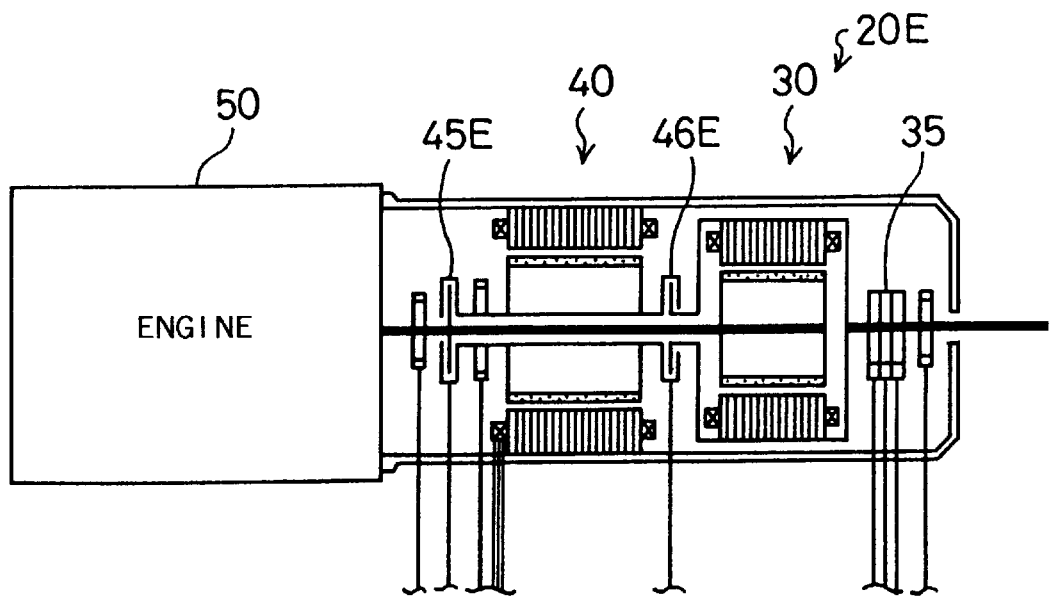
FIG. 38 schematically illustrates structure of still another power output apparatus 20E as another modified example.
Figure 39:
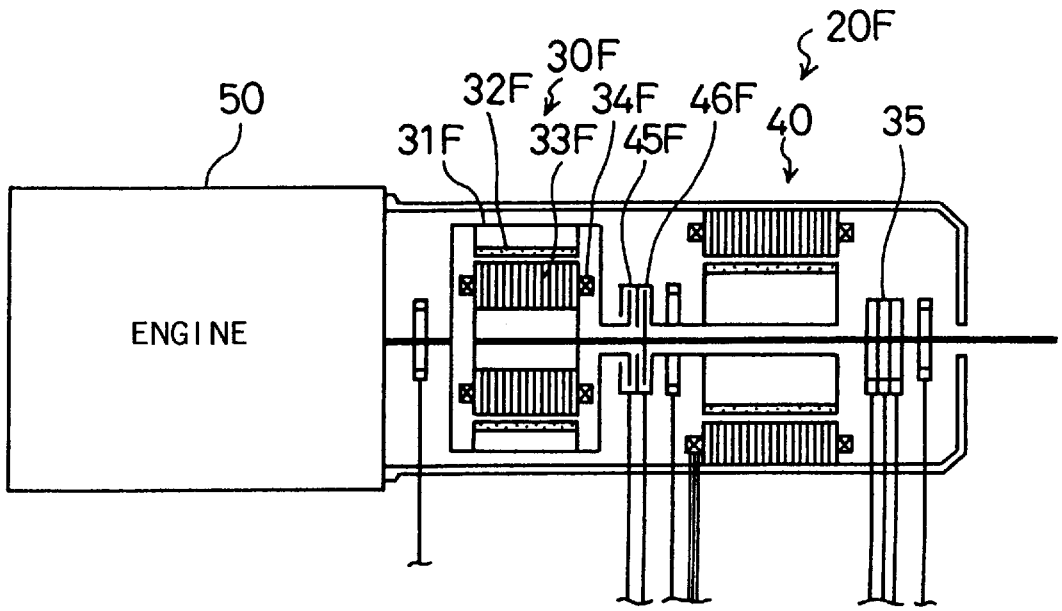
FIG. 39 schematically illustrates structure of another power output apparatus 20F as still another modified example.

In the respective embodiments discussed above, the first clutch 45 and the second clutch 46 are disposed between the assist motor 40 and the clutch motor 30. In another power output apparatus 20D of modified structure shown in FIG. 37, both a first clutch 45D and a second clutch 46D are disposed between the engine 50 and the assist motor 40. In still another power output apparatus 20E of modified structure shown in FIG. 38, a first clutch 45E is disposed between the engine 50 and the assist motor 40 whereas a second clutch 46E is disposed between the assist motor 40 and the clutch motor 30. Although the assist motor 40 is arranged between the engine 50 and the clutch motor 30 in the above embodiments, a clutch motor 30F may be arranged between the engine 50 and the assist motor 40 like another power output apparatus 20F of modified structure shown in FIG. 39. In this power output apparatus 20F of modified structure, an outer rotor 31F of the clutch motor 30F having permanent magnets 32F mounted on its inner surface is connected with the crankshaft 56, while an inner rotor 33F having three-phase coils 34F is linked with the drive shaft 22. Such difference is attributable to a first clutch 45F and a second clutch 46F arranged between the clutch motor 30F and the assist motor 40. The power output apparatuses of modified structures, for example, one having the different arrangement of the clutch motor 30 and the assist motor 40, can be operated in a similar manner to that of the power output apparatus 20 of the embodiment. There are a total of eighteen (=2×3×3) different arrangements with respect to the clutch motor 30, the assist motor 40, the first clutch 45, the second clutch 46, and the slip ring 35 included in the power output apparatus 20 (that is, two different arrangements with respect to the clutch motor 30 and the assist motor 40, three different arrangements with respect to the first clutch 45 and the second clutch 46, and three different arrangements with respect to the slip ring 35).

Figure 40:
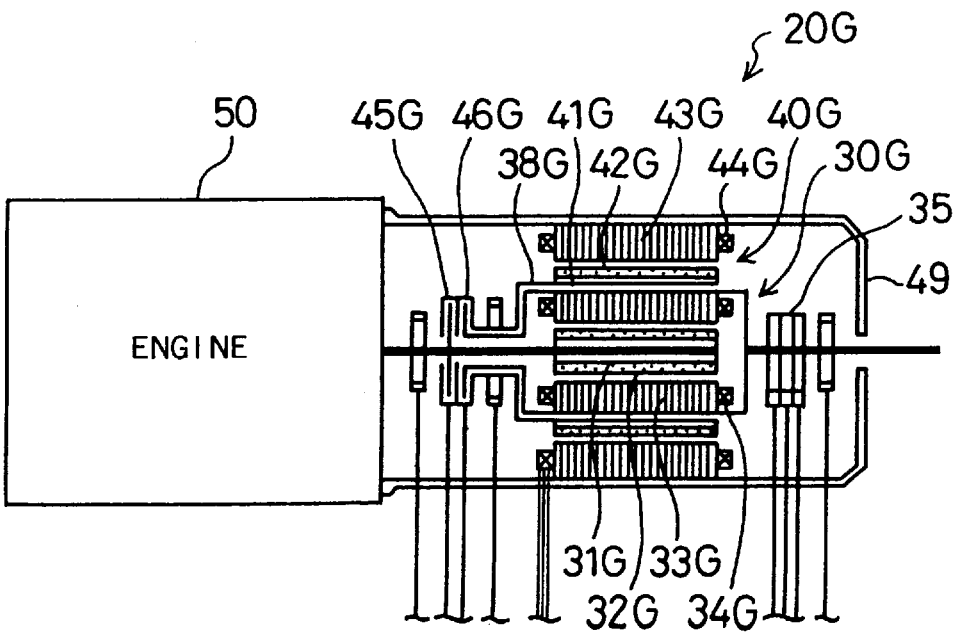
FIG. 40 schematically illustrates structure of still another power output apparatus 20G as another modified example.

Although the clutch motor 30 and the assist motor 40 are arranged in the axial direction in the above embodiments, an assist motor 40G may be arranged outside a clutch motor 30G in the diametral direction like still another power output apparatus 20G of modified structure shown in FIG. 40. In this structure, an inner rotor 31G of the clutch motor 30G that is linked with the crankshaft 56 and has permanent magnets 32G mounted on its outer surface, an outer rotor 33G of the clutch motor 30G having three-phase coils 34G, a rotor 41G of the assist motor 40G that is linked with a rotor-rotating shaft 38G and has permanent magnets 42G mounted on its outer surface, and a stator 43G of the assist motor 40G that is fixed to the casing 49 and has three-phase coils 44G are arranged in this sequence toward the outside in the diametral direction. The structure of arranging the assist motor 40G outside the clutch motor 30G in the diametral direction significantly shortens the axial length of the power output apparatus 20G, thereby making the whole power output apparatus 20G preferably compact. There are degrees of freedom with respect to the arrangements of a first clutch 45G, a second clutch 46G, and the slip ring 35 in the structure of arranging the assist motor 40G outside the clutch motor 30G in the diametral direction.

Figure 41:
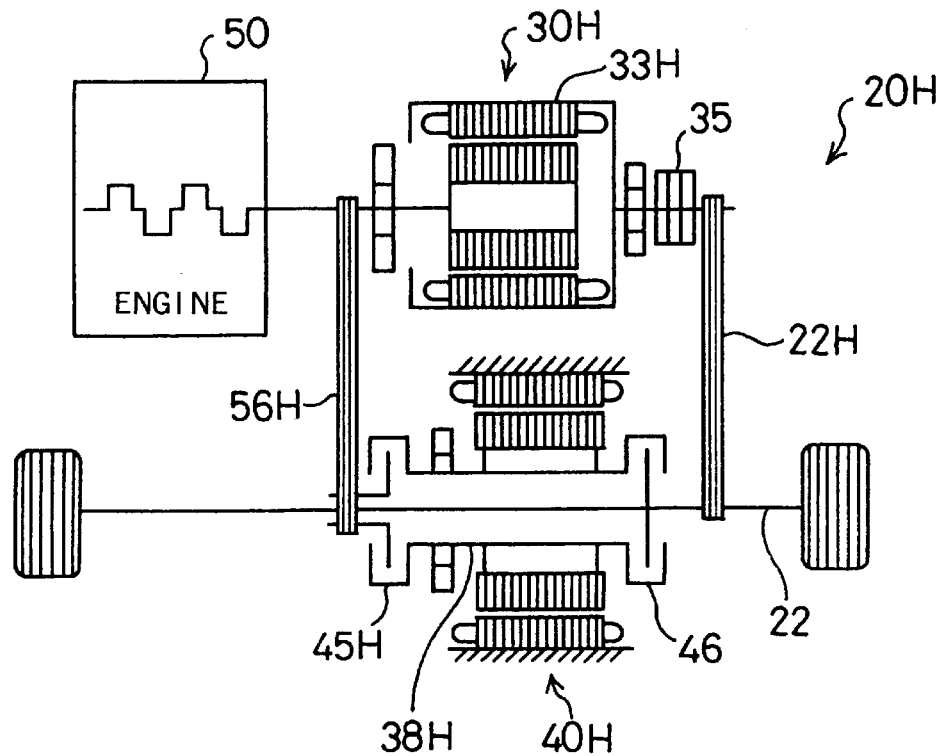
FIG. 41 schematically illustrates structure of another power output apparatus 20H as still another modified example.
Figure 42:
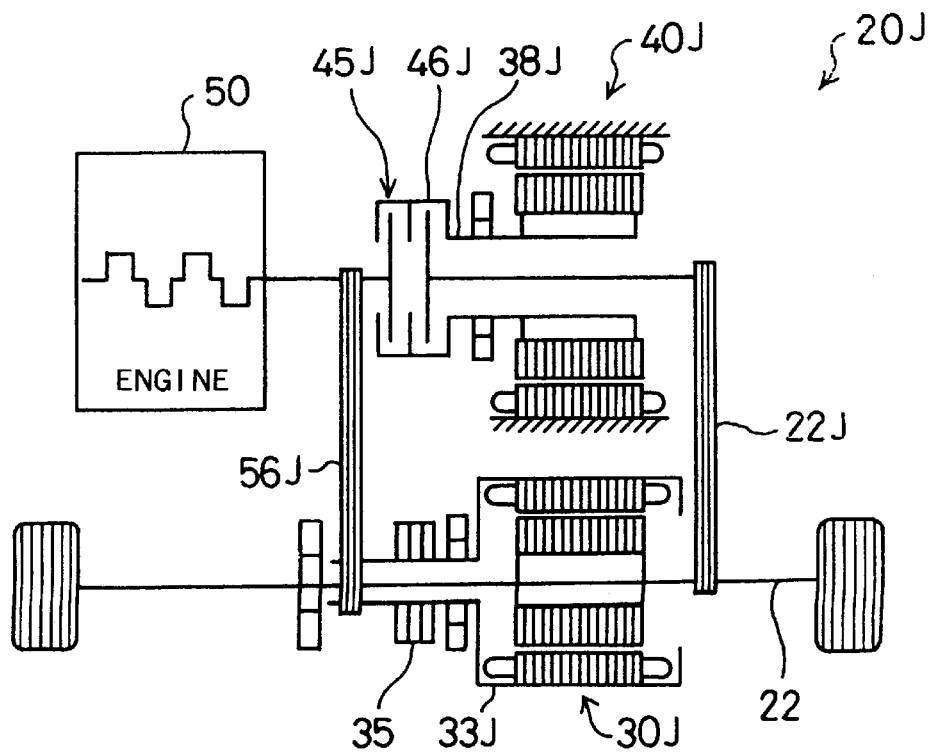
FIG. 42 schematically illustrates structure of still another power output apparatus 20J as another modified example.

Although the clutch motor 30 and the assist motor 40 are arranged coaxially in the above embodiments, the clutch motor and the assist motor may be arranged on different axes like a power output apparatus 20H of modified structure shown in FIG. 41 or another power output apparatus 20J of modified structure shown in FIG. 42. In the power output apparatus 20H of modified structure, the engine 50 and a clutch motor 30H are arranged on an identical axis, whereas an assist motor 40H is disposed on a different axis. An outer rotor 33H of the clutch motor 30H is connected to the drive shaft 22 by means of a belt 22H, whereas the crankshaft 56 is linked with a rotor-rotating shaft 38H via a first clutch 45H by means of a belt 56H. In the power output apparatus 20J of another modified structure, the engine 50 and an assist motor 40J are arranged on an identical axis, whereas a clutch motor 30J is disposed on a different axis. An outer rotor 33J of the clutch motor 30J is connected to the crankshaft 56 by means of a belt 56J, whereas the drive shaft 22 is linked with a rotor-rotating shaft 38J via a second clutch 46J by means of a belt 22J. The structure of arranging the clutch motor 30 and the assist motor 40 on different axes like these modified examples significantly shortens the axial length of the power output apparatus 20. This enables the power output apparatus 20 to be favorably mounted on the vehicle of front-wheel-drive. There are also degrees of freedom with respect to the arrangements of the first clutch 45, the second clutch 46, and the slip ring 35 in the structure of arranging the clutch motor 30 and the assist motor 40 on different axes.

The present invention is not restricted to the above embodiments or their modified structures, but there may be many other modifications, changes, and alterations without departing from the scope or spirit of the main characteristics of the present invention.

The gasoline engine driven by means of gasoline is used as the engine 50 in the respective embodiments discussed above. The principle of the invention is, however, applicable to other internal combustion engines and external combustion engines, such as Diesel engines, turbine engines, and jet engines.

In the above embodiments, permanent magnet (PM)-type synchronous motors are used for the clutch motor 30 and the assist motor 40. Any other motors which can implement both the regenerative operation and the power operation, such as variable reluctance (VR)-type synchronous motors, vernier motors, d.c. motors, induction motors, superconducting motors, and stepping motors, may, however, be used according to the requirements.

In the above embodiments, the slip ring 35 including the rotary rings 35a and the brushes 35b is used as the transmission means of the electric power to the clutch motor 30. The slip ring 35 may, however, be replaced by a rotary ring-mercury contact, a semiconductor coupling of magnetic energy, a rotary transformer, or the like.

In the above embodiments, transistor inverters are used for the first and the second driving circuits 91 and 92. Other available examples include IGBT (insulated gate bipolar mode transistor) inverters, thyristor inverters, voltage PWM (pulse width modulation) inverters, square-wave inverters (voltage inverters and current inverters), and resonance inverters.

The battery 94 may include Pb cells, NiMH cells, Li cells, or the like cells. A capacitor may be used in place of the battery 94.

Although the power output apparatus of the above embodiments is mounted on the vehicle, it may be mounted on other transportation means like ships and airplanes as well as a variety of industrial machines.

It should be clearly understood that the above embodiments are only illustrative and not restrictive in any sense. The scope and spirit of the present invention are limited only by the terms of the appended claims.

What is claimed is:

1. A power output apparatus for outputting power to a drive shaft, said power output apparatus comprising:
    an engine having an output shaft for outputting power of said engine as a rotational motion;
    a first motor having a first rotor and a second rotor, which are electromagnetically connected with each other and rotatable relative to each other, said first rotor being linked with said output shaft and said second rotor being linked with said drive shaft;
    a first electric power control circuit being connected with said first motor to enable electric power to be transmitted between said first motor and said first electric power control circuit, the transmitted electric power balancing power input to and output from said output shaft and said drive shaft;
    a second motor having a rotating shaft;
    a second electric power control circuit being connected with said second motor to enable electric power to be transmitted between said second motor and said second electric power control circuit;
    a first connection mechanism for connecting said rotating shaft with said output shaft and disconnecting said rotating shaft from said output shaft;
    a second connection mechanism for connecting said rotating shaft with said drive shaft and disconnecting said rotating shaft from said drive shaft;
    a state detection sensor for detecting rotating states of said output shaft and said drive shaft; and
    a switching control unit for driving said first connection mechanism and said second connection mechanism and carrying out an exclusive switching between said first connection mechanism and said second connection mechanism, so as to cause either of said connection mechanisms to be in a connecting state, based on the rotating states of said output shaft and said drive shaft detected by said state detection sensor.

2. A power output apparatus in accordance with claim 1, wherein said state detection sensor measures revolving speeds of said output shaft and said drive shaft,
    said switching control unit drives said first connection mechanism and said second connection mechanism and carries out the exclusive switching, when the revolving speed of said output shaft is substantially coincident with the revolving speed of said drive shaft.

3. A power output apparatus in accordance with claim 2, said power output apparatus further comprising:
    an engine operation control unit for controlling a driving state of said engine; and
    a revolving speed equalizing control unit for driving said engine, said first motor, and said second motor via said engine operation control unit, said first electric power control circuit, and said second electric power control circuit, and carrying out a revolving speed equalizing control to make the revolving speed of said output shaft substantially coincident with the revolving speed of said drive shaft, prior to the switching by said switching control unit.

4. A power output apparatus in accordance with claim 3, wherein said revolving speed equalizing control unit considers that the revolving speed of said output shaft is substantially coincident with the revolving speed of said drive shaft, when a difference between the revolving speed of said output shaft and the revolving speed of said drive shaft measured by said state detection sensor becomes not greater than a predetermined level.

5. A power output apparatus in accordance with claim 4, wherein said switching control unit switches said second connection mechanism to a connecting state, when the difference between the revolving speeds of said output shaft and said drive shaft becomes not greater than the predetermined level upon condition that the revolving speed of said output shaft is greater than the revolving speed of said drive shaft.

6. A power output apparatus in accordance with claim 4, wherein said switching control unit switches said first connection mechanism to a connecting state, when the difference between the revolving speeds of said output shaft and said drive shaft becomes not greater than the predetermined level upon condition that the revolving speed of said output shaft is less than the revolving speed of said drive shaft.

7. A power output apparatus in accordance with claim 2, wherein said switching control unit allows a specific state in which both said first connection mechanism and said second connection mechanism are in the connecting state, only when the revolving speed of said output shaft substantially coincides with the revolving speed of said drive shaft, said switching control unit carrying out the exclusive switching via said specific state in which both said first connection mechanism and said second connection mechanism are in the connecting state.

8. A power output apparatus in accordance with claim 7, said power output apparatus further comprising:

a first motor control unit for controlling said first motor via said first electric power control circuit, so as to prevent a torque from being output from said first motor, in case that said switching control unit sets both said first connection mechanism and said second connection mechanism in the connecting state.

9. A power output apparatus in accordance with claim 7, said power output apparatus further comprising:

a second motor control unit for controlling said second motor via said second electric power control circuit, so as to cancel a torque variation occurring on at least either of said output shaft and said drive shaft, in case that said switching control unit sets both said first connection mechanism and said second connection mechanism in the connecting state.

10. A power output apparatus in accordance with claim 1, wherein said state detection sensor measures torques output to said output shaft and said drive shaft, said switching control unit drives said first connection mechanism and said second connection mechanism and carries out the exclusive switching, when the torque output to said output shaft is substantially coincident with the torque output to said drive shaft.

11. A power output apparatus in accordance with claim 10, said power output apparatus further comprising:

an engine operation control unit for controlling a driving state of said engine; and a torque equalizing control unit for driving said engine, said first motor, and said second motor via said engine operation control unit, said first electric power control circuit, and said second electric power control circuit, and carrying out a torque equalizing control to make the torque output to said output shaft substantially coincident with the torque output to said drive shaft, prior to the switching by said switching control unit.

12. A power output apparatus in accordance with claim 11, wherein said torque equalizing control unit considers that the torque output to said output shaft is substantially coincident with the torque output to said drive shaft, when a difference between the torque output to said output shaft and the torque output to said drive shaft measured by said state detection sensor becomes not greater than a predetermined level.

13. A power output apparatus in accordance with claim 12, wherein said switching control unit switches said first connection mechanism to a disconnecting state, when the difference between the torques output to said output shaft and said drive shaft becomes not greater than the predetermined level upon condition that the torque output to said output shaft is less than the torque output to said drive shaft.

14. A power output apparatus in accordance with claim 12, wherein said switching control unit switches said second connection mechanism to a disconnecting state, when the difference between the torques output to said output shaft and said drive shaft becomes not greater than the predetermined level upon condition that the torque output to said output shaft is greater than the torque output to said drive shaft.

15. A power output apparatus in accordance with claim 10, wherein said switching control unit carries out the exclusive switching via a specific state in which both said first connection mechanism and said second connection mechanism are in a disconnecting state.

16. A power output apparatus in accordance with claim 15, said power output apparatus further comprising:

a second motor control unit for controlling said second motor to prevent a torque from being output from said second motor, when said switching control unit switches both said first connection mechanism and said second connection mechanism to the disconnecting state.

17. A power output apparatus in accordance with claim 16, said power output apparatus further comprising:

a circuit breaker for cutting off a power line for supplying electric power to said second motor; and means for driving said circuit breaker to cut off the supply of electric power to said second motor, synchronously with the switch of both said first connection mechanism and said second connection mechanism to the disconnecting state by said switching control unit.

18. A power output apparatus in accordance with claim 1, wherein said state detection sensor measures revolving speeds of said output shaft and said drive shaft as well as torques output to said output shaft and said drive shaft, said switching control unit drives said first connection mechanism and said second connection mechanism and carries out the exclusive switching, when both the revolving speed of and the torque output to said output shaft are substantially coincident with the revolving speed of and the torque output to said drive shaft.

19. A power output apparatus in accordance with claim 18, said power output apparatus further comprising:

an engine operation control unit for controlling a driving state of said engine; and a power equalizing control unit for driving said engine, said first motor, and said second motor via said engine operation control unit, said first electric power control circuit, and said second electric power control circuit, and carrying out a power equalizing control to make both the revolving speed of and the torque output to said output shaft substantially coincident with the revolving speed of and the torque output to said drive shaft, prior to the switching by said switching control unit.

20. A power output apparatus in accordance with claim 19, wherein said power equalizing control unit considers that both the revolving speed of and the torque output to said output shaft are substantially coincident with the revolving speed of and the torque output to said drive shaft, when a difference between the revolving speed of said output shaft and the revolving speed of said drive shaft and a difference between the torque output to said output shaft and the torque output to said drive shaft respectively become not greater than a first predetermined level and a second predetermined level.

21. A power output apparatus in accordance with claim 20, wherein said switching control unit switches said second connection mechanism to a connecting state, when the difference between the revolving speeds of said output shaft and said drive shaft becomes not greater than the first predetermined level upon condition that the revolving speed of said output shaft is greater than the revolving speed of said drive shaft and/or when the difference between the torques output to said output shaft and said drive shaft becomes not greater than the second predetermined level upon condition that the torque output to said output shaft is less than the torque output to said drive shaft.

22. A power output apparatus in accordance with claim 20, wherein said switching control unit switches said first connection mechanism to a connecting state, when the difference between the revolving speeds of said output shaft and said drive shaft becomes not greater than the first predetermined level upon condition that the revolving speed of said output shaft is less than the revolving speed of said drive shaft and/or when the difference between the torques output to said output shaft and said drive shaft becomes not greater than the second predetermined level upon condition that the torque output to said output shaft is greater than the torque output to said drive shaft.

23. A power output apparatus in accordance with claim 18, wherein said switching control unit allows a specific state in which both said first connection mechanism and said second connection mechanism are in an identical switching state, only when both the revolving speed of and the torque output to said output shaft substantially coincide with the revolving speed of and the torque output to said drive shaft, said switching control unit carrying out the exclusive switching via said specific state in which both said first connection mechanism and said second connection mechanism are in the identical switching state.

24. A power output apparatus in accordance with claim 23, wherein said switching control unit carries out the exclusive switching via a specified state in which both said first connection mechanism and said second connection mechanism are in a connecting state, said power output apparatus further comprising:
a first motor control unit for controlling said first motor via said first electric power control circuit, in order to prevent a torque from being output from said first motor, when said switching control unit switches both said first connection mechanism and said second connection mechanism to the connecting state.

25. A power output apparatus in accordance with claim 1, wherein said state detection sensor measures revolving speeds of said output shaft and said drive shaft as well as torques output to said output shaft and said drive shaft, said switching control unit comprising:
a first switching control unit for switching said second connection mechanism to a connecting state, when the torque output to said output shaft substantially coincides with the torque output to said drive shaft; and
a second switching control unit for switching said first connection mechanism to a connecting state, when the revolving speed of said output shaft substantially coincides with the revolving speed of said drive shaft.

26. A power output apparatus in accordance with claim 1, wherein said state detection sensor measures revolving speeds of said output shaft and said drive shaft as well as torques output to said output shaft and said drive shaft, said switching control unit comprising:
a first switching control unit for switching said second connection mechanism to a connecting state, when the revolving speed of said output shaft substantially coincides with the revolving speed of said drive shaft; and
a second switching control unit for switching said first connection mechanism to a connecting state, when the torque output to said output shaft substantially coincides with the torque output to said drive shaft.

27. A power output apparatus in accordance with claim 1, said power output apparatus further comprising:
an engine operation control unit for controlling a driving state of said engine;
a battery for feeding a supply of electric power required for driving said first motor and a supply of electric power required for driving said second motor;
a target power setting unit for setting a target power to be output to said drive shaft; and
a power control unit for driving said engine, said first motor, and said second motor via said engine operation control unit, said first electric power control circuit, and said second electric power control circuit, so as to cause a power actually output to said drive shaft to coincide with said target power, irrespective of the switching operation by said switching control unit.

* * * * *